United States Patent
Baker et al.

(10) Patent No.: US 11,151,455 B2
(45) Date of Patent: Oct. 19, 2021

(54) COUNTER-TYING NODES OF A NODAL NETWORK

(71) Applicant: D5AI LLC, Maitland, FL (US)

(72) Inventors: James K. Baker, Maitland, FL (US); Bradley J. Baker, Berwyn, PA (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/922,057

(22) Filed: Jul. 7, 2020

(65) Prior Publication Data

US 2020/0334541 A1 Oct. 22, 2020

Related U.S. Application Data

(63) Continuation of application No. 16/767,966, filed as application No. PCT/US2019/015389 on Jan. 28, 2019.

(Continued)

(51) Int. Cl.
*G06N 3/08* (2006.01)
*G06N 20/20* (2019.01)
(Continued)

(52) U.S. Cl.
CPC ......... *G06N 3/084* (2013.01); *G06F 16/9024* (2019.01); *G06K 9/6256* (2013.01); *G06K 9/6262* (2013.01); *G06K 9/6267* (2013.01); *G06N 3/04* (2013.01); *G06N 3/0454* (2013.01); *G06N 3/0481* (2013.01); *G06N 3/08* (2013.01); *G06N 3/082* (2013.01); *G06N 20/00* (2019.01); *G06N 20/20* (2019.01); *H04L 67/142* (2013.01); *G06K 9/6257* (2013.01); *G06N 5/046* (2013.01)

(58) Field of Classification Search
CPC combination set(s) only.
See application file for complete search history.

(56) References Cited

U.S. PATENT DOCUMENTS

| 5,701,398 A | 12/1997 | Glier et al. |
| 2002/0008657 A1 | 1/2002 | Poore, Jr. |

(Continued)

FOREIGN PATENT DOCUMENTS

| WO | 2018175098 A1 | 9/2018 |
| WO | 2018194960 A1 | 10/2018 |

(Continued)

OTHER PUBLICATIONS

Islam, Md Monirul, et al. "A new adaptive merging and growing algorithm for designing artificial neural networks." IEEE Transactions on Systems, Man, and Cybernetics, Part B (Cybernetics) 39.3 (2009), pp. 705-722. (Year: 2009).*

(Continued)

*Primary Examiner* — Kamran Afshar
*Assistant Examiner* — Randall K. Baldwin

(57) ABSTRACT

A system and method for controlling a nodal network. The method includes estimating an effect on the objective caused by the existence or non-existence of a direct connection between a pair of nodes and changing a structure of the nodal network based at least in part on the estimate of the effect. A nodal network includes a strict partially ordered set, a weighted directed acyclic graph, an artificial neural network, and/or a layered feed-forward neural network.

25 Claims, 31 Drawing Sheets

Related U.S. Application Data

(60) Provisional application No. 62/647,085, filed on Mar. 23, 2018, provisional application No. 62/623,773, filed on Jan. 30, 2018.

(51) Int. Cl.
  *G06N 3/04* (2006.01)
  *G06N 20/00* (2019.01)
  *G06N 5/04* (2006.01)
  *H04L 29/08* (2006.01)
  *G06K 9/62* (2006.01)
  *G06F 16/901* (2019.01)

(56) References Cited

U.S. PATENT DOCUMENTS

| | | | |
|---|---|---|---|
| 2004/0015459 A1* | 1/2004 | Jaeger | G06N 3/08 706/15 |
| 2004/0042650 A1 | 3/2004 | Ii et al. | |
| 2004/0073096 A1 | 4/2004 | Kates et al. | |
| 2004/0128004 A1* | 7/2004 | Adams | G06N 3/082 700/48 |
| 2004/0260662 A1 | 12/2004 | Staelin et al. | |
| 2005/0169529 A1* | 8/2005 | Owechko | G06K 9/469 382/190 |
| 2005/0216426 A1 | 9/2005 | Weston et al. | |
| 2007/0288410 A1* | 12/2007 | Tomkins | G06N 3/086 706/42 |
| 2008/0065572 A1 | 3/2008 | Abe et al. | |
| 2008/0069437 A1* | 3/2008 | Baker | G06K 9/6256 382/159 |
| 2008/0154820 A1* | 6/2008 | Kirshenbaum | G06N 3/126 706/20 |
| 2015/0019467 A1 | 1/2015 | Nugent | |
| 2016/0174902 A1* | 6/2016 | Georgescu | G06T 7/0012 600/408 |
| 2016/0224903 A1* | 8/2016 | Talathi | G06N 3/08 |
| 2016/0247326 A1 | 8/2016 | de Souza et al. | |
| 2016/0328643 A1* | 11/2016 | Liu | G06N 3/084 |
| 2016/0379132 A1 | 12/2016 | Jin et al. | |
| 2017/0105791 A1 | 4/2017 | Yates et al. | |
| 2017/0132528 A1* | 5/2017 | Aslan | G06N 20/00 |
| 2017/0206464 A1* | 7/2017 | Clayton | G06N 3/0445 |
| 2018/0174051 A1* | 6/2018 | Knittel | G06N 3/04 |
| 2018/0373986 A1* | 12/2018 | Rainwater | G06N 3/084 |
| 2019/0130247 A1* | 5/2019 | Ravishankar | G06N 3/04 |

FOREIGN PATENT DOCUMENTS

| | | |
|---|---|---|
| WO | 2018226492 A1 | 12/2018 |
| WO | 2018226527 A1 | 12/2018 |
| WO | 2018231708 A2 | 12/2018 |
| WO | 2019005507 A1 | 1/2019 |
| WO | 2019005611 A1 | 1/2019 |
| WO | 2019067236 A1 | 4/2019 |
| WO | 2019067248 A1 | 4/2019 |
| WO | 2019067281 A1 | 4/2019 |
| WO | 2019067542 A1 | 4/2019 |
| WO | 2019067831 A1 | 4/2019 |
| WO | 2019067960 A1 | 4/2019 |
| WO | 2019152308 A1 | 8/2019 |
| WO | 2020005471 A1 | 1/2020 |
| WO | 2020009881 A1 | 1/2020 |
| WO | 2020009912 A1 | 1/2020 |
| WO | 2020018279 A1 | 1/2020 |
| WO | 2020028036 A1 | 2/2020 |
| WO | 2020033645 A1 | 2/2020 |
| WO | 2020036847 A1 | 2/2020 |
| WO | 2020041026 A1 | 2/2020 |
| WO | 2020046719 A1 | 3/2020 |
| WO | 2020046721 A1 | 3/2020 |

OTHER PUBLICATIONS

Santaji Ghorpade, Jayshree Ghorpade, Shamla Mantri, and Dhanaji Ghorpade, "Neural Networks for Face Recognition Using SOM", Dec. 2010, IJCST vol. 1, Issue 2, pp. 65-67 (Year: 2010).*

Ishan Misra, Abhinav Shrivastava, Abhinav Gupta, and Martial Hebert, "Cross-stitch Networks for Multi-task Learning", 2016, Proceedings of the IEEE Conference on Computer Vision and Pattern Recognition (CVPR), pp. 3994-4003. (Year: 2016).*

Alex Kendall, Yarin Gal, and Roberto Cipolla. "Multi-Task Learning Using Uncertainty to Weigh Losses for Scene Geometry and Semantics", May 19, 2017, arXiv, pp. 1-13 (Year: 2017).*

Huaxiong Li, Libo Zhang, Xianzhong Zhou, and Bing Huang, "Cost-sensitive sequential three-way decision modeling using a deep neural network", 2017, International Journal of Approximate Reasoning 85 (2017), pp. 68-78. (Year: 2017).*

Sindagi, Vishwanath A., and Vishal M. Patel. "Cnn-based cascaded multi-task learning of high-level prior and density estimation for crowd counting." 2017 14th IEEE International Conference on Advanced Video and Signal Based Surveillance (AVSS). IEEE, 2017, pp. 1-6. (Year: 2017).*

Fu, et al. "Mapping rule-based systems into neural architecture." Knowledge-Based Systems 3.1 (1990): 48-56. (Year: 1990).*

Deng et al. "Ensemble deep learning for speech recognition." Fifteenth Annual Conference of the International Speech Communication Association. Sep. 2014: 1915-1919 2014. (Year: 2014).*

Liu, Yong, and Xin Yao. "Ensemble learning via negative correlation." Neural networks 12.10 (1999): 1399-1404. (Year: 1999).*

Alhamdoosh, Monther, and Dianhui Wang. "Fast decorrelated neural network ensembles with random weights." Information Sciences 264 (2014): 104-117. (Year: 2014).*

Rasti, Reza, et al. "Macular OCT classification using a multi-scale convolutional neural network ensemble." IEEE transactions on medical imaging 37.4 (2017): 1024-1034. (Year: 2017).*

Glacet et al., The impact of Edge Deletions on the Number of Errors in Networks, In:OPODIS'11 Proceedings of the 15th International Conference on Principles of Distributed System, Dec. 13-16, 2011; https://www.researchgate.net/publication/221039292_The_Impact_of_Edge_Deletions_on_the_Number_of_Errors_in_Networks.

International Search Report and Written Opinion for International PCT Application No. PCT/US2019/015389, dated Apr. 25, 2019.

Hinton et al., Distilling the Knowledge in a Neural Network, arXiv preprint arXiv:1503.02531, Mar. 9, 2015, 9 pages.

International Search Report and Written Opinion of the International Searching Authority for International Application No. PCT/US18/53519 dated Mar. 6, 2019.

International Preliminary Report on Patentability for International PCT Application No. PCT/US2019/015389, dated Sep. 4, 2020.

\* cited by examiner

COUNTER-TYING NODES OF A NODAL NETWORK

CROSS-REFERENCE TO RELATED APPLICATIONS

The present application is continuation of co-pending U.S. patent application Ser. No. 16/767,966, filed May 28, 2020, which is a national stage application under 35 U.S.C. § 371 of PCT application Serial No. PCT/US2019/15389, which claims priority to both (1) U.S. Provisional Patent Application No. 62/623,773, titled SELF-ORGANIZING PARTIALLY ORDERED NETWORKS, filed Jan. 30, 2018, and (2) U.S. Provisional Patent Application No. 62/647,085, titled SELF-ORGANIZING PARTIALLY ORDERED NETWORKS, filed Mar. 23, 2018, each of which is hereby incorporated by reference herein in their entireties.

CROSS-REFERENCE TO RELATED APPLICATIONS

The following applications are also continuation applications of U.S. patent application Ser. No. 16/767,966: (a) Ser. No. 16/903,980, filed Jun. 17, 2020, titled "Imitation Training or Machine Learning Networks," (b) Ser. No. 16/911,560, filed Jun. 25, 2020, titled "Merging Multiple Nodal Networks," and (c) Ser. No. 16/911,657, filed Jun. 25, 2020, titled "Stacking Multiple Nodal Networks."

BACKGROUND

Artificial neural networks have represented one of the leading techniques in machine learning for over thirty years. In the past decade, deep neural networks, that is networks with many layers, have far surpassed their previous performance and have led to many dramatic improvements in artificial intelligence. It is well established that the ability to train networks with more layers is one of the most important factors for this dramatic increase in capabilities.

However, the more layers there are in a neural network, the more difficult it is to train. This fact has been the main limitation in the performance of neural networks at each point in the last five decades and remains so today. It is especially difficult to train tall, thin networks, that is, networks with many layers and only relatively few nodes per layer. Such tall, thin networks are desirable because, compared to shorter, wider networks, they have more representational capacity with fewer parameters. Thus, they can learn more complex functions with less tendency to overfit the training data.

Even neural networks with a modest number of layers require a very large amount of computation for training. The standard algorithm for training neural networks is iterative stochastic gradient descent, based on a feed-forward computation of the activation of each node in the network followed by computing an estimate of the gradient by the chain rule implemented by back-propagation of partial derivatives backward through the neural network for each training data item, with an iterative update of the learned parameters for each mini-batch of data items. Typically, the full batch of training data contains multiple mini-batches. A round of performing an iterative update for all of the mini-batches in the training set is called an epoch. A significant problem in this iterative training process is that there is a tendency for there to be plateaus, intervals of training in which the learning is very slow, occasionally punctuated with brief periods of very fast learning. In many cases, the vast majority of time and computation is spent during these relatively unproductive periods of slow learning.

Furthermore, stochastic gradient descent only updates the parameters of a neural network with a fixed, specified architecture. It is not able to change that architecture.

SUMMARY

In one general aspect, the present invention is directed to computer-implemented systems and methods for controlling a nodal network comprising a pair of nodes. The nodes comprise activation functions that are evaluatable on a dataset according to an objective defined by an objective function. The method comprises (a) estimating an effect on the objective caused by the existence or non-existence of a direct connection between the pair of nodes and (b) changing a structure of the nodal network based at least in part on the estimate of the effect. Changing the structure of the nodal network can include adding a new direct connection between the nodes or deleting a pre-existing direct connection between the nodes. A nodal network includes a strict partially ordered set, a weighted directed acyclic graph, an artificial neural network, and/or a layered feed-forward neural network.

In another general aspect, the present invention is directed to computer-implemented systems and methods of reorganizing a first neural network to generate a second neural network in a manner such that the reorganization does not degrade performance compared to the performance of the first neural network. The first neural network can comprise a plurality of nodes, including nodes A and B, wherein the plurality of nodes in the first network are interconnected by a plurality of arcs. The method comprises at least one of: (a) adding an arc from node A to node B, unless B is less than A, in a strict partial order defined by a transitive closure of a directed graph determined by said plurality of arcs; or (b) deleting an arc between nodes A and B.

In another general aspect, the present invention is directed to yet other computer-implemented systems and methods of reorganizing a first neural network to generate a second neural network. The other method comprises at least one of (a) adding a new node to the first network; or (b) deleting a first pre-existing node in the first network where all arcs from the first pre-existing node have a weight of zero. Adding a new node in such an embodiment comprises (i) initializing all arcs from the new node to the pre-existing nodes in the first network to a weight of zero; and (ii) updating weights for all the arcs from the new node by gradient descent.

Other inventions and innovation implementations are described hereinbelow. The inventions of the present application address the problems described above and others, as will be apparent from the description that follows.

FIGURES

Various embodiments of the present invention are described herein by way of example in conjunction with the following figures.

DESCRIPTION

Figure 1:
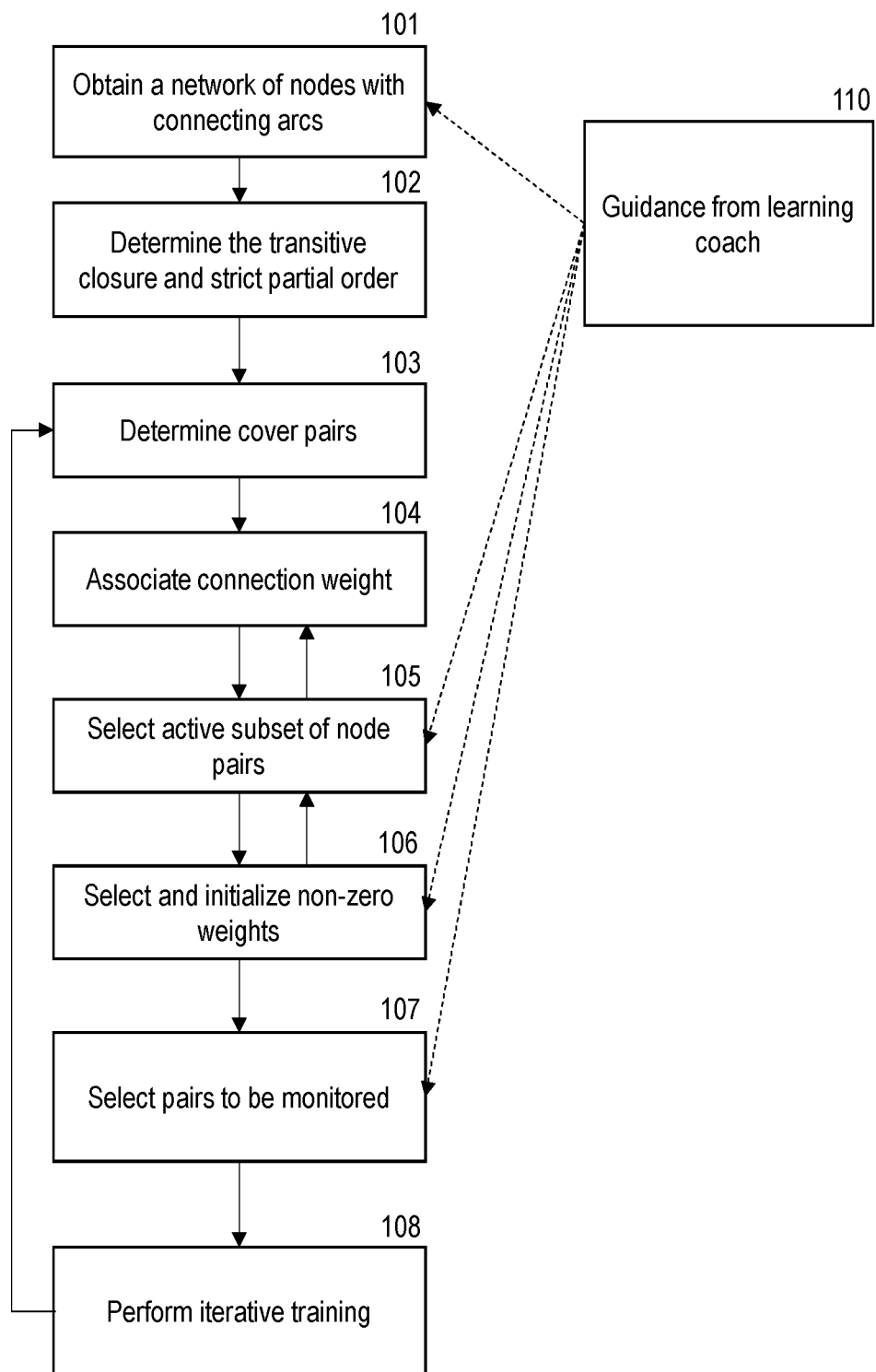
FIG. 1 is a flow chart of the overall process of training a self-organizing set of nodes with a strict partial order.

The present disclosure sets forth various diagrams, flowcharts, and/or examples that will be discussed in the terminology associated with partially ordered sets and/or directed graphs or networks. A network or directed graph is a set of elements, called "nodes," with a binary relation on the set of ordered pairs of nodes. Conceptually, the network or graph is a set of nodes connected by directed arcs, where there is an arc from node A to node B in the graph if and only if the ordered pair (A, B) is in the binary relation. In deep learning and, more generally, in the field of artificial neural networks, there are two standard computations: (1) feed-forward activation and (2) back-propagation of estimated partial derivatives. These computations are implemented based on the architecture of the network and, in particular, on the directed arcs. The feed-forward computation computes, at each node, a sum over all the directed arcs coming into the node. The back-propagation computes, at each node, a sum over all directed arc leaving the node.

However, the self-organizing capability of this disclosure is based on the concept of a strict partial order on the set of nodes, so the discussion will use the terminology of partially ordered sets as well as the terminology of directed graphs. To avoid infinite cycles in the feed-forward computation, generally the directed graphs are restricted to directed acyclic graphs (DAG) and the partial orders are strict partial orders.

As used herein, the term "nodal network" can collectively refer to a directed graph, a strictly partially ordered set, a neural network (e.g., a deep neural network), or a layered feed-forward network. A deep neural network is an artificial neural network with multiple "inner" or "hidden" layers between the input and output layers. More details about feed feed-forward neural networks are provided below in connection with FIG. 25.

The self-organizing capability of this invention is described in terms of sets of nodes with a strict partial order. A strict partial order is a binary relation <defined on a set S such that the relation < is irreflexive and transitive. A strict partial order may be thought of as the abstract mathematical generalization of the usual "less than" relation for ordinary numbers. A strict partial order has the following characteristics:

1. A<A is false for all A (irreflexivity).
2. If A<B and B<C then A<C (transitivity).

Together, irreflexivity and transitivity also imply asymmetry:

3. If A<B then not B<A (asymmetry).

In some embodiments, the self-organizing capability will be generalized to networks with an arbitrary binary relation.

To implement machine learning on a partially ordered set, there needs to be an associated set of trainable parameters. These associated parameters can comprise a set of connection weights associated with each ordered pair of elements (A, B). The weights can only be non-zero if A<B. However, the zero-valued variables are still significant because the partial derivative of the objective function may be non-zero even for pairs (A, B) for which A<B is not true. Evaluating these partial derivatives is an essential part of the self-organizing process.

An important concept in partially ordered sets is that of cover. An element B in a partial order with the relation < is said to "cover" the element A if A<B and there is no element C such that A<C<B. The concept of cover is important in understanding and managing the process of self-organizing by making changes in the associated partial order.

If either A<B or B<A, then the two elements are said to be comparable. That is, the two elements can be compared to see which is less than the other. A set of elements for which every pair is comparable is called a linear order or total order. Such a set is also called a chain.

Two elements A and B for which neither A<B nor B<A are said to be "incomparable." A subset of incomparable elements of a partially ordered set is called an "antichain." The concept of antichain is important because the feed-forward and back-propagation computations can each be computed in parallel for all elements of any antichain. Thus, the antichains are the natural generalization to the domain of partially ordered set of the layers in a layered feed-forward neural network. In this discussion, a layered feed-forward neural network is defined to be a directed acyclic graph in which the nodes are divided into numbered layers such there is no directed arc going from a node A in layer m to a node B in layer n, if n≤m. This definition implies that no node is connected to any other node in the same layer, so all the nodes in each layer are incomparable.

Every layered feed-forward network defines a unique directed acyclic graph. However, the relationship is not one-to-one. For every directed acyclic graph, there may be more than one way to assign the nodes to layers. Thus, there is a distinction between the space of layered feed-forward networks and the space of directed acyclic graphs. Furthermore, this distinction has consequences. Although, the stochastics gradient descent updates are equivalent for any layered feed-forward networks that share the same directed acyclic graph, the implementation of parallel computation, for example, may be different. The impact of self-organizing learning may be even greater. The choice of a mapping from a directed graph to a layered network may affect the ease of adding nodes and arcs in desired positions in later steps of self-organizing learning.

Figure 21A:
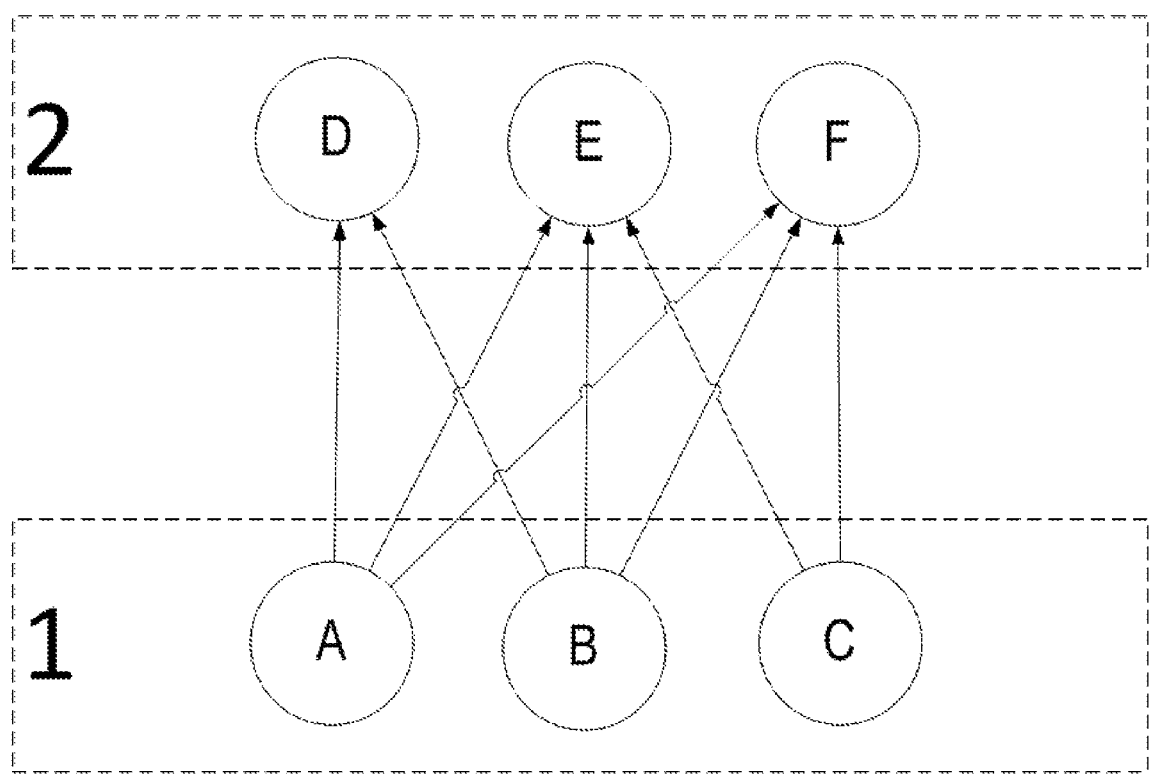
FIG. 21A is a diagram of a neural network arranged in two layers.
Figure 21B:
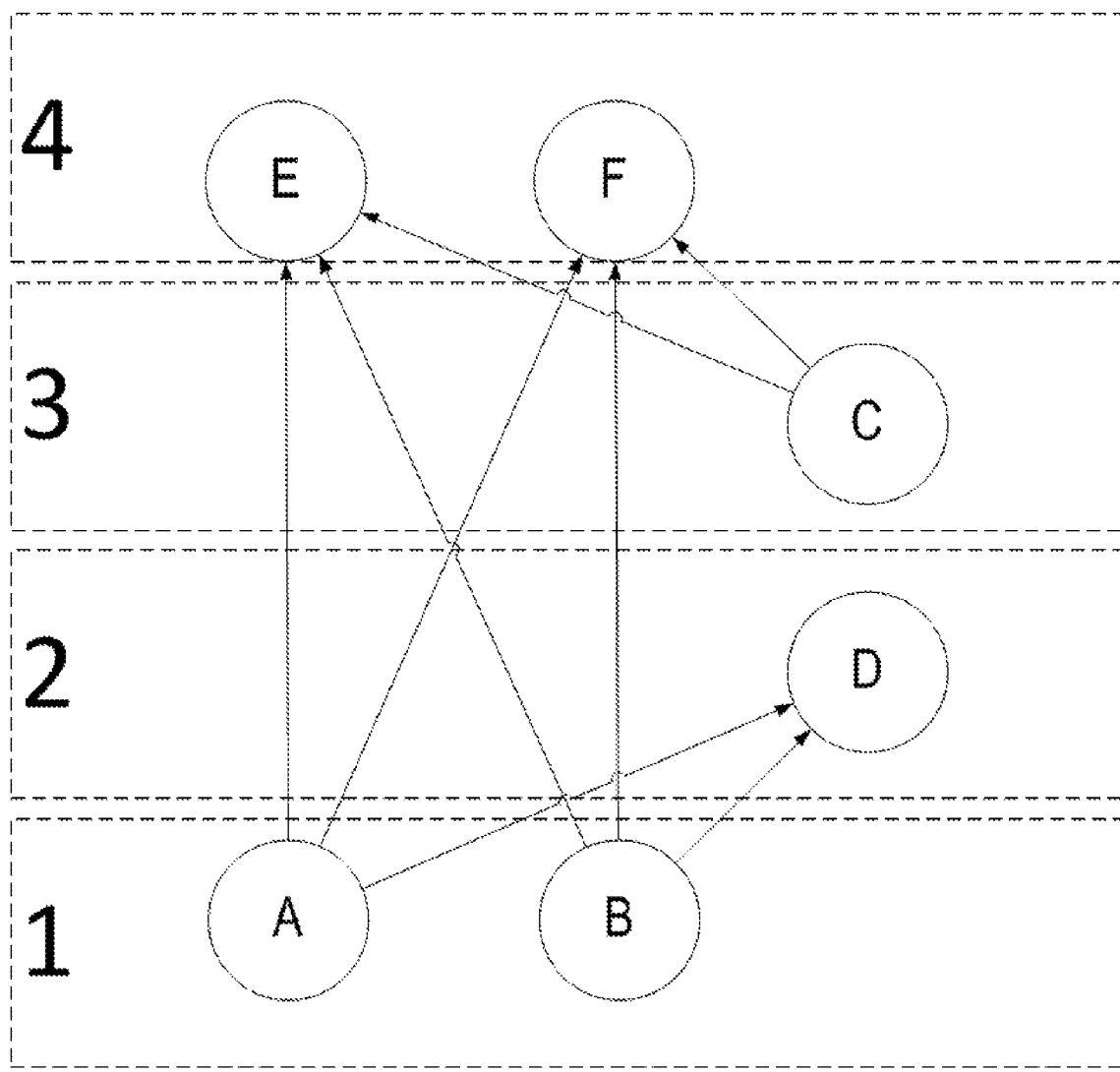
FIG. 21B is a diagram of a neural networking having the same directed acyclic graph as FIG. 21A arranged in four layers.
Figure 21C:
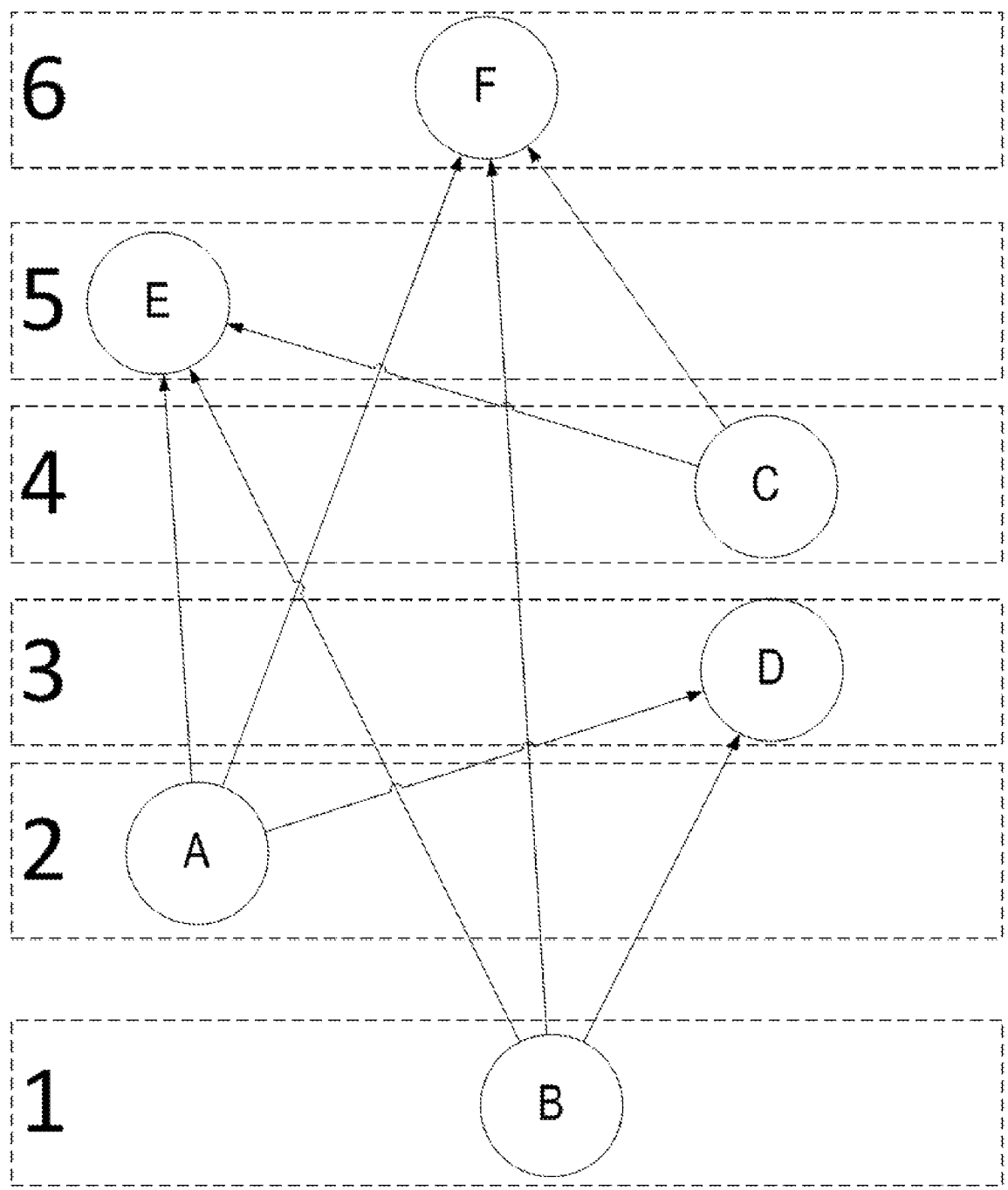
FIG. 21C is a diagram of a neural networking having the same directed acyclic graph as FIG. 21A arranged in six layers.

For example, FIG. 21A depicts a layered feed-forward network consisting of nodes A-F with node A connected to nodes D-F, node B connected to nodes D-F, and node C connected to nodes E and F. It should be noted that nodes A, B, and C are incomparable and thus form a first antichain and nodes D, E, and F are also incomparable and thus form a second antichain. In FIG. 21A, the feed-forward network is distributed into two layers. However, the same composition of nodes and connections between the nodes can also be distributed into three layers, four layers (as depicted in FIG. 21B), five layers, or six layers (as depicted in FIG. 21C). Furthermore, there can be additional variations in the networks defined by this illustrative directed acyclic graph in that the nodes can be arranged differently among the layers than as they are depicted in FIGS. 21A, 21B, and 21C. All of these examples define the same directed acyclic graph because they have the same composition of nodes and the same relationships between the nodes. The only difference between the networks is the configuration in which the nodes are arbitrarily assigned to layers.

Most of the discussion in this disclosure will represent networks and the computations on a network in terms of a directed acyclic graph and the corresponding strict partial order. In most cases, it will not matter if or how the network is organized into layers. The exceptions will be the method illustrated by FIG. 19, which will distinguish among the different layered networks that may correspond to the same directed acyclic graph and node placements in FIG. 20, which will be consistent with an existing set of layers.

For any strict partial order, there are several associated DAGs. One associated DAG is the "cover graph" in which there is a directed edge from node A to node B for any pair of elements such that B covers A. Another associated DAG is the graph in which there is a directed edge from A to B for every pair such that A<B. That graph is called the "transitive closure graph." As the name implies, the transitive closure graph T of directed graph G results from adding an arc from node A to node C whenever there is a node B such than (A, B) is in DAG G and (B, C) is in DAG G, continuing that process until the relation associated with the resulting graph is transitive. The relation associated with a DAG that is transitive is a strict partial order. Any two DAGs that have the same transitive closure graph will have the same associated partial order.

The process of self-organizing a network may comprise the steps of adding and deleting arcs and the process of self-organizing learning may comprise the steps of evaluating the performance or response of the network resulting from adding and deleting arcs. An arc cannot be added from node B to node A in a DAG G if A<B in the partial order < associated with the transitive closure of G. Therefore, planning and managing the process of self-organizing DAGs is fundamentally tied to their associated partial orders. Changes in the associated partial order affects the ability to add other arcs in the future.

Some changes to a DAG are much more consequential than others. An arc from A to B may be added to a DAG G if either A<B or if A and B are incomparable. If A<B, then the arc from A to B is in the transitive closure of G and adding the arc does not change the associated partial order. If A and B are incomparable, then adding an arc from A to B will change the partial order and will affect the ability to add other arcs in the future.

On the other hand, dropping an arc from A to B in DAG G changes the associated partial order if and only if B covers A. The effect on the ability to make future changes to a DAG G can be expressed more directly in terms of its transitive closure graph T, the associated partial order <, and the cover graph, rather than in terms of DAG G itself. That is, all the directed acyclic graphs that have the same transitive closure may be considered to be representatives of the same point in self-organizing space. Changes from one to another among the DAGs that share the same transitive closure does not make a fundamental change in the self-organizing process. In other words, the point in the self-organizing process is characterized by the partial order <rather than by the particular DAG that presently represents that partial order.

The DAG, however, represents which feed-forward and back-propagation computations are being done, which in turn determines which connection weight training updates can be done. To reasonably decide whether an arc from A to B should be added or deleted, the gradient of the objective with respect to its connection weight must be computed even if the connection weight is not being updated. To do the feed-forward computation, any non-zero connection weight must have its arc included in the DAG that implements the computation. However, such a connection weight may be fixed or frozen, that is, not having its weight parameters being updated. Thus, there are several distinct, but related concepts for sets of ordered pairs (A, B) in network N or a DAG G:

1. Connected (A→B): A is said to be connected to B if the directed arc from A to B is in the DAG G, the set of arcs for which the feed-forward and back-propagation computations are done.
2. Zero/Non-zero: A weight for the connection from A to B may be non-zero only if the connection (A→B) is in the DAG; however, some connections in the DAG may have zero-valued connection weights.
3. Active/Inactive or Unfrozen/Frozen: A connection (A→B) is active if its connection weight is being updated in the iterative learning. A frozen connection weight may be zero or non-zero.

4. Monitored: An ordered pair of nodes <A, B> is said to be monitored if, for each training data item, data is collected and accumulated for multiple data items. For example, if <A, B> is connected and the connection is active, then data for estimating the partial derivative of the objective with respect to the weight associated with the connection is monitored and is accumulated across each mini-batch of data. Similarly, a pair of nodes <A. B> that is not connected may be monitored to collect data to help decide whether a connection from A to B should be added to the network. This example and other examples will be discussed in more detail in association with FIG. 2 and other figures.

5. Associated partial order: The relation A<B associated with the transitive closure of the DAG G.

6. A is covered by B: A<B and there is no C such that A<C<B in the associated partial order <.

Each of the concepts identified above defines a binary relation on the set of nodes that is consistent with the directions of the arcs. Therefore, each of these concepts defines a DAG.

For the purpose of talking about the feed-forward and back-propagation computations, let DAG G be the computation graph: An ordered pair (A, B) is in the computation graph G if either the connection (A→B) is active or the weight for the connection (A→B) is non-zero. The amount of computation required for a data item for either the feed-forward activation of the network or the back-propagation is proportional to the number of ordered pairs in the computation graph.

The computations, including weight updates, are naturally discussed in terms of the computation graph G. The adding and deletion of arcs in the self-organizing process are naturally discussed in terms of the associated strict partial order and the associated transitive closure graph.

In the standard implementation of feed-forward neural networks, including the networks that result from unfolding recursive neural networks through back-propagation-in-time, the network corresponds to the computation graph. All arcs in the network are active. All arcs not present in the network are inactive, their connection weights are implicitly zero, and they are not monitored. Thus, for a standard implementation of a feed-forward neural network, all the properties listed above are determined just by the network architecture of the computation graph G. The architecture of that network is fixed and unchanging during the parameter learning process.

Note that, in that standard implementation, the gradient is not computed for any connections that are not in the computation graph. Therefore, the necessary information for self-organization is not available. Generally, there is no attempt to change the architecture during the learning process. In fact, many leading frameworks for deep learning require that the architecture of the network be specified, fixed, and compiled before the iterative learning process begins. The self-organizing process is just the opposite. The essence of self-organizing is to change the network architecture.

Figure 22A:
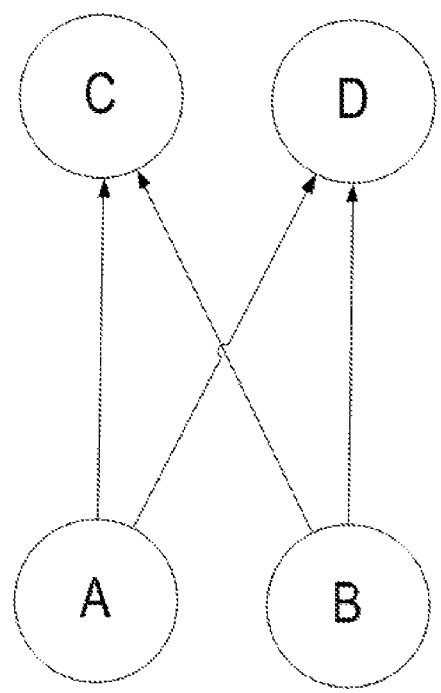
FIG. 22A is a diagram of a neural network.
Figure 22B:
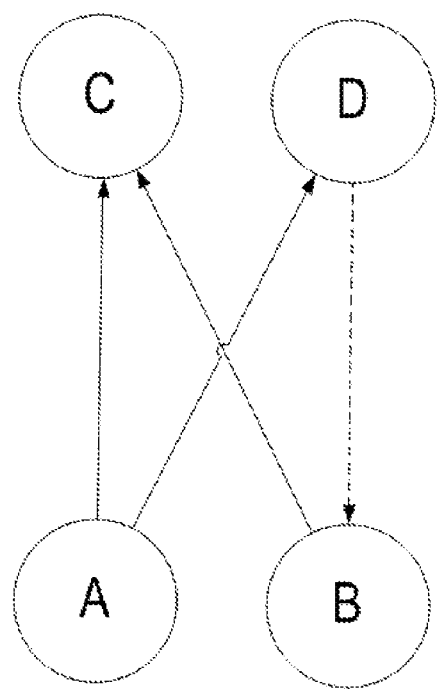
FIG. 22B is a diagram of the neural network of FIG. 22A with the connection between two of the nodes reversed.
Figure 22C:
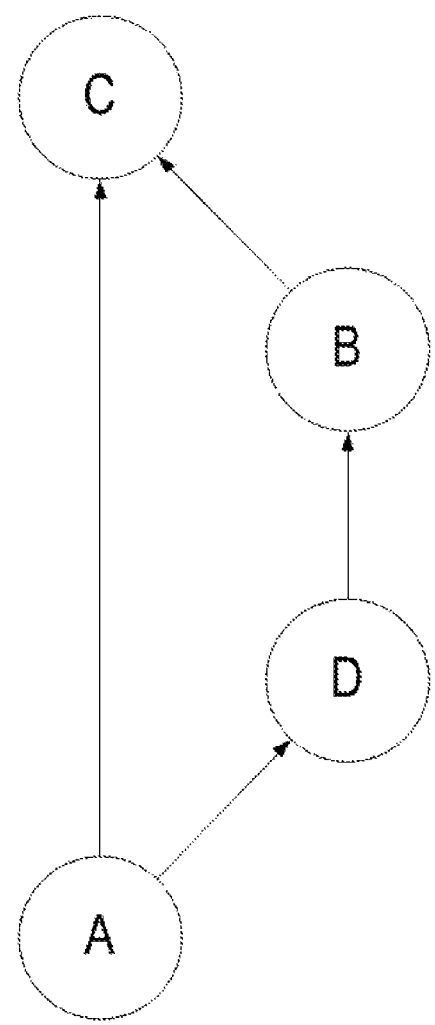
FIG. 22C is a diagram of the resulting neural network from FIG. 22B arranged in a layered configuration.

It is important to recognize how adding and deleting arcs and/or nodes between arcs can change the network architecture. For example, FIG. 22A depicts a feed-forward network consisting of nodes A-D with four cover pairs: (A, C), (A, D), (B, C), and (B, D). If the arc between node B and node D is deleted and replaced with a new arc oriented in the opposite direction, as depicted in dashed lines in FIG. 22B, then the network architecture has been altered such that there are now only three cover pairs: (A, D), (B, C), and (D, B). In other words, in addition to the (B, D) cover pair being reversed, (A, C) is no longer a cover pair because it is now no longer true that there is no element X such that A<X<C. This is because A is now also connected to node C through nodes B and D (i.e., X includes B and/or D). This change in the network architecture can be represented visually by FIG. 22C, for example.

Provided below is a summary list of properties related to these concepts that affect the self-organizing process or computation and memory requirements:

1. A directed arc from A to B cannot be added to a DAG if B<A.
2. If A<B, a directed arc from A to B may be added to a DAG without changing the associated partial order. Its connection weight is initially set to zero so as not to change the computation.
3. If A is incomparable to B, adding a directed arc from A to B or from B to A will change the associated partial order.
4. An arc may be dropped from a DAG without changing the computation if and only if the connection weight for the arc is zero.
5. A directed arc (A→B) may be dropped from a DAG G without changing the associated partial order if and only if B is not a cover of A.
6. The state of the self-organizing process is characterized by the associated partial order.
7. Freezing or unfreezing a directed arc affects the update computation but not the state of the self-organizing process.
8. A connection weight being zero or non-zero affects the feed-forward and back-propagation computations but not the state of the self-organizing process.
9. Less computation and memory is required if a connection weight is frozen to be zero.
10. For a connection weight to be updated, its directed arc must be monitored.
11. Any directed arc from a node A to a node B may be monitored.

Unless explicitly stated otherwise, all partially ordered networks mentioned in this disclosure will have strict partial orders. The main exception will be in the discussion associated with FIG. 17. The phrase "self-organizing strict partially ordered network" may be abbreviated as the acronym SoPoNet.

The partially ordered set representation is useful precisely because it enables the relation to be changed in small increments that can be evaluated locally, thereby enabling self-organization to be done by gradient descent. This property is not true if the networks are restricted to a more limited set of architectures, such as layered neural networks.

Although the training, including the self-organization, can be done autonomously for a standalone SoPoNet, some embodiments of the systems and methods described herein use a second machine learning system, called a "learning coach." The learning coach does not learn the same thing that the first machine learning system is trying to learn. Rather, the learning coach learns the knowledge that it needs to act as a "coach." For example, the learning coach learns to recognize situations where the progress of learning by the first learning system is slower than it should be and thereby can guide the first learning system to take actions that accelerate the learning process. As will be seen in the discussion of the diagrams, there are many kinds of actions that a SoPoNet can do that will accelerate the learning process.

Prior to discussing the following diagrams, there are a few things that should be noted regarding the generality of the terminology used in the descriptions of the diagrams. First, the term "node" is used throughout the discussion. With special hardware, such as a tensor core in a graphics processing unit, it is convenient to treat a block of, e.g., 4 nodes as a single unit. Just as two single nodes may be connected by a directed arc with an associated weight, a first node block of m nodes may be connected with second node block with n nodes by a directed arc associated with an m×n weight matrix. A tensor core can compute a 4×4 matrix product in a single operation, so it is very convenient and efficient to arrange the nodes in node blocks of up to 4 nodes each. In all the discussions of the diagrams, the term "node" can be understood to also refer to a "node block" and the "weight" associated with an arc can be understood to also refer to a "weight matrix." It is also to be understood that the condition of an arc weight being zero-valued, in the weight matrix case, refers to the condition that all the values in the matrix are zero.

Second, a "SoPoNet" is to be understood to be a generalization of a layered deep neural network, not a restriction. Any neural network for which the feed-forward computation is feasible must be a DAG to avoid cycles in the computation. For any DAG G, there is a unique associated strict partial order, the partial order of the transitive closure of G. Thus, any of the processes described in the following diagrams may be done as an operation on any DAG, whether the strict partial order is explicit or implicit. A SoPoNet can be derived from any DAG, which in turn can represent any layered, feed-forward neural network. Extra operations are available to enable the self-learning capabilities of a SoPoNet, but these extra capabilities in no way restrict the ability of a SoPoNet to do any of the operations available for a regular layered, feed-forward neural network.

Third, "slow learning" is a relative term, depending on the goals of the user of the machine learning system and the complexity of the problem. The user can select any criterion to determine when learning is "slow" and may use a learning coach to implement the detection of the condition and adjust hyperparameters in the detection criterion as the situation requires. However, an important case has special terminology that is interpreted differently in a self-organizing network than in a fixed network. One of the leading causes of a sustained interval of slow learning occurs when the current parameter values are near a stationary point. This stationary point may be a "saddle point," a "local minimum," or a "global minimum." In the discussions of the diagrams, these terms are to be interpreted as referring to the values of the objective restricted to the parameter space of the fixed network before any operation in which the self-organizing process makes a change in the architecture of the network. In the fixed network, gradient descent will converge to a "local minimum" or a "global minimum" from any point in a region around that minimum. The iterative learning process cannot escape from a local minimum without making a discontinuous jump change in the values of the parameters. In contrast, the self-organizing process of a SoPoNet changes the network architecture and changes the parameter space. Furthermore, many of the processes illustrated in the following diagrams choose changes in the network such that the derivatives of some of the new parameters are guaranteed to be non-zero. This property makes it possible to make incremental changes that can escape from a minimum, even a "global minimum" of the previous fixed network, based on derivatives of parameters that are not in the parameter space of the fixed network. That is, based on derivatives of weight, parameters for arcs that are not yet part of the network.

Figure 18:
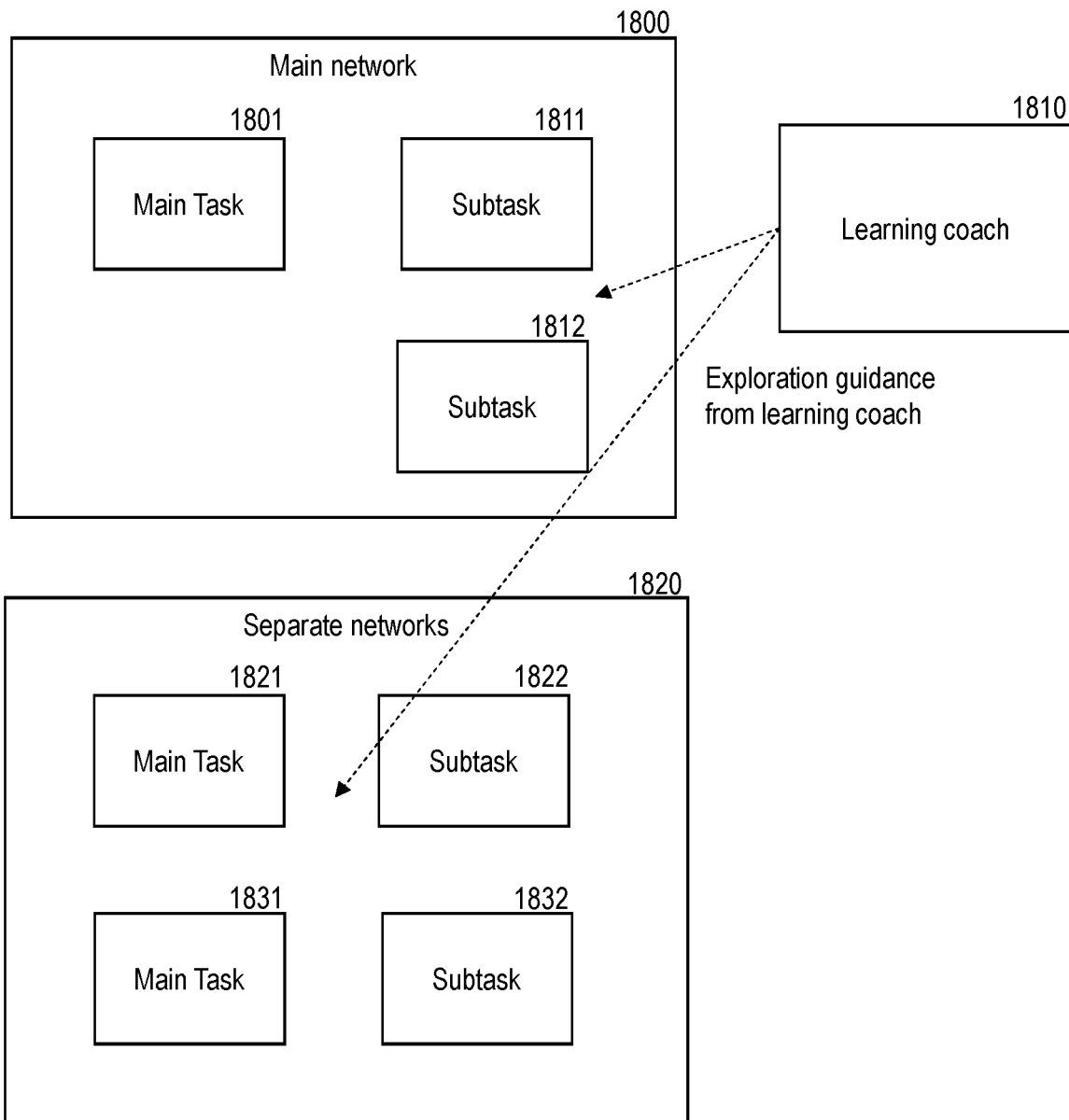
FIG. 18 is a block diagram of a system for multiple networks on subtasks.

The learning in a self-organizing partially ordered network is distinguished from gradient descent or stochastic gradient descent learning in a fixed network because its parameters are not limited to the parameter space of a fixed network. It is distinguished from any process of changing the network by large steps or by trial-and-error because it evaluates derivatives for parameters that are not in the parameter space of current network and it finds node pairs for which the derivatives are non-zero. It can do iterative, gradient-based learning in the generalized, ever-changing parameter space. There is no loss of generality compared to large-step, trial-and-error network architecture exploration, because such exploration techniques can always be used in addition to the process of self-organizing of a SoPoNet, as illustrated in FIG. 18.

The following description has set forth aspects of computer-implemented devices and/or processes via the use of block diagrams, flowcharts, and/or examples, which may contain one or more functions and/or operations. As used herein, the term "block" in the block diagrams and flowcharts refers to a step of a computer-implemented process executed by a computer system, which may be implemented as a machine learning system or an assembly of machine learning systems. Each block can be implemented as either a machine learning system or as a nonmachine learning system, according to the function described in association with each particular block. Furthermore, each block can refer to one of multiple steps of a process embodied by computer-implemented instructions executed by a computer system (which may include, in whole or in part, a machine learning system) or an individual computer system (which may include, e.g., a machine learning system) executing the described step, which is in turn connected with other computer systems (which may include, e.g., additional machine learning systems) for executing the overarching process described in connection with each figure or figures.

Figure 24:
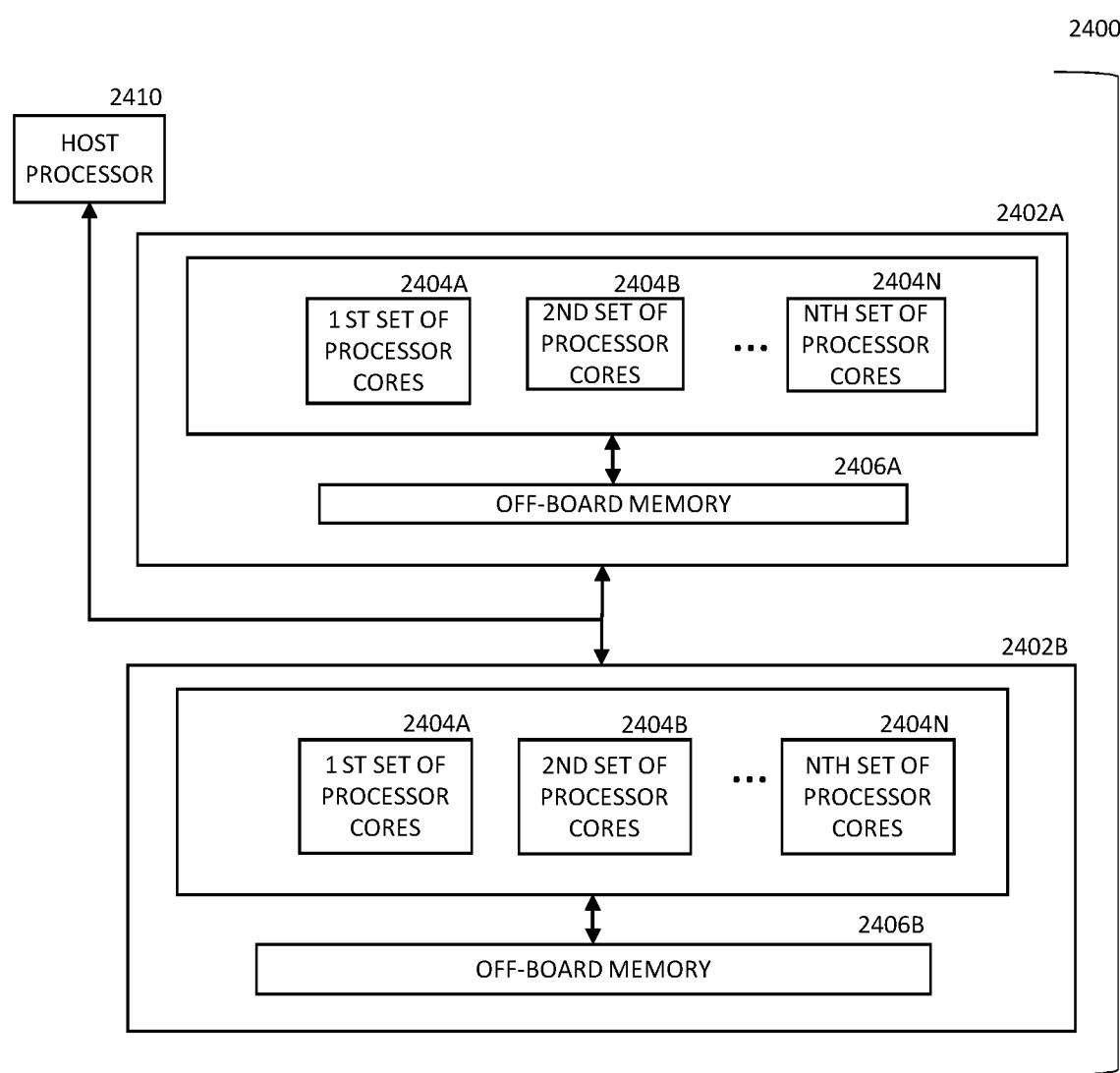
FIG. 24 is a diagram of a computer system such as may be used in various illustrative embodiments of the invention.

FIG. 1 is a flowchart of the general process of training a self-organizing network. For convenience of computation, the network is first organized by a computer system such as illustrated in FIG. 24 into a set of nodes, as indicated in box 101.

In box 102, the computer system imposes a strict partial order on the set of nodes. This also sets the state of the self-organizing process and determines the transitive closure of which the arcs in the active computation DAG will be a subset.

In box 103, the computer system determines the cover pairs for the strict partial order imposed in box 102. In the self-organizing process, a cover pair are treated differently from a node pair (A, B) for which A<B but that is not a cover pair because deleting the arc for the non-cover-pair does not change the associated strict partial order, but deleting the arc for the cover pair does change the strict partial order.

In boxes 104, 105, and 106, the computer system determines the active computation DAG G and which of the connection weights will be non-zero. In some embodiments, only a small fraction of the ordered pairs of nodes A<B are active and only a small fraction of the arcs in the DAG are initialized with non-zero connection weights.

In box 107, the computer system selects the pairs of nodes (A, B) that will be monitored. This selection must at least include all ordered pairs corresponding to non-frozen directed arcs in the active computation DAG G.

Figure 2:
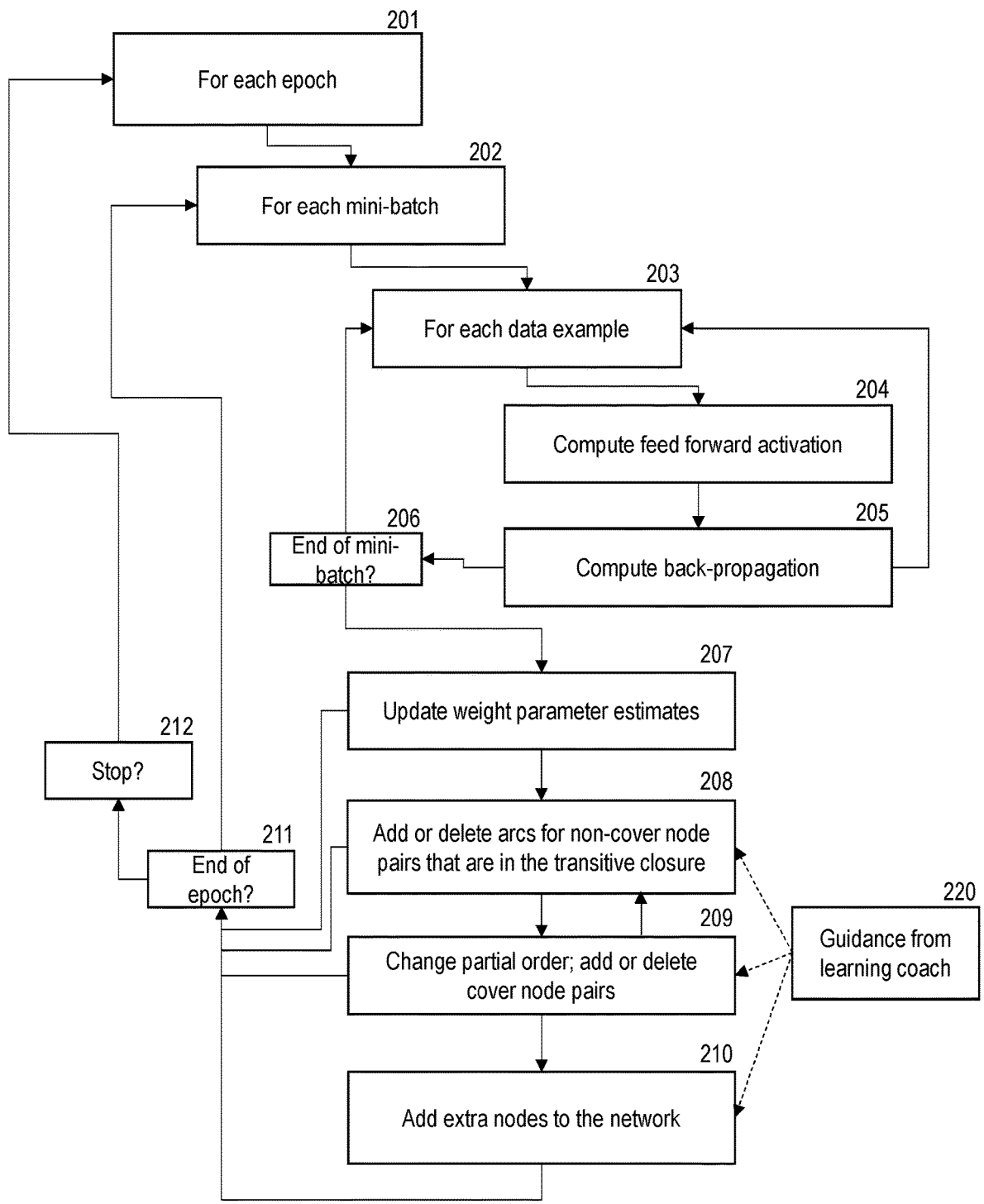
FIG. 2 is a flow chart of the iterative training procedure.

In box 108, the computer system performs the iterative training process, which is shown in more detail in FIG. 2.

Box 110 represents a learning coach. A learning coach is a second machine learning system that learns knowledge about the learning process in order to coach a first learning system to have more effective learning so as to achieve better performance. The learning process for a SoPoNet, combining the self-organizing and stochastic gradient descent learning mechanisms working simultaneously with directed graphs and associated strict partially ordered sets is a complex process involving balancing multiple goals. In some embodiments, a learning coach is used to help guide this process in ways that are presented in more detail in association with FIG. 2 and other figures. More details about an exemplary learning coach are described in (i) WO 2018/063840, titled LEARNING COACH FOR MACHINE LEARNING SYSTEM, filed Sep. 18, 2017, and (ii) PCT application WO 2018/175098, titled LEARNING COACH FOR MACHINE LEARNING SYSTEM, filed Mar. 5, 2018, both of which are herein incorporated by reference in their entirety.

FIG. 2 is a flow chart for the iterative training process. The training is based on gradient descent or stochastic gradient descent, so the process of this flow chart is similar to any iterative training based on gradient descent. Several of the computation boxes represent computations that are essentially identical to corresponding computation boxes in a flow chart for training a layered neural network. The greatest difference in the implementation of the computation is due to the fact that, during the self-organization, the antichains of the relation < are constantly changing. Therefore, the computation cannot be implemented on any library of learning functions or framework, such as TensorFlow, that requires that the network be precompiled and not be changed during the iterative training.

In boxes 201-207, the computer system implements feed-forward, back-propagation, and update computations for stochastic gradient descent training based on estimating the gradient of the objective with respect to each connection weight by performing for each training data item in a mini-batch, a feed-forward activation computation followed a back-propagation computation of the partial derivatives of the objective, averaged over the mini-batch and used for a stochastic gradient descent update of the learned parameters, the connection weights and node biases. The feed-forward computation, the back-propagation computation, and the iterative update for each mini-batch are well-known to those skilled in the art of training neural networks.

In box 204, the computer system computes the feed-forward activation of each node. That is, for each training data item m and for each node A, the computer system computes act(A,m).

Among other things, in box 205, the computer system computes, for each training data item, the partial derivative of the objective with respect to the input to each node B. That is, it computes $$\delta(B, m) = \frac{\partial J}{\partial \text{input}(B, m)}.$$

In box 206, the computer system determines whether the mini-batch is completed. If the epoch is not completed, then the process returns to box 203 and proceeds as described above. If the epoch is completed, then the process continues to box 207. In box 207, the computer system updates the weight parameter estimates.

In some embodiments, in addition to the normal objective and regularization terms, the objective J may include cost terms from activation targets for interior nodes and regularization from soft-tying node activations and connection weight values in various ways. These additional objectives will be explained further in association with other diagrams.

The quantities act(A,m) (i.e., the feed-forward activation) and $\delta(B,m)$ (i.e., the partial derivative of the objective) are used in various embodiments in boxes 208 and 209 and in other figures.

In boxes 208-210, the computer system performs operations specific to the self-organizing learning process for a set with a strict partial order, based on the concepts discussed in the introduction.

In box 208, the computer system decides whether to add a connection that is in the transitive closure of the current network or delete a connection whose node pair is not a cover pair.

In one embodiment, to decide whether to add a connection from node A to node B to the current network, the computer system makes an estimate of the expected improvement in the objective that may be achieved by a modified network that includes the additional connection. In some embodiments, the connection weight of the new connection is initialized to zero. In these embodiments, the value of the objective in the modified network so initialized is identical to the value of the objective in the unmodified network. Improvement in the objective is then obtained by iterations of stochastic gradient descent that include the connection weight of the new connection as an additional learned parameter.

In one embodiment, this estimated future improvement in the objective is computed as: $\text{VADC}(A,B) = \Sigma_m [\beta \rho_m \text{act}(A, m) \delta(B,m)] / \Sigma_m \rho_m + \gamma$, where VADC(A, B) is the estimated "Value of Adding a Direct Connection" from node A to node B. In the aforementioned expression, $\beta$ and $\gamma$ are hyperparameters, act(A,m) is the feed-forward activation, $\delta(B,m)$ is the partial derivative of the objective with respect to the input to each node B, and $\rho_m$ is a data influence weight used in some embodiments of the invention. The value of $\rho_m$ for data item m may be set by learning coach 220. The summation in m is a summation over a set of data that may be specified by a system developer or that may be determined and adjusted by learning coach 220. In some embodiments, as mentioned in the previous paragraph, when a new connection is added to a network, its connection weight is initialized to zero. If the value of $\rho_m$ is one for all m, the value of $\beta$ is one, the value of $\gamma$ is zero, and the summation is over the data items in the current mini-batch, then VADC(A, B) as defined above is the same as the mini-batch estimate of the partial derivative of the objective with respect to the new zero-valued connection weight for the newly added connection. Thus, VADC(A, B) is a generalization of the gradient descent update computation.

However, in some embodiments, the value of is greater than one and the summation may be over a larger set of data than the current mini-batch. For example, the summation may be over the full batch of all the training data. The value of the hyperparameters $\beta$ and $\gamma$, the range of m, and the values of $\rho_m$ for each m may be set by the system developer or may be determined by the learning coach 220. In various embodiments, the learning coach 220 may set different values for these hyperparameters depending on the current situation in the training. In some embodiments, the data items m in the summation for VADC(A, B) may comprise development data that has been set aside and is disjointed from both the training data and the validation data.

In various embodiments associated with FIGS. 4-7, the learning coach 220 detects a situation of slow learning, such that the magnitude of the estimated gradient has been small for a substantial number of iterative updates. This situation implies that the value of the expression act(A, m)δ(B, m) in the estimate of VADC(A, B) is likely not to change very much over the course of a number of future iterative updates because the learned parameters for the rest of the network are not changing very much. Thus, the total change in the value of the objective will accumulate with similar increments over multiple updates and the value of β is set to estimate the total improvement in the objective due to the new connection from node A to node B over the course of these future updates. Similarly, various embodiments associated with FIGS. 7, 8, 10, 13, 15, and 16 involve processes in which a second network is added to a first network or a collection of networks are merged. In these situations, each network in the set of networks being merged may be pre-trained to convergence or near convergence, which again implies that the values of act(A,m) and δ(B,m) will not change very much for a plurality of future iterative updates. Thus in various embodiments associated with the aforementioned figures, the value of the hyperparameter β should be greater than one. More generally, in the process associated with FIG. 2, the learning coach 220 controls when the process proceeds by looping from box 207 back to box 202 and when, instead, the process proceeds to box 208. In situations in which learning coach 220 postpones proceeding to box 208 until the iterative update of learned parameters of the loop from box 201 to box 207 has converged or approached a stationary point for the current network architecture, learning coach 220 may set a higher value for β as discussed above for the situations occurring in other figures.

The value of γ is an extra correction term set by the system designer or set by the learning coach 220 based on training received by the learning coach 220 from prior experience in estimating the value VADC(x, y) for node pairs <x, y> in similar situations. In some embodiments, such prior experience can also used in training the learning coach 220 to select a value for β.

In some embodiments, learning coach 220 may treat $\rho_m$ for each value of m as a separate hyperparameter. For example, learning coach 220 may use a larger value of $\rho_m$ for a data item m for which there is an error or close call when data item m is used as a recognition target. On the other hand, learning coach 220 may use a smaller value of $\rho_m$ for a data item m for which learning coach 220 detects evidence that data item m is an outlier or evidence that data item m is causing the training to over fit the training data thus producing reduced performance on new data. In some embodiments, learning coach 220 may collectively optimize the vector of values $\rho_m$ using a procedure such as described in association with FIG. 11 or 12.

In box 208, the computer system also decides for a node pair <A, B> with an existing direct connection from A to B, whether to delete that connection. For this decision, the computer system estimates CDC(A, B), i.e., the "Cost of Deleting the Connection" from A to B. The function CDC(A, B) is only defined for ordered pairs <A, B> for which there is a direct connection. In estimating CDC(A, B), the cost of the missed opportunity of improvement in the objective from future updates is estimated similarly to the estimation of VADC(A, B) for a new connection, but with a negative value. In addition, if the current value of the connection weight $w_{A,B}$ is non-zero, there is an additional negative factor for the estimated cost of setting the effective connection weight to zero. In one embodiment, the "Cost of Deleting the Connection" from A to B can be represented as: CDC(A, B)=$-(\Sigma_m[\rho_m \text{act}(A,m)\delta(B,m)]/\Sigma_m\rho_m)*(\beta+|w_{A,B}|)-\gamma$. In the aforementioned expression, $w_{A,B}$ is the weight of the connection between node A and node B. In some embodiments, the extra factor proportional to $|w_{A,B}|$ is reduced or eliminated by using regularization, such as L1 regularization, to tend to drive the magnitude of the connection weight $w_{A,B}$ toward zero. In some embodiments, learning coach 220 may give regularization a higher coefficient for connection weights associated with connections that learning coach 220 might want to delete.

Although not shown explicitly, box 208 also decides whether to freeze the weight parameters of an arc or to activate frozen weights. The considerations for freezing or unfreezing a weight are similar to, but not quite the same as, the considerations for creating or deleting an arc for a node pair (A, B) when A<B in the current strict partial order.

All non-zero weights and all non-frozen connection weights must be included in the DAG G. Any frozen zero-valued connection weight that is associated with a non-cover pair may be dropped from the DAG without changing the computation or the associated partial order.

A zero or non-zero connection weight may be frozen either to save computation and memory or to reduce the number of degrees of freedom to avoid or reduce overfitting. A non-zero connection weight may be unfrozen to allow weight decay to drive it to zero. A zero-valued connection weight may be frozen to keep it at zero so that its associated arc is eligible to be dropped in the self-organizing process. These decisions may be made by fixed rule or with the guidance of a learning coach 220.

As another example of the opportunity to create new arcs, as mentioned previously, the processes that merge two or more networks usually initialize most of the potential cross-connections to be inactive. This situation is similar to the initial training situation described above, except the new arcs might not even be in the transitive closure of the initially merged network, so box 209 will be involved, as well as box 208.

In both of these situations, it may be a good strategy to have policies and design controls that make it easy to create new arcs and to make them active. One embodiment of this strategy is to introduce a specified number of new arcs per updated cycle. These new arcs could be chosen, for example, primarily based on the magnitudes of the partial derivatives of the objective. However, other considerations and trade-offs would also need to be taken into account. This strategy could be implemented by a number of design rules controlled by hyperparameters. In one embodiment, these hyperparameters could be flexibly controlled by a learning coach 220.

This learning coach 220 is a second machine learning system that learns to model the effect of the hyperparameters on the effectiveness of applying the associated learning strategy to the learning process of the first machine learning system. In addition, the learning coach 220 can take additional measurement of the state of the first machine learning system and the rate of progress of its learning and learn to optimize the hyperparameters to achieve the best final performance and learn the optimum network architecture and weight parameters as quickly as possible, with some specified trade-off between these dual objectives.

Another situation in which it may be beneficial to add additional arcs is a situation in which the performance improvement in the learning is relatively slow, especially when that slow performance improvement is accompanied, perhaps caused, by partial derivatives of small magnitude. One possible tactic in such a situation is to make active new parameters that were not active in the previous training and therefore have not been trained to a point of low magnitude gradient. If necessary, these new weight parameters are made available by adding arcs that were not previously present in the network. Thus, this tactic can be applied either to (i) freezing and unfreezing or (ii) adding and deleting arcs that do not change the partial order.

This tactic, however, involves a trade-off. Adding a parameter to the set of actively trained parameters makes that parameter no longer available for this tactic in the future. Therefore, one embodiment of this tactic introduces the new arcs and newly active parameters gradually. The optimum rate of introduction might even be less than one per update cycle.

There also need to be rules and hyperparameter-based controls for deleting arcs and for freezing arc weights.

In one embodiment, these rules and controls take into account the asymmetry between adding an arc and deleting an arc. For a node pair (A, B) for which A<B, an arc can be added at any time without changing the associated strict partial order. In addition, if the arc weight is initialized to zero, the arc can be added without any change to the node activations computed in the feed-forward computation and, therefore, without change in performance and, therefore, without any decrease in performance. This lack of degradation in performance is guaranteed and does not need to be verified by testing the performance even on the training data.

On the other hand, an arc with a non-zero weight cannot be safely dropped from the network. This creates an asymmetry in the ability for a self-organizing network to add or delete arcs. Thus, the rules for creating and deleting arcs need to compensate for this asymmetry.

For example, there may be a bound on the rate at which new arcs can be added dependent on the number of arcs that have been deleted. As another example, in addition to only adding arcs with the largest magnitude objective function partial derivatives, there can be a threshold value not allowing any new arc to be added unless the magnitude of its objective function exceeds the threshold value. The threshold value can be adjusted by fixed rules or by the learning coach 220 to help match the rates of arc creation and deletion to the strategy for the current situation.

The freezing of weights has somewhat different consequences and is done for different reasons than deleting arcs. A weight may be frozen at zero to reduce the amount of computation and memory. It also might be frozen at zero to delay the decision or implementation of deleting the arc. However, a weight may also be frozen at a non-zero value, which does not save as much computation and interferes with deleting the arc. However, freezing an arc with a non-zero weight reduces the number of degrees of freedom, which reduces the ability of the network to overfit the training data. It is a reasonable tactic, especially if the weight has already been trained to what appears to be a satisfactory value, although there is no way to be sure of that conclusion.

Additional trade-offs in strategy and tactics occur when considering box 208 in conjunction with box 209, with a more complex balance between short-term and long-term objectives. At box 209, the computer system decides whether or not to make any changes in the partial order <, and, if so, which changes to make.

As mentioned above, adding arcs with weights initialized to zero never degrades performance. In fact, through subsequent training by gradient descent, it always improves performance, except at a stationary point. Moreover, the selection rule of having a large objective function gradient guarantees that the network with the new arc added will not be at a stationary point. As already mentioned, there is a trade-off between adding an arc for immediate performance improvement and saving it for later when, perhaps, it will have an even greater impact.

Taking account of box 209 makes the trade-off between short-term and long-term objectives of even greater consequence as well as more complex. An arc from node A to node B that has a weight of zero may be dropped from the network without changing the computation. There is no direct gain in performance, but there is a potential long-term benefit. Potential long-term benefits include several different potential benefits: (1) the benefit that is an extension of the tactic mentioned above, in which the arc is taken out of active training long enough so that it is available to again be introduced as a fresh parameter; (2) the benefit of lowering the number of degrees of freedom; and (3) the benefit of potentially reducing the number of side chains, perhaps causing more pairs to become cover pairs and opening up the opportunity to be discussed next.

Dropping the arc from node A to node B, where B covers A, changes the associated partial order. There is no immediate improvement in performance, but it may create new opportunities, perhaps including immediate opportunities to add arcs that previously were not allowed. The potential immediate new opportunity that is easiest to evaluate is the opportunity to create the arc from B to A. When an arc is dropped, the opportunity to create the reverse arc is available only if A and B become incomparable when the arc from A to B is dropped. By definition, A and B become incomparable if there is no node C, such that A<C<B. That is, if B was a cover for A.

The estimated gain or loss from adding the reverse arc from B to A is the sum of the estimated gain from adding the new, reverse connection and the loss from deleting the existing connection, that is VADC(B, A)+CDC(A, B), where the second term is has a negative value. This quantity can be computed by subtracting the indicated terms from the regular computation. It can be computed during the previous update cycle to evaluate the potential of the reverse connection before deciding to drop the arc from A to B. This quantity can also be computed for node pairs (A, B) for which B<A but B is not a cover for A, in which case techniques such as those illustrated in FIGS. 9 and 10 may need to be applied to realize the opportunity for the reverse connection.

When the computer adds an arc between a node A and a node B in box 209, where A and B are incomparable, the computer system creates a new cover pair. Because A and B are incomparable, this new arc can be in either direction, from A to B or from B to A. As measured by the immediate gain, the comparison is between VADC(A, B) and VADC(B, A). Notice that, although these two quantities both represent an arc between the same two nodes with the direction reversed, they are not simply the same quantity with the sign reversed. Their magnitudes may be completely different, and their signs may be the same or different. In particular, one may have a much larger magnitude than the other. For reducing the cost function, which is the objective of the training process, generally the direction with the larger magnitude is preferred, unless the other direction is chosen for some longer-term objective, perhaps under the guidance of the learning coach 220.

This situation, in which two nodes A and B are incomparable, is not rare. In fact, any two nodes in the same layer in a layered feed-forward neural network are incomparable. The network does not compare them because neither one is in a higher or lower layer than the other. Also, when a plurality of networks are being merged, initially there are no cross-connections, so any node A that is in a first network is incomparable to any node B that is in a second network.

Although both box 208 and box 209 are instances of changing and optimizing the architecture of a network by adding and deleting network elements under the self-organizing learning process, there is a sense in which the learning in box 208 is fundamentally different from the learning in boxes 209 and 210. For directed acyclic graph G, consider its transitive closure T and the set of weight parameter vectors for T. It is a convex set. The weight parameter vector for any subgraph of T is also in this set, with some of the parameters set to zero. Adding and deleting arcs in box 208 does not change the value of the global minimum for the graph T. In principle, it is possible to find the global minimum for the graph T just by gradient descent in its parameter space without any self-organizing process. Then, the adding and deletion of arcs and the freezing and unfreezing of zero and non-zero weights can be viewed merely as tactics to accelerate the learning, to escape from regions of slow learning. These techniques may help find the global minimum of T, but they do not change it.

On the other hand, if two networks are associated with different partial orders, the union of their sets of weight parameter vectors is not convex. A parameter vector that is a linear interpolation of a first network with a pair of nodes A and B for which A<B and a second network for which B<A does not in general represent a directed acyclic graph. Finding the global minimum among a set of networks that do not share the same transitive closure is a fundamentally different task. The set of weight parameter vectors is a union of sets that only intersect at a few points that are extrema of the sets for the individual networks. Finding the overall global minimum by a local process, such as gradient descent, requires explicitly switching from one convex set to another. That is, it requires explicitly adding or deleting the arc for a cover pair and, by so doing, switching from one partial order to a different one. This fundamental difference between box 208 and box 209 is the reason that the self-organizing process is best understood in relation to the transitive closure and the associated strict partial order, rather than in relation to the individual directed graphs that share the same transitive closure, as in box 208.

In box 210, the computer system extends the search for a global minimum to networks with differing numbers of nodes. This exploration requires additional techniques, which are detailed in FIG. 3 and later figures.

In box 210, the computer system adds nodes to the network. In box 210, the computer system may also drop nodes, but that process is more complicated and requires a separate discussion. Techniques related to box 210 are discussed in more detail in many of the other figures. FIGS. 3-6 and 14 discuss techniques primarily aimed at adding a single node or a small number of nodes. FIGS. 7, 8, 10, 13, 15, and 16 discuss techniques primarily aimed at combining two or more networks. Some of these figures discuss both kinds of techniques.

Safely adding a node or a network to an existing network is an extension of the technique for adding an arc. Any number of nodes may be added to an existing original network without changing the current computation of the existing network by initializing all the directed arcs from the new nodes to nodes in the original network to have weight values of zero. Then, any changes in these weights are done by gradient descent, so the performance of the expanded network on training data will always be at least as good as the performance of the original network.

Adding and deleting nodes is even more asymmetrical than adding and deleting arcs. As explained above, new nodes or entire networks can be safely added to an existing network without requiring any special conditions. In that sense, adding one or more nodes is even easier than adding an arc from node A to node B, which requires that either A <B or that A and B are incomparable. In addition, adding a node does not restrict the self-organizing process as much as adding a new cover pair. The expanded network is initialized to perfectly imitate the computation of the original network, and it can imitate any changes in that network.

On the other hand, adding one or more nodes to a network always involves potential trade-offs, at least in the amount of computation. The decision to add nodes should be made in the context of the goals of the learning task and the overall strategy for achieving these goals. For example, the goal may be to build as large a network as can be managed as a research platform. In that case, a very aggressive strategy of adding extra nodes at any reasonable opportunity and never dropping a node may be utilized. The criteria for an opportunity to be reasonable can be flexible and can be based on the judgement of the designer or may be controlled by a learning coach.

Since any expanded network can imitate its original network, there is no absolute restriction on adding nodes. In one possible embodiment, opportunities to add nodes could be selected at random. However, some strategies for adding nodes may be more productive than others in more quickly leading to a network architecture that trains to a given level of performance. In some embodiments, the criteria for a reasonable opportunity to add nodes are based on the criteria associated with one or more of the figures listed above, such as FIGS. 3-8, 10, and/or 13-16.

On the other hand, dropping a node or a collection of nodes without changing the computation requires that all the directed arcs from the node to be deleted have weight zero. This condition can be achieved incrementally by driving weights to zero one at a time, for example by L1 regularization, and dropping the arc when its weight gets to zero. However, that is a cumbersome process.

Another embodiment for dropping nodes is to simply drop nodes in spite of the fact that the reduced network cannot exactly duplicate the computation of the original network. This embodiment can be implemented as an exploratory process, including dropping and adding nodes to the network as an instance of reinforcement learning, perhaps with the reinforcement learning implemented as part of the learning coach 220.

Yet another embodiment is to train a network with one or more nodes dropped to imitate the original network. Training a second network to imitate a first network is a special case of machine learning that can be used with any two machine learning systems. The machine learning systems do not need to be self-organizing partially ordered networks or any other specific technology. The two systems do not need to use the same technology as each other. The second system does not need to be a restricted version of the first system. The capabilities of the second system may be a superset of the capabilities of the first system, or they may be a proper subset.

Imitation training consists of training the second system to make the same classification as the first system on a set of training data that includes all the labeled and unlabeled data that is available for the first system and an unlimited amount of other data that can be created by one or more generators or by random perturbations, transformations, and distortions of the available labeled and unlabeled data. In this special imitation training task, there is no need for the data to be labeled, because the training labels for the second system are the classifications made by the first system, regardless of the values of the "correct" labels, whether they are known or not.

Thus, one embodiment for dropping nodes in a SoPoNet is a try-and-test methodology: the computer system selects nodes to drop by any chosen criterion and then train the reduced network to imitate the original, larger network as well as possible. Based on a cost/performance or other objective, the computer system adopts the trial reduced network or performs another trial.

This discussion of embodiments for dropping nodes is included for logical completeness. Generally, the primary embodiment will be in the range from a relatively conservative addition of nodes to a relatively aggressive addition of nodes, with little or no attempt to drop nodes.

Box 210 completes the operations that are done for each mini-batch. If there are no changes for the computer system to make in box 210, box 209 may complete the mini-batch. If there are no changes for either box 210 or 209, then box 208 may complete the mini-batch. In each case, control returns to box 211.

In box 211, the computer system continues with the next mini-batch or, if the process is at the end of the epoch, it passes control to box 212.

In box 212, the computer system checks to see if a stopping criterion is met. If so, it terminates. If not, it starts the processing of the next epoch. Stopping criteria includes reaching a specified limit in the number of epochs, achieving a specified target error rate, or converging to a stationary point.

Figure 3:
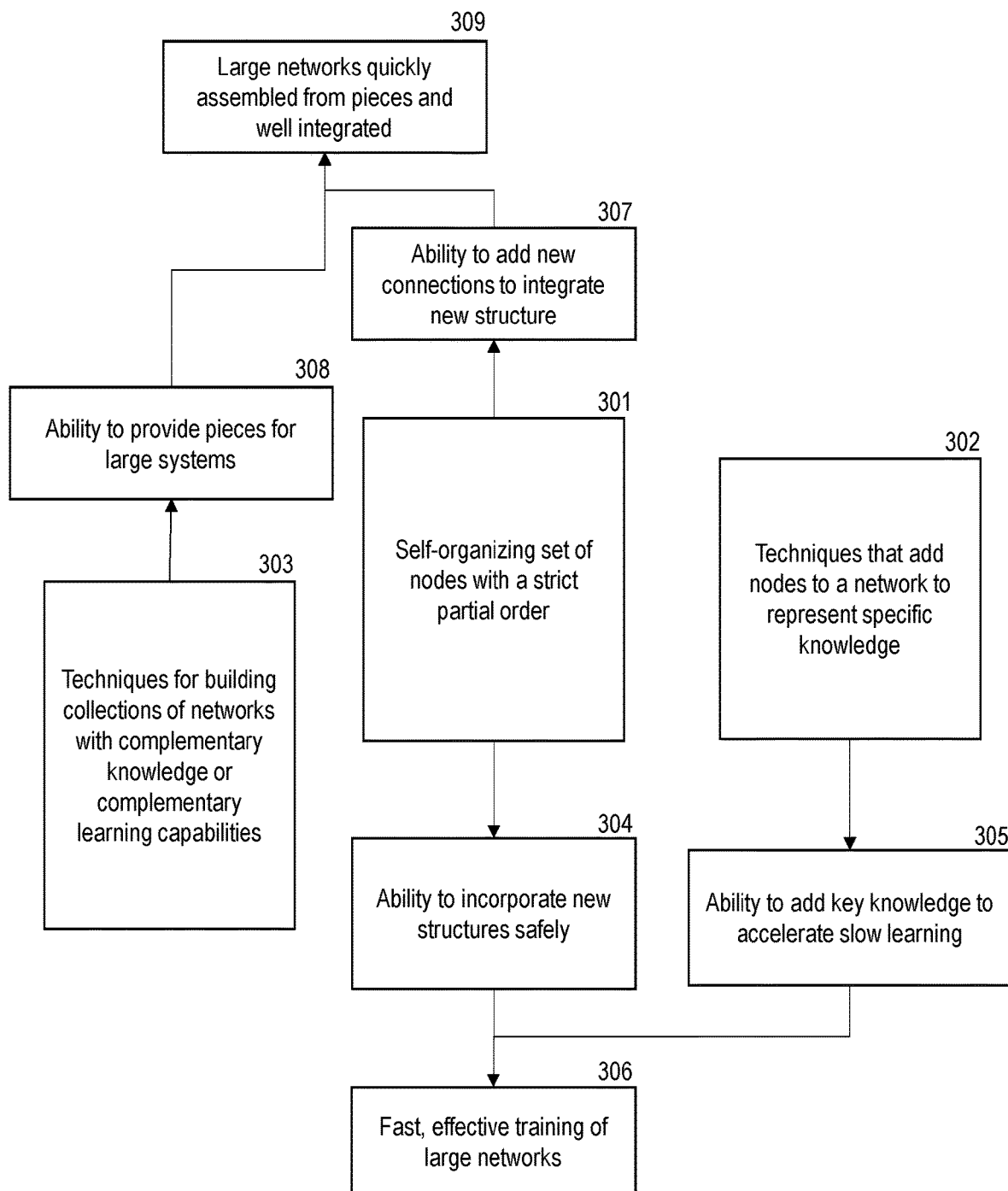
FIG. 3 is an organization chart showing relationships among procedures and abilities introduced in other figures.

FIG. 3 is a block diagram indicating how the various techniques discussed herein are linked to each other or can be utilized in connection with each other to create or effectuate particular capabilities. The arrows in FIG. 3 indicate how particular techniques (as indicated by boxes 301-303) can provide particular capabilities (as indicated by boxes 304, 305, 307, and 308) for a nodal network, which in turn can be combined to provide new or additional capabilities (as indicated by boxes 306 and 309) for the nodal network. In sum, FIG. 3 provides a framework in which to consider and compare the various techniques described herein, such as adding one or more nodes to an existing SoPoNet, as discussed in association with box 210 of FIG. 2.

The end purpose of all the techniques described in association with FIGS. 4-16 is to build and train a network with better performance. Even without box 210, FIG. 2 represents a powerful learning mechanism for a SoPoNet to learn the best performing architecture for a given number of nodes. Most of the techniques in FIGS. 4-16 involve adding nodes to a network or combining two or more networks into a larger network.

These are example implementations of box 210.

However, these techniques should not be viewed merely as ways to build a larger network. For many of these techniques, the primary purpose is to overcome problems that slow the learning process or that limit the performance achieved in training large networks.

Many of the techniques specifically address situations in which the progress of learning in an existing network is very slow. This slow learning is a very common occurrence. It is a natural consequence of optimization by gradient descent in a complex system with many parameters. It is not unique to the training of artificial neural networks or SoPoNets. Gradient descent is very good at making progress whenever some of the partial derivatives of the objective have significant magnitude. In effect, that means that gradient descent is also very good at finding regions in parameter space in which the magnitudes of all the partial derivatives are small.

The techniques of FIG. 4-16 provide means to escape from such regions. This property may be viewed as an extension of one of the advantages of self-organizing partially ordered networks. The regions of slow learning also occur in training the weight parameters in a network with a fixed set of arcs. The ability of a SoPoNet to add arcs provides a means to escape from these regions of slow learning. Adding nodes provides an additional means to escape from regions of slow learning.

The techniques of FIG. 4-16 also provide means to fix other problems that may be detected during training. Thus, at boxes 401, 501, 601, and 701 the computer system may also detect other criteria in addition to slow learning. Examples of criteria detected by the computer system at these boxes include: (1) detecting that for a specified number of iterative updates, the magnitude of the estimated gradient of the objective has been less than a specified value; (2) detecting that the performance on training data is better than the performance on a set of development data set aside for validation testing during development, which is an indication of overfitting, especially when the difference in performance on training data and the performance on development data increases with additional training; (3) detecting that the system continues to make an error on a given item of training data over multiple epochs of training; and (4) detecting that the performance of the system is worse than the performance of another system or of an ensemble of other systems, especially if the performance difference is greater than a specified amount.

Note that, for simple systems, the performance of a single system may often be significantly worse than the performance of an ensemble. However, for a large neural network with many layers, such a condition may indicate a problem in the network architecture or in the training process. Therefore, in some embodiments, the criteria for detecting problems in FIGS. 4-16 may include criterion (4) with the comparison against an ensemble. The correction actions in some embodiments, for example those illustrated in FIGS. 7 and 8, merge two or more networks, making the capabilities of the system being trained comparable to the capabilities of an ensemble.

It is important to note that the regions of slow learning include regions near a local or global minimum. In this context, the "global" minimum is only optimum relative to the defined, limited parameter space. The global minimum in the parameter space of connection weights for a network with a fixed set of arcs is not necessarily a global minimum in the parameter space for a network with additional arcs. In fact, if the quantity VADC(A, B) is non-zero, it means that the current point is not even a local minimum in the parameter space that includes the weight parameter for the new arc. All the techniques of FIGS. 4-16 extend this property to the case of adding nodes as in box 210 of FIG. 2. That is, any technique for accelerating learning by escaping from a region of slow learning also becomes a technique for improving the final performance when applied to escaping from the region of a local or global minimum that was only a minimum relative to the previous, limited parameter space.

FIG. 3 provides a framework for organizing and understanding some of the techniques of the later figures. Box 301 represents a self-organizing set of nodes with a strict partial order, as described in association with FIGS. 1 and 2. Box 302 represents a collection of techniques for accelerating learning in a network by adding one or a small number of additional nodes that supply key knowledge to enable gradient descent to quickly find a path to a higher level of performance. These techniques are described in association with FIGS. 4-6. Box 303 represents techniques for building collections of networks with complementary knowledge or with different architectures that produce complementary learning capabilities. These techniques are based on the ability of self-organizing networks with strict partial ordering to represent the combined networks and to integrate the pieces by automatically building cross-connections. These techniques are described in association with FIGS. 7,8, and 15.

The rest of FIG. 3 illustrates a few of the ways these techniques enable each other and create new capabilities when combined. Self-organizing partially ordered networks, represented by box 301, have been described in association with FIGS. 1 and 2. Their ability to change their network configuration means that their training is less likely to get stuck in a local minimum because they can escape from a parameter setting that might be a local minimum in a fixed architecture by changing the architecture. However, they still may have long intervals of slow learning characterized by plateaus in performance. This phenomenon is not specific to self-organizing partially ordered network training. It is a phenomenon of gradient descent in general when applied to optimizing large complex systems. By its very nature, gradient descent is very local and myopic. The gradient only measures an infinitesimal region around the current point.

For example, gradient descent cannot see that adding a single node or a small number of nodes might provide a small but key bit of knowledge that would allow rapid progress to a higher level of performance. The techniques in box 302, on the other hand, can represent such small pieces of knowledge with a single node or a small number of nodes. This knowledge can be trained quickly, often with one-shot learning.

The techniques in box 302 cannot build large networks by themselves. However, as indicated by the link to box 305, they have the capability to supply that knowledge to any system capable of learning large networks and capable of safely incorporating new knowledge supplied in the form of additional structures added to the network. As indicated by the link from box 301 to box 304, self-organizing partially ordered sets have precisely this capability, where "safe" incorporation of new knowledge means building or training a network incorporating the new structure with a guarantee of no degradation in performance. As indicated by box 306, the combination of the capability in boxes 304 and 305 provides the means for fast, effective training of large networks. Examples of the capability to add knowledge to accelerate slow learning stages are illustrated in FIGS. 4-7.

The techniques represented by box 303 can build collections of networks with complementary knowledge, but these techniques lack the ability to integrate these network except by simple techniques, such as ensembles. However, as indicated by the link to box 308, these networks with complementary knowledge provide pieces that, if well integrated, could be quickly assembled into a powerful larger network. As indicated by the link from box 301 to box 307, self-organizing partially ordered networks provide the required network integration ability. As indicated by the links to box 309, together these capabilities provide the ability to quickly assemble large networks from complementary pieces and integrate them.

Figure 4:
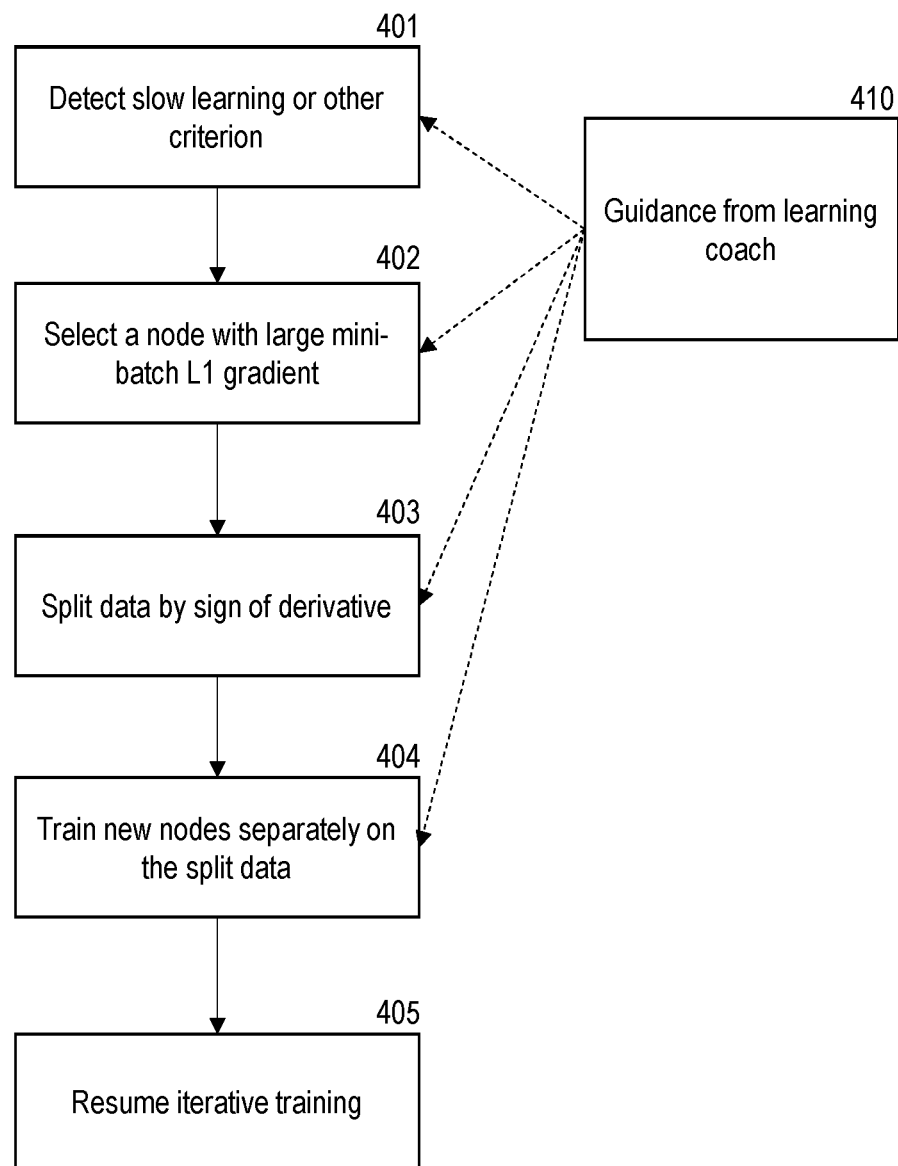
FIG. 4 is a flow chart of one procedure for accelerating the learning during an interval of slow learning.

FIG. 4 illustrates one of the techniques represented by box 302 of FIG. 3. In box 401, the computer system detects a condition of slow learning or some other criterion specified by a design rule or by learning coach 410. Box 401 is similar to boxes 501, 601, and 701 in FIGS. 5, 6, and 7, respectively. In each of these boxes, the computer system starts a process that adds one of more nodes to a network. Accelerating the learning in a situation in which the current progress is very slow is one of the reasons for adding nodes to the network. Boxes 401, 501, and 601 each have additional criteria that is specific to their respective procedure. A more detailed discussion of determining the situation of slow learning is presented in association with box 701.

The technique of FIG. 4 is especially broad in its range of potential application. It can be applied to any node at any time, so detection of a condition of slow learning is not essential. To make this broad applicability clear, boxes 404 and 403 will be discussed before returning to boxes 401 and 402.

Given any node in the network, in box 404, the computer system makes two new nodes that are initialized from that node. The two new nodes are added to the network and the original node also remains. The two new nodes have their input weights initialized to be the same as the input weights for the original node and their output weights initialized to zero. Since the original node is still present, this initialization means that the expanded network originally computes the same activations as the original network.

With the help of box 403, in box 404, the computer system then trains the two nodes to be different from each other and from the original node from which they were created. In box 403, the computer system separates the data into two sets, based on the sign of the derivative of the objective function with respect to the activation of the node. Various embodiments are possible with variations of this rule. For example, the data may be split into three subsets, including one in which the magnitude of derivative is close to zero. As another example, two or more nodes may be analyzed together, with the data split by clustering the data according to a clustering of the directions of the gradient vectors. When the data is split into more than two subsets, more than two new nodes may be created. However, in the example embodiment, the data is simply split into two subsets based on the sign of the derivative of the objective with respect to the activation of a single node.

In box 404, the computer system, or a separate learning coach, then supervises training in a special training period, during which the rest of the network may be frozen or may be trained normally, but each of the new nodes only receives back-propagation information, respectively, for only one of the two subsets of data. Because the data is selected to have partial derivatives with different signs, the input weights to the two nodes will train in different directions. In one embodiment, during this special training period the back-propagation is not propagated back to beyond the input arcs to the new nodes. The directed arcs leaving the two new nodes can be trained during this special training period, allowing back-propagation through each new node to its input weights. However, in one embodiment, the weights for these outgoing directed arcs are re-initialized to zero after the end of the special training period. This embodiment assures that the expanded network at this point still makes the same computation as the original network. At this point, the expanded network with the new nodes resumes normal training.

Returning now to box 401, it can be seen that the process of boxes 403 and 404 will create two new nodes that compute and represent information that generally would not be available to the original network. This is especially true if the derivative of the objective function with respect to the activation of the original node was of small magnitude, when averaged across the entire data or a representative subset such as a mini-batch, while the magnitudes of the derivatives for at least some of the individual data examples are large.

In the case of slow learning, the magnitude of the gradient is small, so the magnitude of the partial derivative of the objective with respect to any of the nodes is small. Thus, in box 402, the computer system may choose one or more nodes with large values for some norm of the partial derivative of the objective function with respect to the activation of the node expressed as a vector with a component for each data example in the representative set. For example, the L1 will maximize the sum of the absolute value of the derivative for one of the two new nodes plus the absolute value of the derivative of the other new node. Thus, the training of the expanded network will get off to a fast start while the new nodes quickly train to be different from each other and from the original node.

However, in boxes 403 and 404, the computer system can apply a similar process to any node at any time in the training. The two nodes will train to be different from each other and from the original node in every case, except the extremely rare case in which the partial derivative of the node is zero for all the data examples or if the sign of the derivative is the same for all data examples.

If the sign of the derivative is the same for all data examples, the original node will be back-propagating large magnitude derivatives, so there is probably no need to introduce new nodes. Nonetheless, the technique can still be applied by having box 403 split the data around a non-zero value, such as the median or mean of the derivative values.

In box 405, the computer system resumes the normal iterative training on the expanded network.

Figure 5:
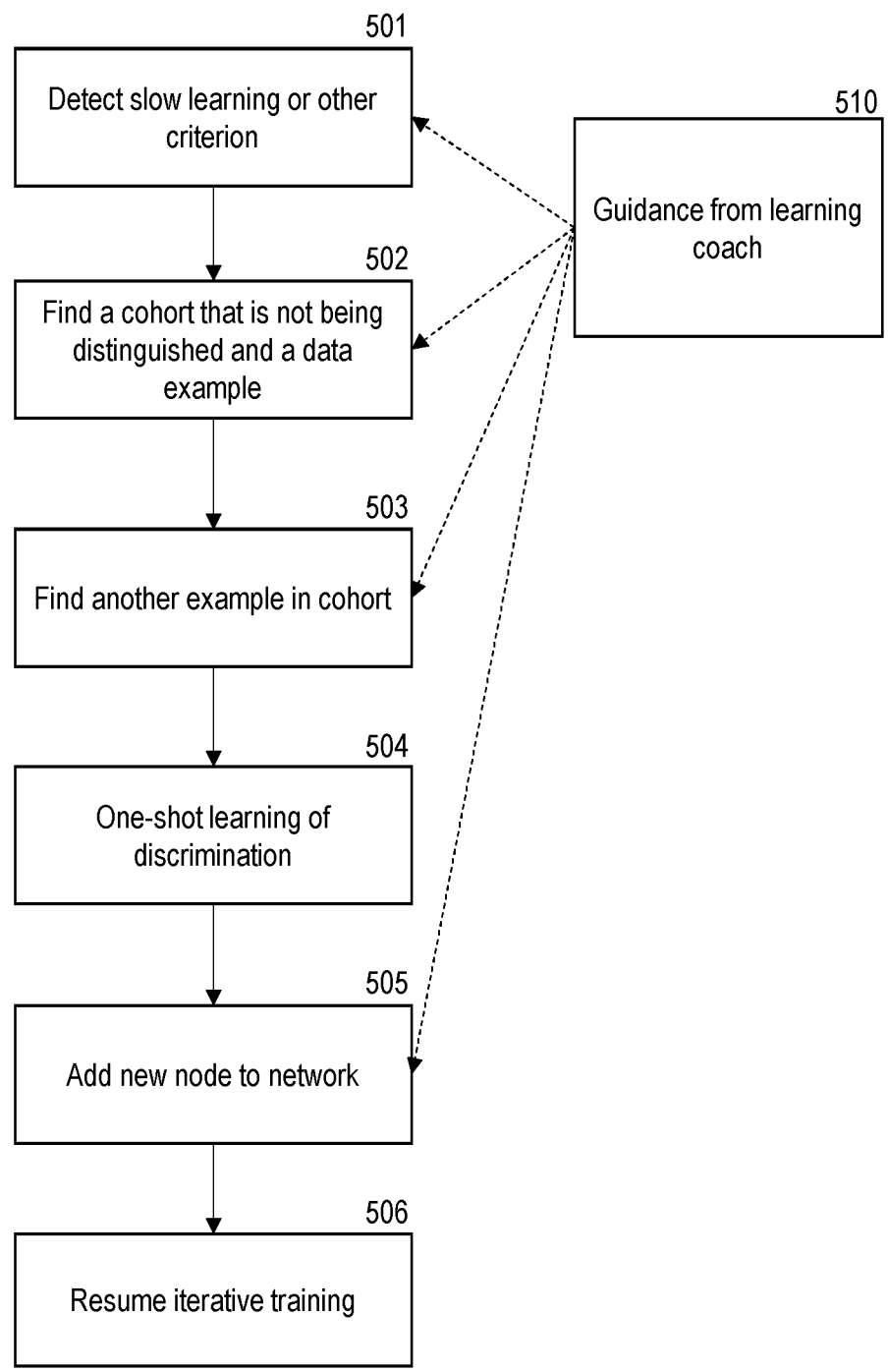
FIG. 5 is a flow chart of a second procedure for accelerating learning during an interval of slow learning.

FIG. 5 illustrates an aspect of the invention that deals with the situation in which the network has learned to distinguish a set of data examples from other examples, but not from each other. The set of data examples that is distinguished from other examples will be called a cohort. If all members of the cohort are in the same classification category, there is no problem. Otherwise, the inability to distinguish within the cohort always causes at least one error if ties are counted as half-errors.

A characteristic of this situation is that the network converges toward weight parameters in which, for each example in the cohort, the output activations are concentrated on the categories that are present in the cohort, but the output activations do not converge to zero or one. Instead, the output activations converge toward $m_c/N$, where N is the number of data examples in the cohort, and $m_c$ is the number of examples in the cohort with category c.

Box 501 is similar to box 401, except in box 501, the computer system may either detect that the learning is slow, or it may directly detect the characteristic output activation for a cohort described above. If in box 501 the computer system did not directly detect a cohort that is failing to be distinguished, then in box 502 the computer system looks for such a cohort and for a data example in that cohort that is being misclassified. For example, in box 502, the computer system can look for a data example whose output activation is converging to a value m/n, where m≤n/2. This condition implies that the system is converging to a point in which the data example is misclassified, and the situation has the characteristic of a cohort whose members are not being distinguished. For example, in box 502, the computer system can check that the output activation of the other output categories are also converging to values that are multiples of 1/n, for the data examples in the cohort.

In box 503, the computer system finds another member of the cohort. For example, it may find another data example for which the output activations are converging to the same values as in the first data example. The first data example may be in more than one cohort of the same size, but that does not matter because in box 503, the computer system only needs to find one other member of any one of those cohorts.

In box 504, the computer system creates a node that distinguishes the two data examples. For example, it can set its input weights and bias to make a linear discriminator at the perpendicular bisector between the two data examples. This initial setting for the weights is called "one-shot learning" because the initial weights depend just on the two data examples and are already sufficient to distinguish those two examples. The bias is then adjusted to the value required for whatever non-linear activation function is desired for the node. In one embodiment, the input values for this linear discrimination will be input values for the network or a subset of those input values. However, the input values to this new two-example discriminator may be the activations of any set of nodes in the network, depending on rules set by the designer for by a learning coach 510.

In box 505, the computer system adds the discrimination node created by box 504 to the network by adding one or more outgoing arcs with weights initialized to zero. Note that if the new node A receives input only from the input layer of the network, it will still be incomparable to any other node B in the network. Therefore, at box 505, the computer system may, for example, select one or more nodes B for which the magnitude of VADC(A, B) is large. Alternately, it may connect the new node to any other node B based on a criterion set by a design rule or by the learning coach 510.

In box 506, the computer system then resumes normal iterative training. Note that the system will immediately be learning to correct at least the error on the data example found in box 502, so the performance is guaranteed to be improving, and the learning process will have escaped the situation of slow learning.

Figure 6:
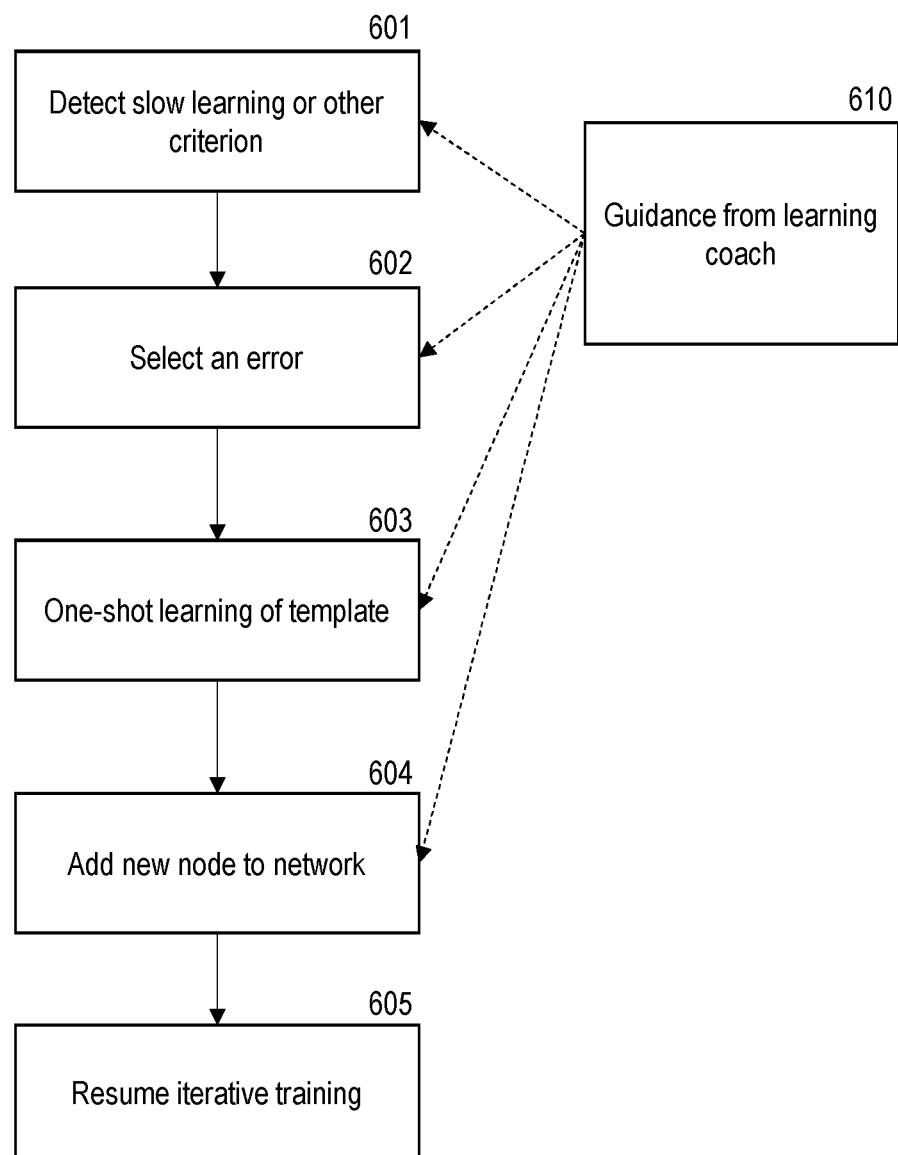
FIG. 6 is a flow chart of a second embodiment of the learning acceleration procedure shown in FIG. 5.

FIG. 6 illustrates another type of one-shot learning. However, the technique in FIG. 6 only requires one data example for which a classification error is made, so it can be applied in essentially any situation. In box 601, the computer system detects a condition of slow learning or simply detects an error example or any other criterion set by design rules or by the learning coach 610. If it has not already been done in box 601, in box 602, the computer system selects a data example on which a classification error is being made.

In box 603, the computer system builds a template model based on the selected data example. In one embodiment, the template model will be a parametric model such that its parameters can initially be estimated from the data example selected in box 602 or 601. In some embodiments, the template model will also be such that its parameters can be updated as more data examples are assigned as instances of the model. In some embodiments, the template model may also be able to reject data examples that are given as examples that are outside the target set.

The template model may be a complex model represented in its entirety as a single node in the network, or it may be a network of nodes that performs the equivalent computation or an approximation to it. For example, the template model may be that the data example is generated by a Gaussian distribution. The initial estimate for the mean of the Gaussian distribution is simply the data example itself. The initial estimate for the covariance matrix may be the identity matrix or any other initial matrix specified by design rules or by the learning coach 610. The Gaussian model may be restricted to have a diagonal covariance matrix or to have a covariance matrix or inverse covariance matrix with a limited number of non-zero diagonals in addition to the main diagonal.

Updates to the model may be made, for example, by maximum likelihood estimation of the Gaussian distribution. The Gaussian model may be integrated into the network by supplying the value of the negative exponent in the Gaussian probability density function and a trainable bias term to a node with an exponential activation function, so that the output of the node is in the range 0 to 1 with the value 1 for the given data example. For $$ac(x) = \exp\left(-\frac{x}{T}\right),$$

example, the activation function may be of the form where T is a temperature parameter, which may be either a trainable parameter or a hyperparameter controlled by learning coach 610.

The probability distribution for the template model could be chosen from any other exponential family.

As another example, the model may be based on any distance metric with the distance value as the input to a node with a negative exponential activation function.

Other embodiments may implement similar computations with a network of nodes. For example, a network may have a first layer with one node for each input variable. Each first layer node k would have an input from its designated input variable $x_k$ and a bias $b_k$. The node activation function would be some measure of absolute difference, for example $(x_k-b_k)^2$ or $|x_k-b_k|$. The outputs of this first layer would then be connected to a node that would compute a weighted sum of the outputs of the first layer and have a negative exponential activation function with a bias and optionally with a temperature parameter or hyperparameter. The weights and biases of this network would be trained by the normal gradient descent training.

In any of these examples, there is a node with an activation function with values in the range 0 to 1 and with initial parameters such that the activation of the node is 1 for the selected data example. In box 604, the computer system adds this node to the network with outgoing arcs with initial weights of zero. As with box 505 of FIG. 5, the outgoing arcs could be connected to nodes based on the magnitude of VADC(A, B). In box 605, the computer system resumes the iterative training.

Figure 7:
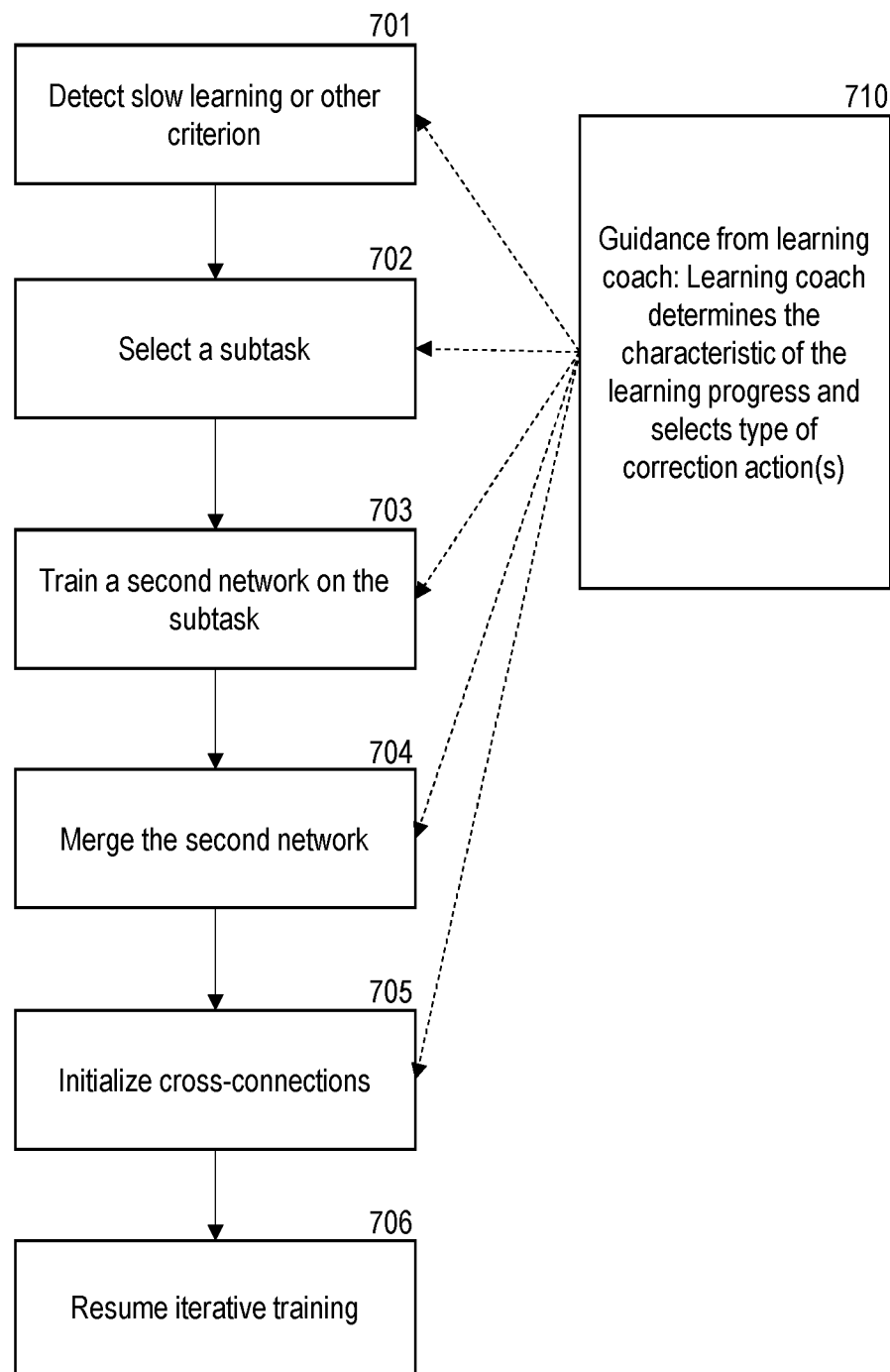
FIG. 7 is a flow chart of a third procedure for accelerating the learning during an interval of slow learning.

FIG. 7 illustrates a more general implementation of the principle of adding new knowledge to a network that is in a condition of slow learning and is an example of the techniques represented by box 303 in FIG. 3. The procedure illustrated by FIG. 7, however, is more complex and requires more resources than the procedures illustrated by FIGS. 4, 5, and 6, so the detection of slow learning or other criterion for triggering the process of FIG. 7 will be discussed in more detail.

A condition of slow learning is significant only if it persists for a long period, that is, for many update operations. However, it is of little value to detect the condition of slow learning by waiting to see how long it persists. Therefore, it is important to have criteria that can more quickly detect that a potentially persistent condition of slow learning exists.

First consider the cohort example of FIG. 5. Without intervention gradient descent updates will just continue converging toward output activations of the form $m_c/N$. This condition of slow learning will persist indefinitely and be of very little value. A similar condition might exist from other causes without the telltale activation pattern of the confusable cohort. How can such a condition of slow, unproductive learning be detected when produced by unknown causes?

An obvious indicator that the learning is slow is that the magnitude of the gradient is small, though that begs the question of how small is "small" and what magnitude is "normal"? In one embodiment, a learning coach 710 is trained to determine the threshold between small and normal, but a fixed threshold may be used in some other embodiments.

An indicator that the learning is not merely slow but that the condition will persist is that the magnitude of the gradient is not only small but that the magnitude is consistently decreasing.

When comparing the magnitude of the gradient from one update to another, it may be necessary to take account of the distinction between the true gradient and the mini-batch estimate of the gradient. Stochastic gradient descent based on mini-batches can be used instead of full-batch training primarily because mini-batch training allows many updates per epoch. If the learning is very slow, it may be more important to diagnose and escape from a condition of slow learning than to have more unproductive updates per epoch. It is certainly unproductive to have more updates if they are merely converging to a local minimum.

In one embodiment, the process illustrated in FIG. 7 increases the mini-batch size in any condition of slow learning that meets a criterion set by the learning coach 710.

With full-batch training, the gradient estimate is exact, rather than a stochastic estimate. Therefore, if the step size is sufficiently small, the performance is guaranteed to improve for each update (with some exceptions due to the limited precision of floating point numbers), rather than randomly fluctuate depending on the specific data examples in each mini-batch.

When converging to a local or global minimum, the magnitude of the gradient also typically decreases consistently as the system approaches the minimum. In contrast, on a plateau with a small magnitude gradient and slow learning, the magnitude of the gradient remains small but does not consistently decrease. The magnitude of the gradient often begins to increase as the system approaches the edge of the plateau. At the edge of the plateau, there is typically an interval of very rapid learning.

When the system is on such a learning plateau, it is desirable to find the edge of the plateau more quickly but to avoid any procedure that will cause the learning to miss the plateau edge. For example, merely increasing the learning rate parameter to a high value raises the danger of jumping right past the region of better performance.

In balancing these objectives, there are several means of escape from a condition of slow learning:

1. Unfreezing and activating a frozen connection weight (box 208);
2. Adding a directed arc from A to B where A<B in the current partial order (box 208);
3. Adding a directed arc from A to B where A is incomparable to B (box 209);
4. Driving connection weights to zero and dropping arcs to make it possible to add an arc from node A to node B in spite of the fact that B<A in the current partial order;
5. Splitting a node and adding two new nodes based on a data split (box 210, FIG. 4);
6. Adding a cohort discrimination node (box 210, FIG. 5);
7. Adding a template node (box 210, FIG. 6); or
8. Adding a network for a subtask (box 210, FIG. 7).

In determining which corrective action to take, various embodiments of the learning coach 710 apply other information in addition to the current magnitude of the gradient and its rate of increase or decrease. For example, the learning coach may have a performance target. For example, it may know the learning rate that has been achieved on similar tasks. For a benchmark task, it may know the current record on the task and be trying to beat that record by any means possible. In contrast, it may know the performance on a task achieved by a network that is desirably expensive and be trying to approach that performance with a smaller network.

In addition, most of these potential actions have a means of estimating the benefit from the given action. For example, the derivative of the objective with respect to the connection weight for a potential arc from A to B may be computed for actions (1) through (4).

The benefit of the node splitting can be estimated from the magnitude of the norm of the vector of partial derivatives. This norm can be computed for each node in the network to find the nodes with the largest norms.

For actions (6) and (7), a specific error is being corrected.

In boxes 702-704, a subtask will be selected by the computer system, a network will be trained to do that task, and that network will be merged with the current network. These actions can be viewed and evaluated as an extension and generalization of the actions of (6) and (7).

Thus, in an embodiment, in box 702, the computer system selects a discrimination task that will either correct one or more errors or that will provide information that seems likely to make it possible to correct errors. For example, if errors are being made on data examples that are correctly classified by some other machine learning system, in box 702, the computer system may select the task of trying to match the performance of the other machine learning system on those data examples.

In box 703, the computer system trains a SoPoNet on the selected subtask. In boxes 704 and 705, the computer system merges the new network and the original network, selects the initial connection arcs, and initializes their connection weights to zero. The initial connection arcs are selected based on the value of VADC(A, N). Initially, all cross-connections will go from a node in the new network to a node in the original network because the new network is not yet connected to the output with non-zero weights, so it does not yet have useful back-propagation information. Once the new network has non-zero weights connecting it directly and indirectly to the output nodes, directed arcs may also be added from the original network to nodes in the new network. In box 706, the computer system resumes the iterative training of the expanded network.

Figure 8:
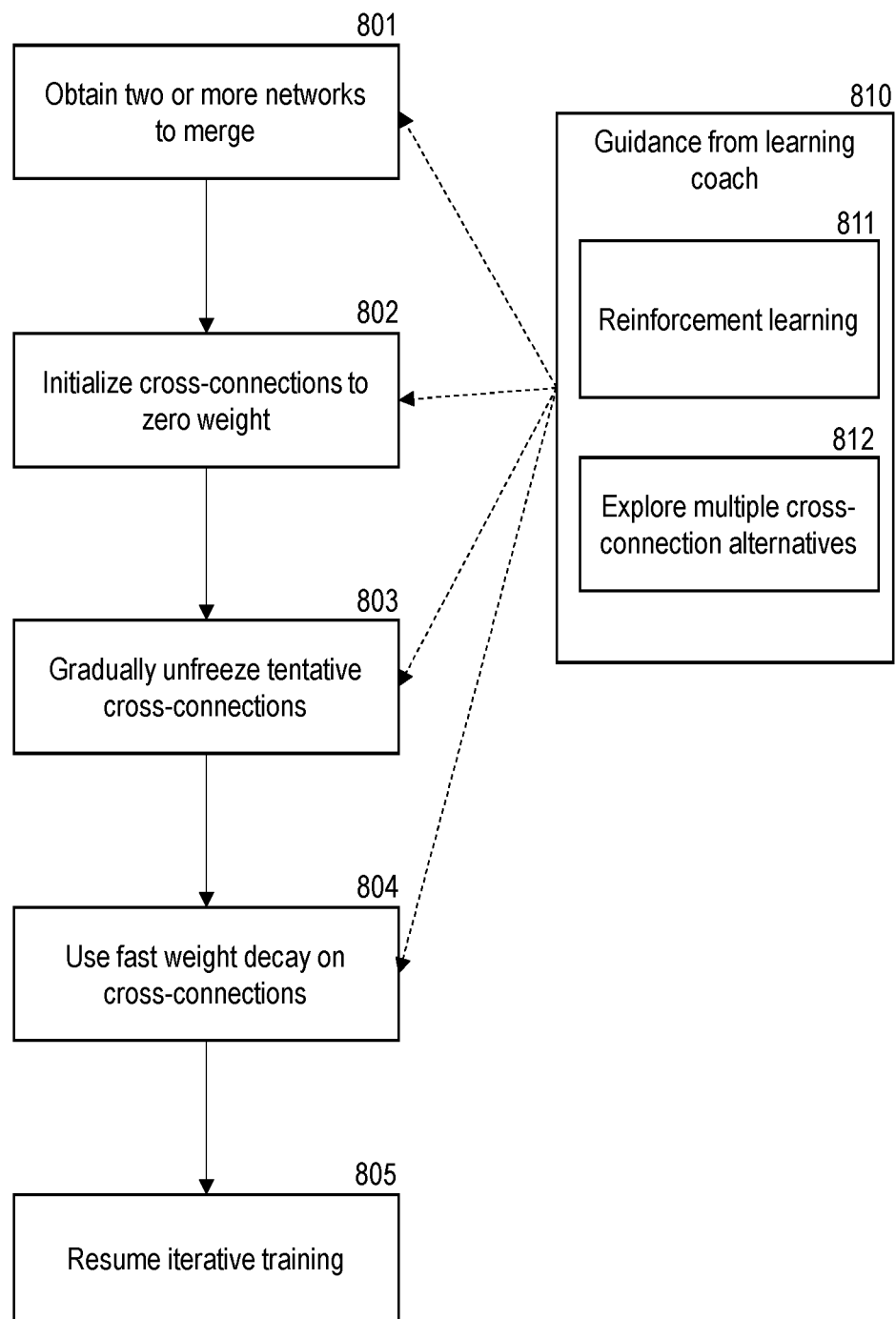
FIG. 8 is a flow chart of a process for merging two or more self-organizing partially ordered networks.

FIG. 8 illustrates another of the techniques represented by box 303 in FIG. 3. In box 801, the computer system obtains two or more networks to be merged. These may be networks that have already each been trained to do the full classification task. In particular, they may be members of an ensemble of classification networks. Especially in the case of merging an ensemble, more than two networks will be merged at once. Thus, the process illustrated in FIG. 8 has a different context than the process illustrated by FIG. 7 and uses different criteria in creating cross-connections among the merged networks.

The evaluation of potential directed arcs cross-connecting nodes in one network with nodes in another network is symmetrical. The directional derivative can be evaluated in either direction. Initially, the networks being merged work independently, with no cross-connections. The transitive closure graph is just the union of the separate transitive closure graphs.

Any cross-connection may add many arcs to the transitive closure. That is, adding a single cross-connection may add many node pairs to the partial order and thus restrict those node pairs from having a connection in the opposite direction. Therefore, the initial cross-connections should be chosen carefully.

In box 802, the computer system creates a partially ordered set consisting of the union of the sets of nodes in the two or more networks selected in box 801. Initially, there are no covers from one of the networks to another, but every pairing of a node in one of the networks is considered as a potential cover or cross-connection. Implicitly, all the connection weights are initialized to zero and are inactive.

In box 803, the computer system evaluates potential new covers by a process similar to that described in association with boxes 208-210 of FIG. 2. In box 803, the computer system may be at first conservative in adding new connections to allow the self-organizing process the freedom and flexibility to discover the best configuration. For example, if sparseness of connections is being enforced by a quota, the computer system, at box 803, does not immediately fill that quota. Alternately, in box 803, the computer system initially imposes a higher numerical threshold on the gradient cross product for accepting a candidate new cover from one subnetwork to another. Gradually, in box 803, the computer system creates more covers among the merged networks and activates their connection weights.

In box 804, the computer system uses a relatively fast weight decay for the initial learning period for the merged network, again with the objective of avoiding implicitly making firm configuration decisions prematurely. In box 805, the computer system resumes normal iterative training, with box 803 initially continuing to be more conservative but gradually adjusting to normal training conditions.

In addition to the conservative approach of boxes 803 and 804, learning coach 810 may actively manage the exploration process, as indicated by box 812. For example, learning coach 810 may implement an exploration based on reinforcement learning 811. Learning coach 810 may use its prior experience to evaluate the likely future performance from choices to create certain covers or cross-connections among the networks being merged. It may have a policy function for the creation, and possibly the deletion, of covers and apply Q learning to the exploration process.

In general, it is not fair to compare the length of the longest chain in a self-organized partially ordered network with the number of layers in a layered neural network, but there is a special case of the technique illustrated in FIG. 8 for which such a comparison seems fair.

In this special case, the networks to be merged are N copies of the same network. As a special instance of this case, the network to be copied and merged is a conventional layered neural network with K hidden layers. Before merger, let the N copies be trained as an ensemble. Let the output nodes of the component networks still be connected to the output target values. Build a new network by stacking the N copies one at a time on top of the previous stack. Let the input nodes of the former component networks still be connected to the input data, regardless of how high they are on the stack. As cross-connections, let the layer next to the output layer of each neural network be connected to the layer just above the input layer of the next neural network, initialized with zero-valued weights. In addition, connect the output layer of each component neural network to a combining network that combines the output activations with a computation such as an ensemble voting rule. Since no connections have yet been added between non-adjacent hidden layers, it seems fair to count this network as having N*K hidden layers.

The initial performance of the combined network will match the performance of the ensemble. Gradient descent training and the ability of the self-organizing process to add additional connections between the component networks and between the layers of each component network will enable the learning process to continue to improve the performance of the combined network. This process allows a network to be successfully trained with an arbitrarily large number of layers with no degradation in performance on training data and perhaps with a significant improvement in performance. In fact, it is initialized to match the performance of the best ensemble. Furthermore, the process can be applied again to an ensemble of these stacked networks.

This example of stacking the members of an ensemble is only one special case of the process illustrated in FIG. 8. It is also a special case of the process illustrated in FIG. 14. Although only a special case, it is worth highlighting because of the capabilities that it illustrates in addition to the ability to easily build and train a very deep SoPoNet network. Because the network architecture is an arbitrary strict partial order, the output nodes of each member of the ensemble may be directly connected to the output of the merged network, even though they are stacked and, except for the ensemble member at the top of the stack, the output nodes of the other former ensemble members are interior nodes in the merged network. In a SoPoNet, however, any node may be connected to any higher layer, including being directly connected to the output target cost function. The first layer above the input in each ensemble member also receives a direct connection from the input, although in the stack these layers are interior layers. In general, any node in any SoPoNet may be directly connected to the output, the input, or both the input and the output.

FIGS. 5-8 are all instances of incorporating a network of one or more nodes into the original network to provide the original network with knowledge that the added network acquired in a separate learning process, perhaps on different training data. These changes in the architecture of the original network allow it to learn and integrate this new knowledge much more quickly than the original network could learn it by gradient descent with its original architecture. In the case in which the original network has already been trained to the global minimum of its error cost function, this new knowledge is knowledge that the original architecture would not be able to learn at all.

Figure 9:
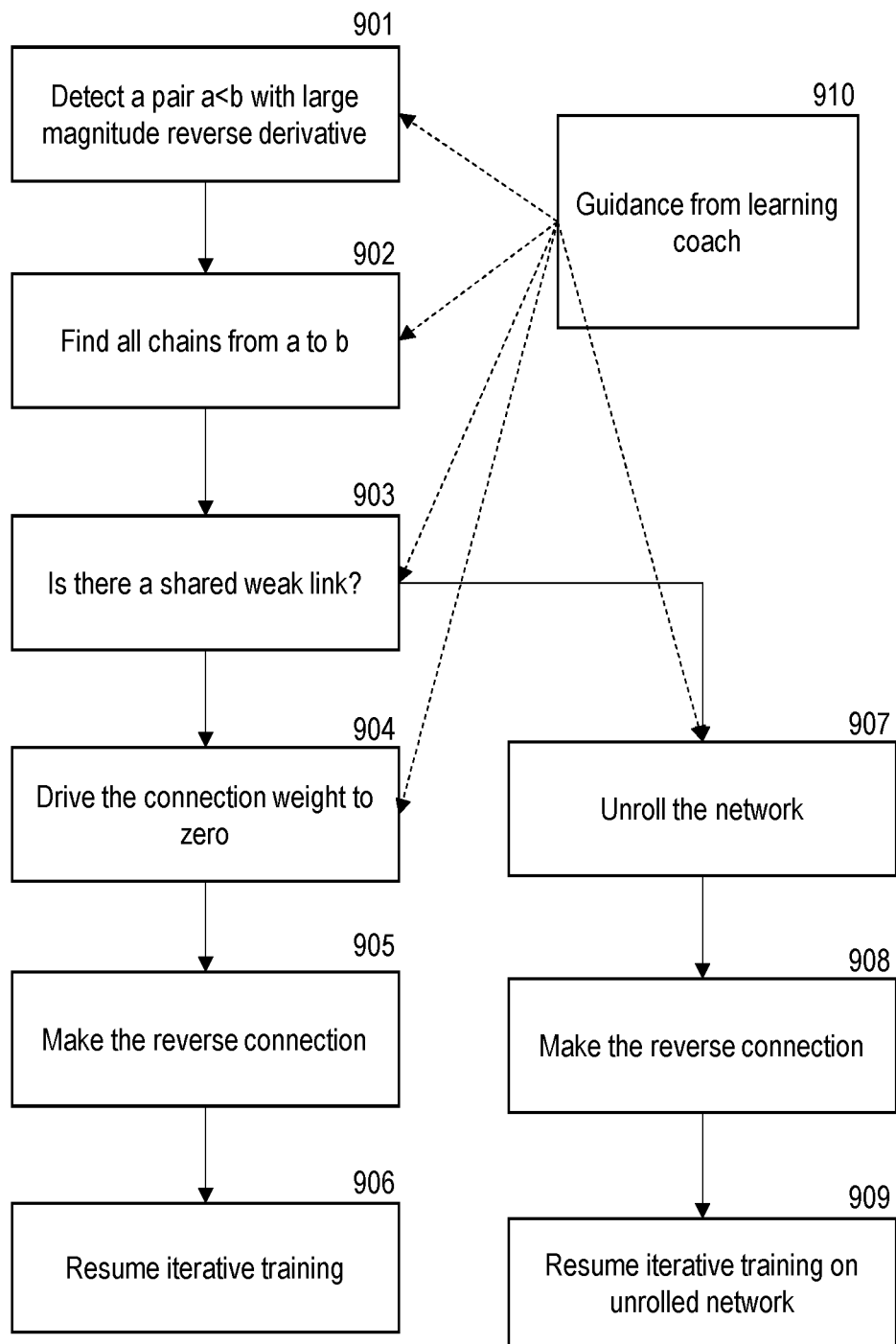
FIG. 9 is a flow chart of a process for changing a self-organizing network to allow connection in the opposite direction from the current partial order.

FIG. 9 illustrates a process by which a new cover may be created that goes against the direction of the binary relation < as it is currently defined. In box 901, the computer system detects a pair of nodes a and b such that a<b but for which VADC(b, a) for the reverse direction has a large magnitude. The search for such a pair may be guided by learning coach 910 to make it more efficient. The large magnitude reverse derivative indicates that it might be possible to reduce the error cost objective by creating a new cover with a covering b. However, such a cover is not possible without first changing the relation < by removing some existing covers, since currently a<b.

In box 902, the computer system finds all chains from a to b. All these chains must be broken. If any of these chains remains, then the relation a<b will still hold.

In box 903, the computer system searches the chains to find whether there is a link that is present in all of the chains. If there is such a link, it will be a cover pair and deleting that one cover will make a and b incomparable and thereby make it possible to create a new connection with a covering b. Under guidance from learning coach 910, in box 903, the computer system decides to try in box 905 to reduce the weight to zero for one or more connections or in box 907, to unroll the network using the procedure described in association with FIG. 17. Box 903 has two branches. The process may continue from box 903 by following either or both branches. In one embodiment, if no weak link is found, then the branch to box 907 is followed.

In box 904, the computer system tries to drive the connection weight for the weak link to zero. It uses L1 and L2 regularization with a larger than normal cost coefficient. When the weight gets to zero, the computer system changes the relation < to break the link. Since all the chains from a to b go through the link, a and b become incomparable.

In box 905, the computer system then changes relation < adding a as a cover of b. The connection weight for the connection from b to a is initially zero, but is unfrozen. As detected in box 901, this connection weight has a gradient with a large magnitude, so the connection weight itself will quickly train to have a significant magnitude as training is resumed in box 906.

In a condition of slow learning, the procedure from 901 through 906 may be used in addition to the procedures illustrated in FIGS. 4-8 to accelerate the learning.

Whether or not there is a weak link found in box 903, the branch from 903 to 907 may be followed. In box 907, the computer system may use a very different method, called "unrolling," which is described in more detail in FIG. 17. Basically, unrolling consists of making many copies of a network and associating a counter value t with each copy. Then any potential connection in the network from node b to node a that is blocked because a=b or a<b is instead created as a connection from b[t], the copy of b in the network with a counter value t, to a[t+1], the copy of a in network t+1. On the network consisting of all the copies of the original network, the partial order is defined such that x[t]<y[t+1] for all nodes x and y. Thus, a connection can be made from any node in a lower numbered network to any node in a higher numbered network.

In box 908, the computer system makes the connection from b[t] to a[t+1] for all values oft. In box 909, the computer system resumes iterative training on the unrolled network.

Figure 10:
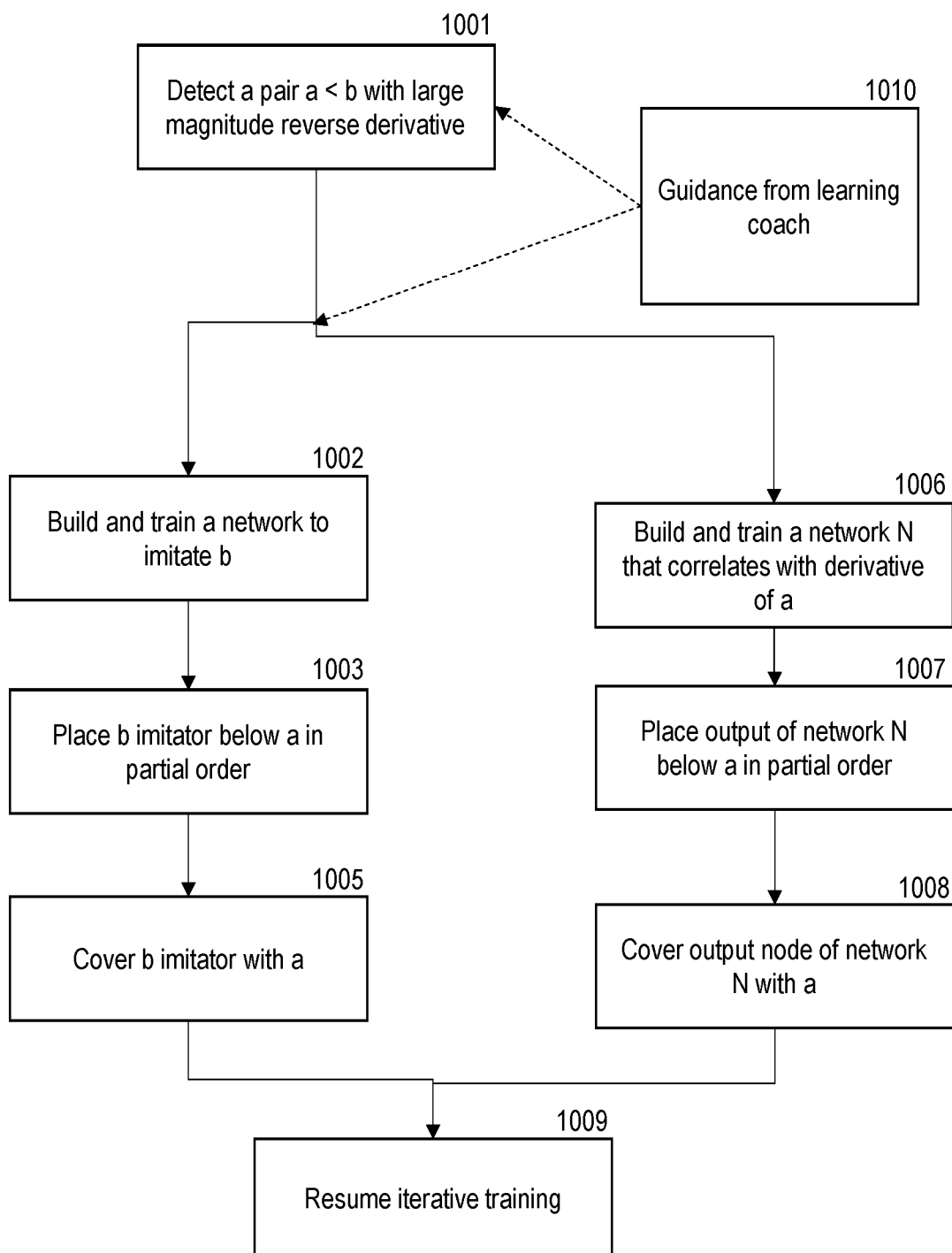
FIG. 10 is a flow chart of a process for growing a self-organizing partially ordered network to be able to emulate a new connection that would have violated the partial order in the original network.

FIG. 10 illustrates another procedure for exploiting the large magnitude gradient from the potential cover of b by a when that cover is blocked because a<b. The procedure in FIG. 10 uses one or both of two methods for building a substitute for b to be covered by a. In box 1001, the computer system detects a pair a<b with a large magnitude for the partial derivative of the potential connection weight if a were able to cover b. The search for such a pair and the selection may be guided by the learning coach 1010 to make the search and selection more efficient. Learning coach 1010 also guides the choice of whether to continue the process with box 1002 or with box 1006. Either may be used.

In box 1002, the computer system builds and trains a network to imitate b. The process of building a network to imitate another network, in this case, the subnetwork culminating in the node b, was discussed above in association with box 210 of FIG. 2. The process of training one network to imitate another is a special, well-behaved case of network training. It allows an unlimited amount of training data and, by definition, overfitting is not an issue.

The network to imitate node b is built from scratch or can use any nodes in the network that under the partial order < are less than a or incomparable to a. That is, the network is built to satisfy the condition required in box 1003. Then, in box 1005, the computer system modifies the relation < to include the cover of the imitator of b by a.

The condition for VADC(a, b) to be large in magnitude relative to magnitude of the activation vector act(b, m) is that the activation vector act(b, m) has a large positive or negative correlation with the vector δ(a,m).

In box 1006, the computer system builds a network N whose output node is trained to have a high correlation with the derivative vector δ(a, m) of node a. Note that it is the activation of the network output node that imitates the derivative vector of a, not its derivative. Also note that this activation is imitating the derivative vector δ(a, m) of a, which is nothing like imitating a itself. In box 1007, the computer system places the network imitating the derivative of a below a in the partial order <. In box 1008, the computer system covers the output node of N with a. In box 1009, the computer system then resumes the iterative training.

Note that the process of box 1006-1008 can be done even without having identified a node b. However, there is no easy way of knowing how difficult it may be to build a network whose output correlates well with an arbitrary derivative vector. The node b in box 1001 provides an existence proof that a network no more complex than the subnetwork below b can produce an output that correlates with the derivative of a at least as well as b does. Using the procedure of box 1006-1008 without a specific b can always be done as a last resort if no more promising alternative is available.

Figure 11:
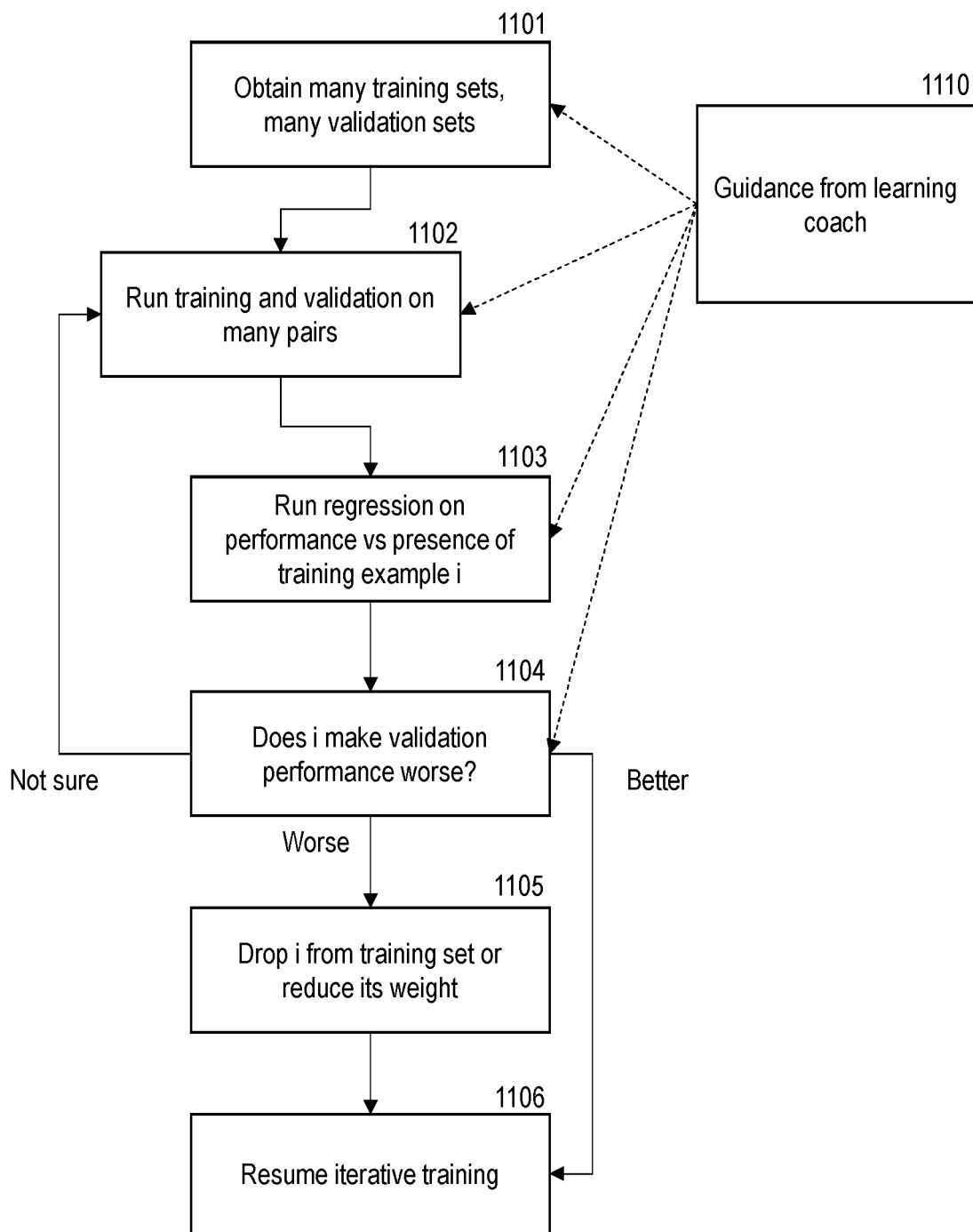
FIG. 11 is a flow chart of a process for reducing overfitting in a machine learning system.

FIG. 11 is a flowchart of a procedure for correcting overfitting. In box 1101, the computer system obtains many training sets and many validation sets, which can be selected under the guidance of learning coach 1110. For the purpose of box 1101, the training sets may be relatively small subsets of the available training data. The training sets may overlap with each other, so there are exponentially many potential training sets to choose from.

In box 1102, the computer system runs training and performance evaluation on many pairs T and V, where T is a training set and V is a disjoint validation set. In box 1103, the computer system runs a multiple variable regression with an independent variable $x_i$ indicating the presence or absence of the training data example i in the training set, with the performance measured for all pairs T and V.

In box 1104, the computer system assesses whether the presence of example i in the training set makes the performance on validation data better or worse. If the regression coefficient for $x_i$ is positive, with margin taking account of the size of the confidence interval, then i may be used as a training example with an acceptably low risk of overfitting. If the regression coefficient for $x_i$ is negative, that is evidence that using i tends to cause overfitting. If it is clearly negative, allowing for the confidence interval, then i should be rejected and not be used as a training example (1105). If the regression coefficient is too close to zero, or if the confidence interval is too broad, then in box 1104, the computer system concludes "not sure" and control returns to box 1102 to collect more performance data. In one example embodiment, each data example has a weight, e.g., between zero and one. In this embodiment, in box 1105, the computer system merely reduces the weight of example i. When a data example is weighted, the update computed for each mini-batch (for example, box 207 of FIG. 2) multiples the gradient estimate for each data example by its weight, sums the weighted estimates, and divides by the sum of the data weights for the mini-batch. In one embodiment, the procedure may iteratively update each data weight by looping back to box 1102. In another embodiment, the iterative updating of data weights may be done over the course of multiple training set and validation set pairs in box 1101.

Figure 12:
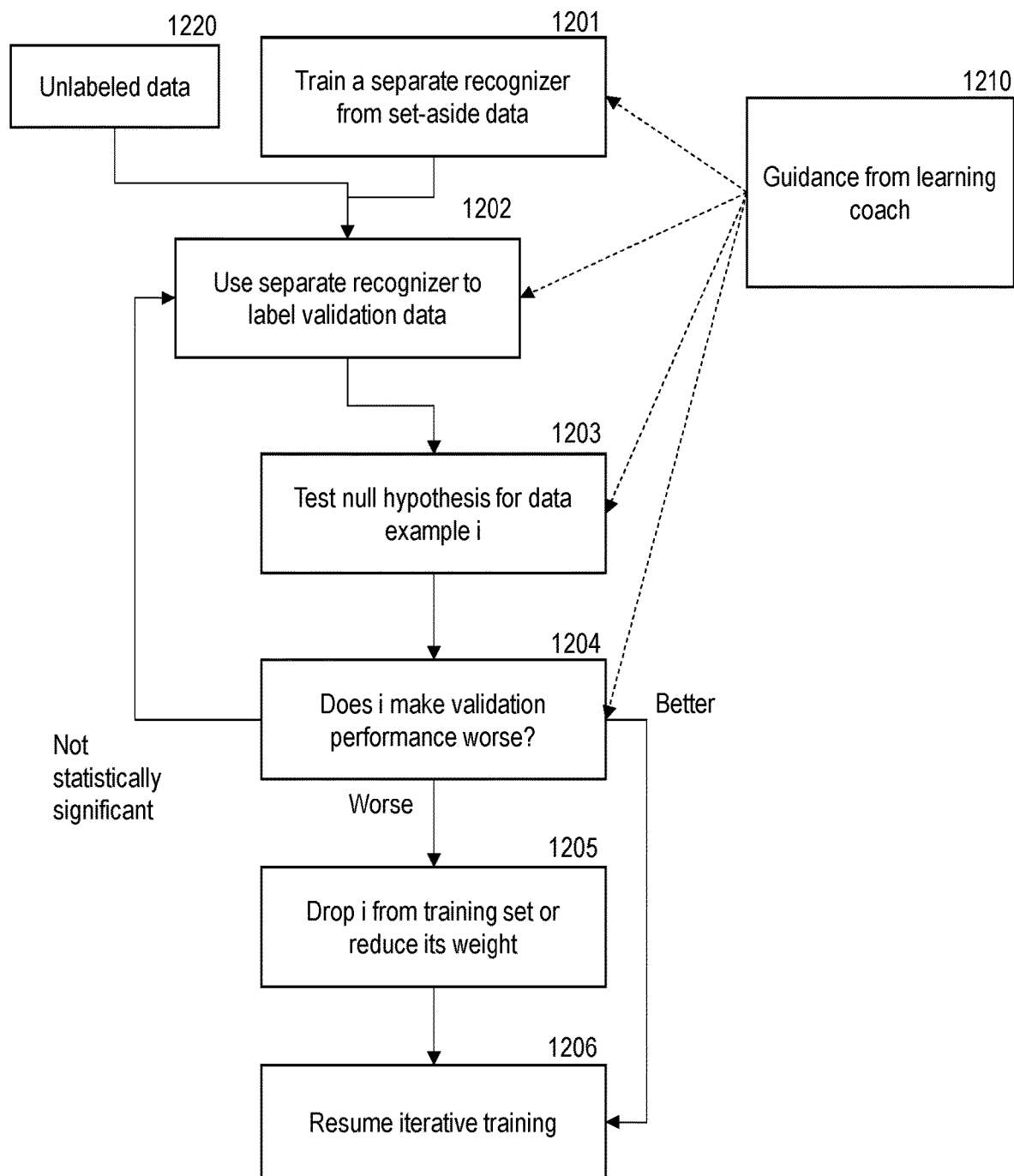
FIG. 12 is a flow chart of a second variant of a process for reducing overfitting in a machine learning system.

If there is a limited amount of validation data, it may be difficult to decide whether or not to include a data example in the test in box 1104 of FIG. 11. In many situations, there is a limited amount of labeled data, and it may be necessary to use most of that data as training data, so the amount of validation data may be very limited. However, in many of these situations, there may be a much larger amount of unlabeled data. FIG. 12 describes one possible method for using unlabeled data for validation testing.

FIG. 12 is a flow chart of a procedure for using unlabeled data for validation or development testing and for correcting overfitting. It is based on a technique disclosed in U.S. Pat. No. 8,014,591, titled ROBUST PATTERN RECOGNITION SYSTEM AND METHOD USING SOCRATIC AGENTS, which is incorporated herein by reference in its entirety. The learning coach 1210 acts as a Socratic agent, as described in that patent. Normally, evaluating performance on validation data requires labeled data so that the performance can be quantified. The technique of U.S. Pat. No. 8,014,591, and of FIG. 12, does not require a quantitative measure of performance but only a statistically significant difference in performance. Remarkably, this statistically significant difference in performance can be accumulated using unlabeled validation or development data.

Some of the labeled data needs to be set aside to train a separate recognizer 1201. The recognizer trained in box 1201 does not need to be extremely accurate. It will provide more efficient testing if it is more accurate, but it will provide statistically valid test results even if it is less accurate than the system being tested.

In box 1202, the computer system obtains unlabeled data from box 1220 and labels it using the recognizer trained in box 1201. There will be errors in these labels, and it will not be known which labels are in error. However, if the recognizer from box 1201 performs better than chance, there will be a positive correlation between the labels and the correct answer.

In box 1203, the computer system tests the null hypothesis that there is no difference in performance between training with a data set that includes a particular data example i and training with a data set that does not include that data example. In box 1204, the computer system asks whether there is sufficient evidence to reject the null hypothesis at a specified level of statistical significance. If there is not sufficient evidence to reject the null hypothesis, control returns to box 1202 to collect more data. Because of the errors in the labeling of the validation data, it will take more testing to reach a level of statistical significance. However, the probability of false rejection of the null hypothesis is determined by the significance level for the null hypothesis set by the experimenter and does not depend on the error rate of the recognizer trained in box 1201.

If the null hypothesis is rejected in favor of the conclusion that example i makes the performance worse, in box 1205, the computer system drops example i from the training data. In one example embodiment, each data example has a weight, e.g., between zero and one. In this embodiment, box 1205 merely reduces the weight of example i. When a data example is weighted, the update computed for each mini-batch (for example, in box 207 of FIG. 2) multiples the gradient estimate for each data example by its weight, sums the weighted estimates, and divides by the sum of the data weights for the mini-batch. This more conservative embodiment requires less conservative confidence intervals for rejecting the null hypothesis. If the null hypothesis is rejected in favor of the conclusion that example i improves the performance, then example i is retained and control proceeds to box 1206 to resume iterative training. If there is not enough evidence to reject the null hypothesis, control returns to box 1202 to gather more data.

The process of FIG. 11 and the process of FIG. 12 are both directed towards the goal of reducing overfitting of the training data. However, they are very different in certain respects. The process of FIG. 11 requires many validation sets and many training sets. Therefore, it may require a relatively large amount of labeled data. In contrast, the process of FIG. 12 can utilize unlabeled data for development testing and needs a relatively small amount of labeled data.

Figure 13:
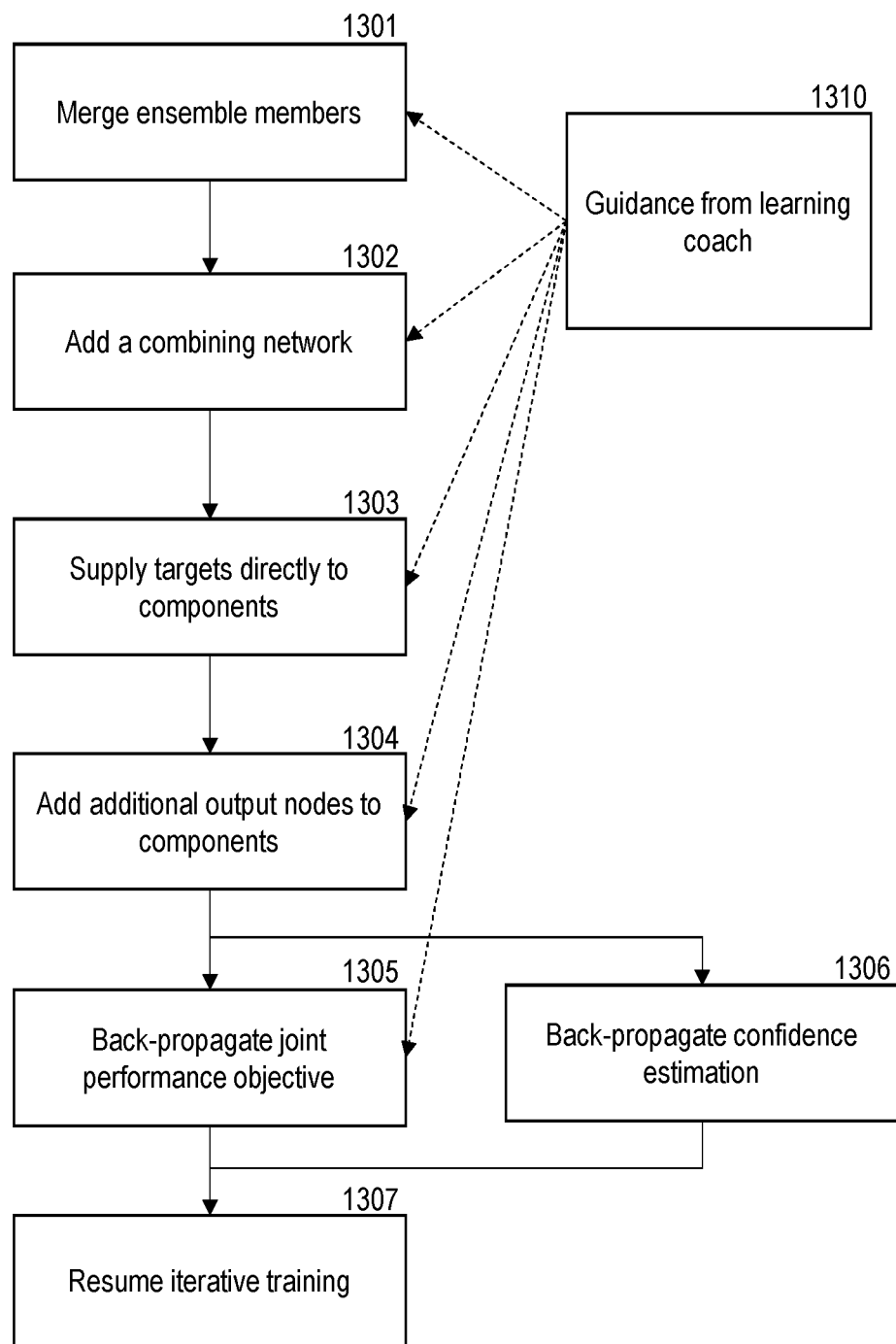
FIG. 13 is a flow chart of a process for merging an ensemble of machine learning systems into a self-organizing network.

FIG. 13 is a flow chart of a process for merging ensemble members into a single, larger network. Let A and B be sets with a strict partial order. Then, a new strict partial order may be defined on the union C of the sets by making a and b be incomparable for all pairs a in A and b in B. As a self-organizing partially ordered network, C is called the simple merger of A and B. As a self-organizing partially ordered network, C may then be trained to add covers connecting the elements in A with elements in B and vice versa. The new connections are referred to as cross-connections.

The process illustrated in FIG. 13 is similar to the process illustrated in FIG. 8, except that FIG. 13 specifically assumes that the networks to be merged are already an ensemble, and FIG. 13 adds boxes 1304, 1305, and 1306 to enhance the joint performance of the merged ensemble. Optionally, these additions may also be added to the process used in FIG. 8.

In box 1301, the computer system forms the simple merger of the networks that are members of an ensemble. In one embodiment, learning coach 1310 guides the merger process, for example, guiding the self-organizing process as described in association with other figures.

In box 1302, the computer system adds a combining network. The combining network is initialized to at least match the performance of an ensemble member voting rule. In one embodiment, the combining network has additional, uncommitted nodes and can learn more complex functions and can train the ensemble members to work together to jointly optimize their objective. In the strict partial order of the combined network, some nodes in the combining network can be initialized to be, or can learn to be, < some nodes in the member networks.

In box 1303, the computer system supplies targets directly to the former output nodes of the subnetworks that were formerly independent ensemble members. This is not a standard practice for layered neural networks and requires some additional explanation. The former output nodes are no longer maximal nodes in the partial order < relation for the combined network. That means that they receive back-propagation of the partial derivatives of the combined network objective function from higher order nodes. The former output nodes also continue to receive the target information that they received as output nodes as an independent ensemble member and can use that information to compute a term to be added to their cost function.

In general, any node in a self-organizing partially ordered network can receive either output targets or input data. The output and input data are not restricted to the maximal and minimal nodes, respectively. Any non-maximal node that receives target information also has a hyperparameter as a multiplication weight factor respectively weighting the cost function term computed from the target and the cost function term back-propagated from nodes higher in the partial order.

In box 1304, the computer system adds additional output nodes to the component subnetworks that were formerly member networks of the ensemble. The purpose of these additional nodes is to provide a means for the combining network to back-propagate objectives for the component subnetworks to compute additional information and for the additional nodes to encode that information. For example, to combine the outputs of the component networks when they disagree, it is helpful for the combining network to have additional information to make a confidence estimate for each of the disagreeing votes. The component networks can help provide this information. The combining network trains the component networks to compute useful information by back-propagation through the additional nodes added to the component networks for that purpose. The nodes receiving this back-propagation for additional information may be internal nodes; they do not need to be maximal nodes within the component subnetwork.

In box 1305, the computer system back-propagates the joint performance objective function. Note that, when trained separately, the ensemble members are not trained to jointly optimize such a function. They each individually optimize their own objective. Because the combined network can be initialized to emulate the computation previously done by the ensemble members and any voting rule or joint decision mechanism, gradient descent training on a joint objective will improve the combined performance.

In box 1306, the computer system back-propagates objectives for the component networks to compute and supply information for the confidence estimate, as described in association with box 1304. The self-organizing partially ordered combined network can also learn to reconfigure itself, and in box 1306, the computer system can back-propagate anything else that turns out to be useful for the objective. Under guidance of the learning coach 1310, the additional output nodes added by the computer system in box 1304 can also be trained to compute other useful information.

In box 1307, the computer system resumes the iterative training.

Figure 14:
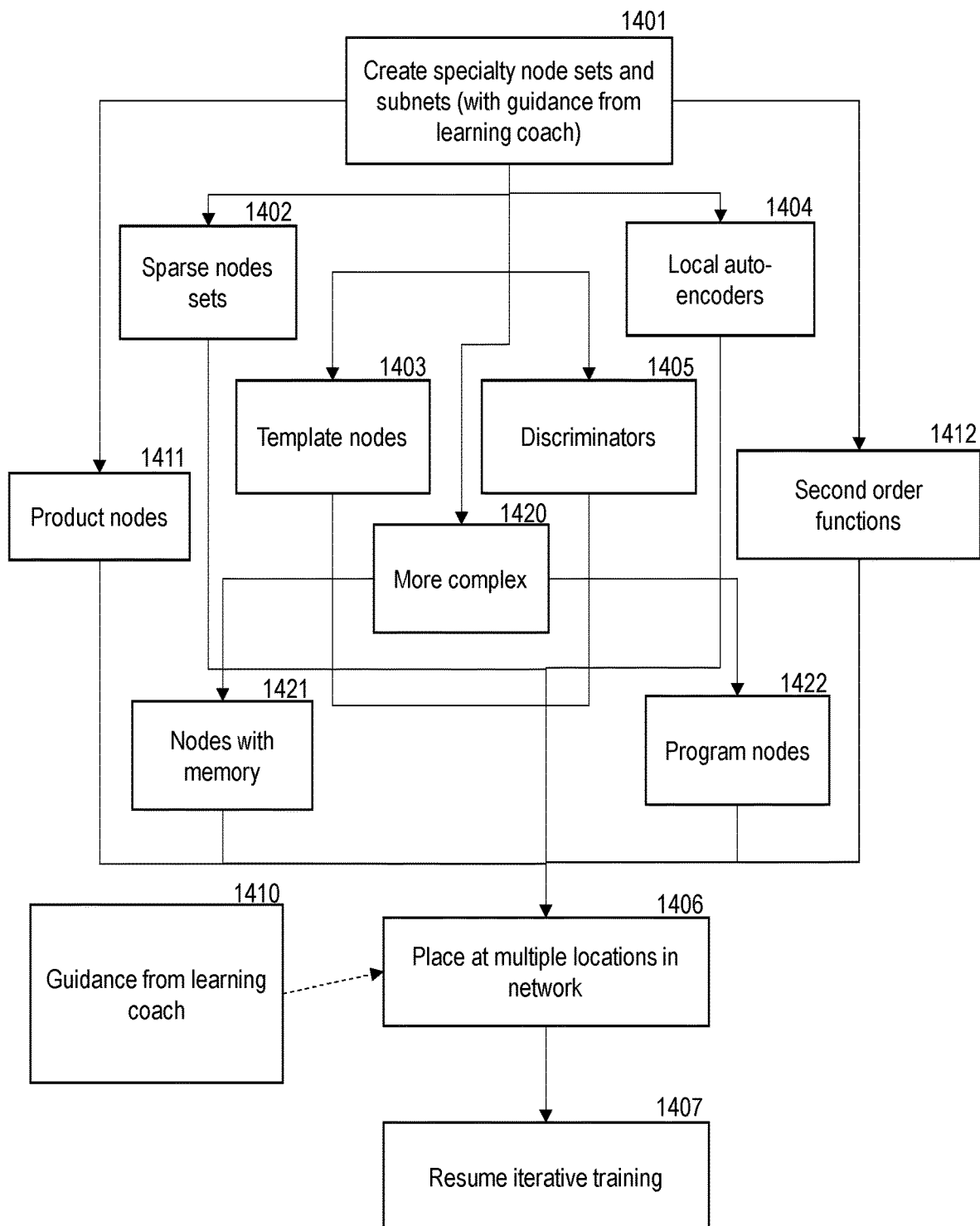
FIG. 14 is a flow chart of a process for creating various kinds of specialty node sets in a self-organizing partially ordered network.

FIG. 14 illustrates the wide variety of specialized nodes and subnetworks that can be added to a self-organizing network. In box 1401, the computer system creates one or more of these node types. In one embodiment, in box 1406, the computer system places each of the specialized nodes, node sets, or subnetworks at one or more locations in the network. In one embodiment, the placement of the specialized nodes, node sets, or subnetworks at one or more locations in the network in box 1406 can occur under guidance of a learning coach 1410. In box 1407, the computer system resumes the iterative training.

Each of the other boxes in FIG. 14 introduces an example of one variety of specialized node, node set, or subnet, each of which will be discussed separately. For example, in box 1405, the computer system may create a discrimination node, as described in association with FIG. 5. In box 1403, the computer system may create a template node or network, as described in association with FIG. 6.

However, the process of FIG. 14 has a different, more general context of application than FIG. 5 or FIG. 6. Any of the types of nodes or node sets illustrated in FIG. 14 may be added to a base network at any time to give the network properties and capabilities that the base network might not have without the special node, node set, or subnet.

For example, one or more of these specialized nodes, node sets, and subnetworks can be added to the network architecture even before the weight parameter training starts. In such an embodiment, the process of FIG. 14 even applies to a fixed network that is not self-organizing.

As another example, one or more of these specialized nodes and node sets can be safely added to any self-organizing network at any time, not just during an interval of slow learning. As will be seen in the individual discussions of the node types, they each have unique properties that may enhance the overall performance of the network, in addition to the fact that they may accelerate the learning in a situation of slow learning.

Each of the special properties may be possessed by more than one of the special node types, so the discussion is organized in terms of the special properties, with reference to the node types that implement them.

Knowledge Node Sets and Subnetworks:

In this discussion, "knowledge" refers to information about the mapping from input vectors to output categories that has been acquired by training separate from the iterative training of the base network. The one-shot learning of discriminator node in FIG. 5 is an example of such externally acquired knowledge, as is the one-shot template learning of FIG. 6.

However, the discriminator node set of box 1405 and its training are more general than the one-shot learning of FIG. 5. In box 1405, the discriminator may be any set of output nodes in a separately trained network. In some embodiments, the entire network may be added to the base network, which would be an instance of the process of FIG. 8, rather than FIG. 5. In other embodiments, a set of nodes corresponding to the output nodes is added to the base network. These added nodes are then soft-tied to the output nodes of the separate network, as will be described in association with FIG. 15.

Similarly, a node, node set, or subnet created in any of the other boxes may represent a knowledge node set if it is trained separately. Any addition to a base network can give it extra representation power. The addition of a knowledge node set has the additional advantage that it may substantially reduce the time and cost of training. In some embodiments, the cost may be negligible because the separate training has already been done for some other purpose. In other embodiments, the separate training is done as a smaller network and optionally on a smaller training set, thus requiring less time and computation than training the same knowledge in a subnetwork within the base network.

Knowledge node sets are especially useful when placed near the input nodes or output nodes in a network or, equivalently, near the minimal or maximal nodes in a partial order. Knowledge nodes near the minimal nodes provide knowledge that can be used by all the nodes higher in the partial order. Knowledge nodes near the maximal nodes allow all the nodes lower in the partial order to receive back-propagation to learn to support the knowledge nodes and also to learn new knowledge that will complement the knowledge nodes to optimize the total classification. In box 1406, the computer system can, for example, place knowledge node sets in these aforementioned locations.

Feature Node Sets:

Sparse node sets (1402), sets of template nodes (1403), local autoencoders (1404), and some examples of more complex node types (1421 and 1422) may represent a set of features. A set of discriminators (1405) may also be a feature set if trained as the output nodes of a network with a softmax or sparsity constraint, but that is also a special case of box 1402.

Under a general interpretation of the word "feature," any set of nodes may be considered to be a feature node set. However, in this discussion, the meaning of "feature node set" is limited to sets of nodes that add a capability to the base network that is different from the capability of merely adding the same number of generic nodes. In this discussion, a set of nodes is considered a "feature node set" only if the activation patterns of the set of nodes is restricted in some way to be substantially different from the space of all possible activations. Thus, for example, a set of nodes subject to a sparsity condition will have activations in which only a small fraction of the nodes have significant activation values for any one data example.

An autoencoder is a special type of network, which is well known to those skilled in the art of deep learning, in which the input values activate a network, including an encoding network, a bottleneck layer, and a decoding network. The bottleneck layer has a restriction, such as having fewer nodes than the input or a sparsity constraint. The autoencoder is trained to have the output of the decoder reproduce the input to the encoder as well as possible, subject to the constraint of the activation computation going through the bottleneck. An autoencoder may be trained unsupervised on any set of data. Thus, a local autoencoder may be trained to auto-encode any set of nodes in a network, though preferably the nodes will be the subset of a layer in a layered neural network or a set of incomparable nodes in a general strict partially ordered network. Both the bottleneck layer of any local autoencoder and the output layer will be restricted in the sense defined above and, therefore, be examples of feature node sets.

A feature node set may also be trained as the outputs of a separate network with supervised training and thus also be a knowledge node set. Feature node sets have several useful properties. They provide a more compact, more efficient, more easily interpreted representation of knowledge than arbitrary node sets. This property may be further enhanced by training individual nodes in the feature set to match specified labels or by assigning feature labels to individual nodes once they are trained. Labeled feature nodes may be soft-tied within and across networks.

In a layered network with many layers or in an arbitrary network or partial order in which some nodes are connected to the input or output only through long chains, feature node sets provide a training focus at intermediate points in the network that is somewhat comparable to the training focus provided by the input and output nodes. This property, in turn, makes it easier to train networks with more layers or longer chains. Such networks have greater representation power than shorter, wider networks, even with fewer total nodes. Furthermore, because such networks have fewer degrees of freedom, they may be less likely to over-fit.

In one embodiment, in box 1406, the computer system places feature node sets at locations scattered throughout the network.

Special computation nodes: Template nodes are an example of nodes that do a more complex computation. Other than a few special cases, most nodes in a neural network compute the sum of the product of the weight of each arc coming into the node times the activation of the source node for that arc plus a bias term. A non-linear function is applied to this sum to get the activation or output value of the node. Typically, the non-linear function is one of a few well-known types, each of which is monotonic and is bounded or grows most linearly at extreme values of the input.

For the purpose of this discussion, any general-purpose node that does a computation other than the type described above is considered a special computation node. Two examples of nodes with this property are (1) the max node that is used in pooling the outputs of the convolutional filter layers in a convolutional neural network, and (2) the product node used to create long short-term memory (LSTM) cells or gated recurrent units (GRU), both used to achieve a form of memory in recurrent neural networks. That is, they are not normally used as general-purpose nodes that can be connected anywhere in the network. When used as general-purpose nodes, they are special computation nodes for the purpose of this discussion.

Other examples of special computation nodes include:
A node with the activation function $act(x)=x^2$, or any other higher power of x;
A node with the activation function $act(x)=|x|$;
A node that computes the inner product of two vectors, represented by disjoint subsets of its inputs;
A node that computes the cosine of the angle between two vectors;
A node with non-negative input and the activation function $act(x)=\ln(x)$;
A node with the activation function $act(x)=\exp(x)$;
A node that computes the norm of a vector;
A node with two inputs that computes XOR for binary inputs or a continuous equivalent such as $act(x,y)=1-|x-y|$; and
A node with two inputs that computes "is equal to" or some continuous equivalent such as $act(x,y)=|x-y|$.

Perhaps surprisingly, special computation nodes also include:
A node with the activation function $act(x)=ax$, where a is a constant.

The last example is included because, normally, the activation function is required to be non-linear. However, the prohibition against linear activation functions seems to be based on the fact that having two successive layers with nothing but linear activation functions is just equivalent to having a single layer with incoming weights equal to the matrix product of the two layers of weights. However, allowing a fraction the nodes to have linear activation functions is useful and should not be prohibited.

A self-organizing partially ordered network does not generally have layers that are only connected to the adjacent layer, except perhaps initially if initialized by a conventional layered neural network. In any case, during the self-organizing process, there are no fixed layers as arcs are added and deleted. The SoPoNets described here with FIG. 14 or any of the other figures may have linear nodes or any of the other special computation nodes in any position in the network. Furthermore, combinations of linear nodes with the quadratic nodes and their quadratic powers can be used to represent any polynomial.

Figure 17:
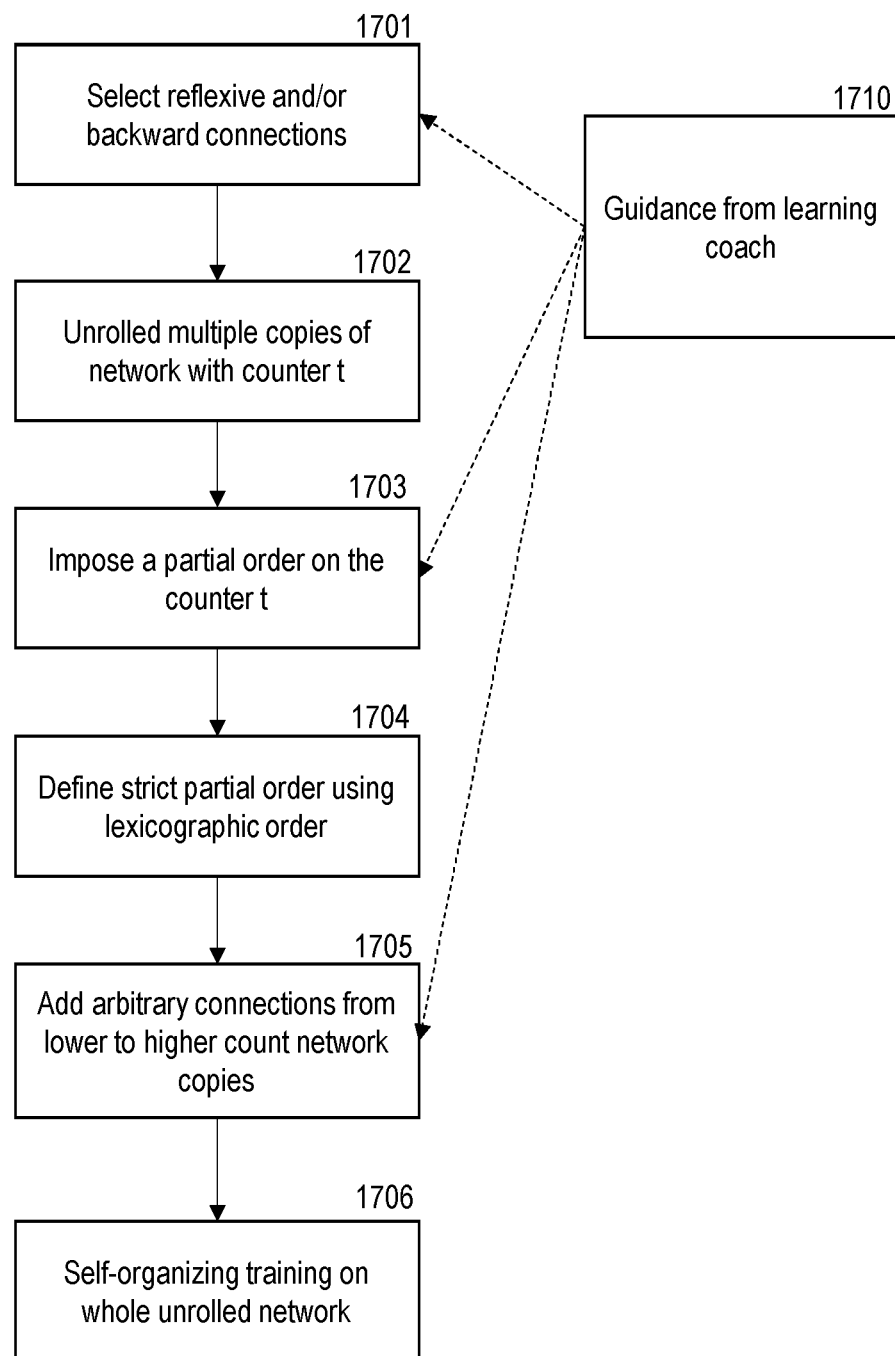
FIG. 17 is a flow chart of a process to enable self-organized training of arbitrary networks, including recursive networks and directed graphs with cycles.

As a side note, there are two reasons that a product node is not needed to retain memory for a longer term in a SoPoNet. One reason is the option to hold the memory explicitly. The other reason is that, in a SoPoNet, when unrolling a recurrent neural network, the unrolled copies of the network are associated with a partial order rather than a linear order, as illustrated in FIG. 17. In the unrolled partial order, long-term memory can be directly represented with arcs in the partial order.

Special computation nodes may be added to a network at any time in any location. Special computational nodes add extra knowledge in the sense of knowledge node sets, even if they are not trained separately. The non-monotonic special computation nodes provide a component from which the network can learn to construct a template node. Such template nodes can form a feature node set. As mentioned, the quadratic and linear nodes are sufficient to construct any polynomial function.

The XOR and "is equal to" functions represent primitive functions that cannot be represented by any one-layer network. Provided as special computation nodes, they provide a pretrained network that computes a function that would otherwise require relatively time-consuming training of at least a two-layer network.

Thus, special computation nodes can be used like knowledge node sets and, in some embodiments, be placed near the minimal and maximal nodes. They also can be used to build feature node sets and be used throughout the network. They also create different parameters than conventional nodes and thus expand the parameter space, creating more ways to escape from a stationary point in a conventional network.

In box 1420, the computer system introduces even more complex node types, with two examples: nodes with memory (box 1421) and nodes associated with an arbitrary sequence of computer instructions, that is, a program (box 1422). Template nodes are an example of nodes with memory. In the embodiment previously described, the memory was in the values of the biases. However, more general special computation nodes may have several memory elements, and the memory may be separate from and in addition to the bias. As mentioned, explicit memory can represent the implicit memory of LSTM or GRU memory cells. The examples associated with box 1422 are even more general. Any computable function may be represented, with the restriction that the function is at least piecewise differentiable and that the program computes the derivative of the function as well as the function value.

Both of these more complex node and subnetwork variates are, of course, instances of special computation nodes and can be used in all the ways that the less complex special computation nodes can be used.

In box 1406, the computer system places the special nodes, node sets, and subnetworks at various locations in the base network, with the preferences mentioned above. It may also place additional copies these elements at other locations in the network. In one embodiment, all of these placed special nodes, node sets, and/or subnetworks have their outgoing arc weights initialized to zero. In box 1407, the computer system resumes the iterative training.

The special nodes, node sets, and subnetworks of FIG. 14 may be added at during any period of slow learning. For example, even outside the special conditions of FIGS. 5 and 6, many of these special nodes are likely to cause a saddle point in the objective function to no longer be a stationary point. In addition, these special node types may be added to a SoPoNet to increase the representation power of the network, while also making the knowledge represented in the network easier to interpret and easier to share and communicate among cooperating networks.

Figure 15:
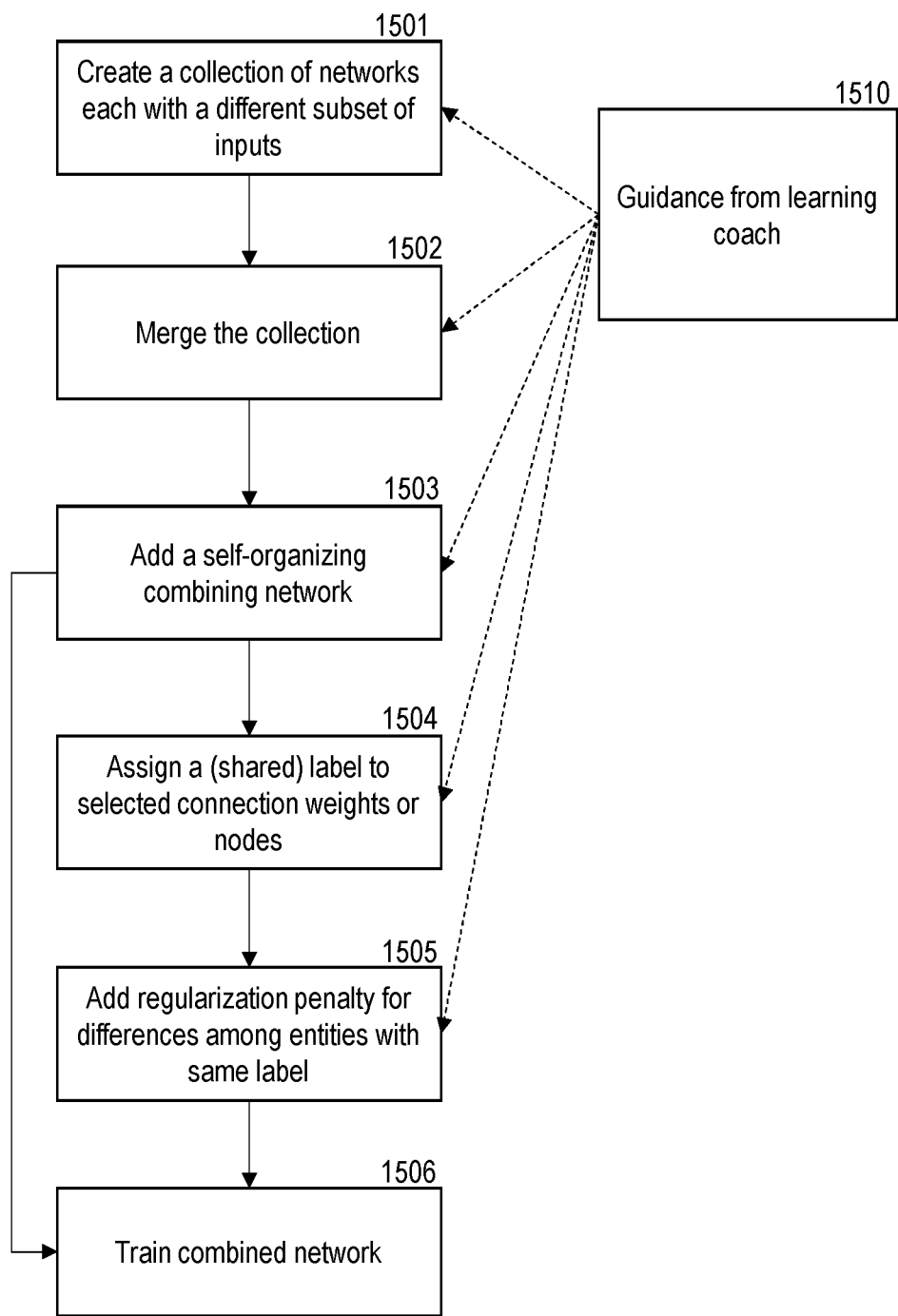
FIG. 15 is a flow chart of an analysis and training process used in some embodiments of this invention.

FIG. 15 illustrates a process of building a large SoPoNet network out of many related smaller networks. In one embodiment, separate subnetworks accept different subsets of elements of the input data vector but can coordinate their learning through a process called soft-tying. The process of FIG. 15 differs from the processes of other figures by introducing the concept and process of soft-tying. Although described in association with FIG. 15, soft-tying may be used in any network. For example, it can be used in the merged networks created in FIGS. 8 and 13. Soft-tying can also be used among members of an ensemble when they are not merged into a single network. It can even be used when the computation for training the ensemble members is being done on a set of distributed computers. One of the advantages of soft-tying is that is does not require the high data bandwidth that would be required, for example, for hard-tying, as is done for the weights in the convolution filters in a convolutional neural network.

In box 1501, the computer system also introduces the concept of input vector subvectors, which has not been explicitly discussed in association with other figures. For example, in box 1501, the computer system can create or obtains a collection of networks in which each member only receives a selected subset of the input variables. The collection of networks may be members of an ensemble. Notice, for example, that the convolutional layers of a convolutional neural network are a limited special case of this condition. Even within the image recognition task of an existing convolutional neural network, a useful extension is to add some extra members that each look only at a (possibly random) selection of pixels from scattered locations in the image. These extra member networks would often be better able to learn global or large-scale properties of the image more quickly than the myopic lower convolutional layers. In any case, they can learn complementary knowledge. Thus, it is useful to think of the convolution filters in a convolutional neural network as examples of the general technique of having subnetworks respectively receive input vectors that are subvectors of the total input vector. The general technique also applies to other kinds of data, such as text, for which convolution might not be defined.

In some embodiments, each ensemble member may also be trained on a different subset of the training data. During the training of the ensemble members, the learning coach 1510 may reassign a data example from one ensemble member to another. For example, initially two ensemble members may be training on overlapping subsets of the training data and/or they may be cross-tested on each other's training data. When one of the ensemble members has better performance on a data example, that data example may be assigned exclusively to that ensemble member. More generally, for each ensemble member, each data example may have an assignment weight between 0 and 1. During training, learning coach 1510 may increase the assignment weight towards 1 for the more successful ensemble members and decrease it towards 0 for the less successful ensemble members. This training weight assignment is similar to the training weight assignment in box 1105 of FIG. 11 and box 1205 of FIG. 12.

In box 1502, the computer system merges the member networks of the collection, such as by using the process described in FIG. 13. In one embodiment, in a comparison with a convolutional neural network, in box 1502, the computer system initializes a combining network to at least emulate the computation done by the higher layers of a convolutional neural network. However, comparison to a convolutional neural network is merely an example of one situation in which it is natural to have separate subnetworks analyzing subsets of the input vector.

Other embodiments of FIG. 15 do not necessarily have any resemblance to convolutional neural networks. For example, ensemble members may take as input subsets of a sequence of text data, but the subnetworks would learn syntactic and semantic structures rather than convolutional filters.

A better characterization of the intended purpose and capabilities of the ensemble members in general is breaking down of a complex task in a high-dimensional space into component tasks in spaces of smaller dimensions. An example of a complex task that can be broken into component tasks in spaces of smaller dimension is the Boolean parity function and other Boolean functions that approximate the parity function. The parity function is the function defined on a vector of n bits, each input taking the value 0 or 1, where the output is equal to one if the number of input bits equal to 1 is odd and the output is equal to zero if the number of input bits equal to 1 is even. The process of training a network to learn the parity function or a function similar to the parity function may be very slow for large values of n, because changing any one bit of the n input bits changes the value of the output. In general, when training a network to learn an unknown Boolean function, it will not be known whether the function will be similar to the parity function, either for the function as a whole or the function restricted to some subspace. Similarly, for more general classification problems, it is not known whether some aspect of the classification task will require learning a function with properties like those of the parity function. Therefore, it is usually not possible to specify a special-purpose architecture that, if known, could efficiently compute the parity function or generalizations of the parity function. The method of FIG. 15 provides an efficient general-purpose procedure for learning complex functions with properties like the parity function.

The task of training a network to learn a function similar to the parity function is much easier for smaller values of n. In box 1501, the computer system creates ensemble members, each of which takes a subset of the total input vector as input. For example, if the input is a 32-bit vector, the ensemble may consist of many ensemble members, each of which has a smaller number of input bits (e.g., 4). For the parity function or a close approximation to it, the correct output value of any 4-bit input subset of a 32-bit vector will be split almost 50/50 between odd and even outputs when averaged over the entire data set. Let each ensemble member train on a different subset of the training set, and let the data assignment be based on dynamically changing data assignment weights. Then each ensemble member will evolve to specialize on a data subset such that the number of 1 bits in the other 28 input bits not included in the 4-bit input vector is always odd or is always even. On such a data subset, each ensemble member will quickly learn the proper 4-bit parity function. In the merged network created in 1502, with the combining network created in 1503, the computer system will train the total network to compute the parity function for successively larger subsets of the 32-bit input vector and larger subsets of the training data, culminating in the full parity function or any similar function.

In box 1502, the computer system merges the collection of networks, and box 1503 adds a self-organizing combining network. Although the collection of networks created or obtained in box 1501 is not necessarily an ensemble, in boxes 1502 and 1503, the computer system can build a combined network with a process similar to the process described in association with boxes 1302 and 1303 of FIG. 13.

Boxes 1504 and 1505 are optional. On the other hand, they are also very general in their range of applicability. They are not limited to networks created by merging smaller networks. They can be used in any neural network or collection of neural networks. They also can be applied to any SoPoNet or collection of SoPoNets. Boxes 1504 and 1505 are described here, and the convolutional neural network example was mentioned above, because the labeling in box 1504 and the regularization in 1505 generalize the sharing of weight parameters in the convolution filters in a convolutional neural network.

In boxes 1504 and 1505, the computer system can tie together weights that are merely expected to be similar rather than applying only to the case when they are forced to be identical. The tying in box 1504 is implemented through a shared label and is called "soft-tying." Directly tying the values of the weight parameters is called "hard-tying." Hard-tying can be implemented by soft-tying with an extreme value for the associated hyperparameter, so hard-tying can be considered a special case of soft-tying. The effect of the soft-tying is achieved through a regularization penalty applied in box 1505.

In box 1504, the computer system can also tie together the activations of sets of nodes whose activations are expected to be similar when presented with the same input data, which requires a separate discussion. Of course, the activation value of a node depends not only on the characteristics of the node in isolation but rather of the whole subnetwork that feeds it. Unlike a weight parameter, the activation of a node also depends on the input data example. The tying represents the expectation that the activation of the node as a culmination of the activations in its subnetwork will be similar to another node as the culmination of the action of its own subnetwork when they are presented with the same data. Nodes that are located in the same conventional network can have their activations soft-tied for individual data examples.

The merged network of FIG. 15 requires a more general version of node soft-tying. This more general version of soft-tying also applies to ensembles and arbitrary collections of networks. In this more general version, the soft-tying regularization is applied to nodes that are in different networks or, in the case illustrated in FIG. 15, subnetworks that received different subsets of the input data. The soft-tying regularization is applied to when the same data is supplied at different times to the separate networks. In this case, the soft-tying is intended to represent shared knowledge or knowledge to be learned that is hopefully sharable.

If, in the merged collection of networks, there are weights or node activations that are expected to be the same or similar, then the soft-tying of boxes 1504 and 1505 is applied. Otherwise, boxes 1504 and 1505 are skipped. In either case, in box 1506, the computer system resumes iterative training of the combined network.

Figure 16:
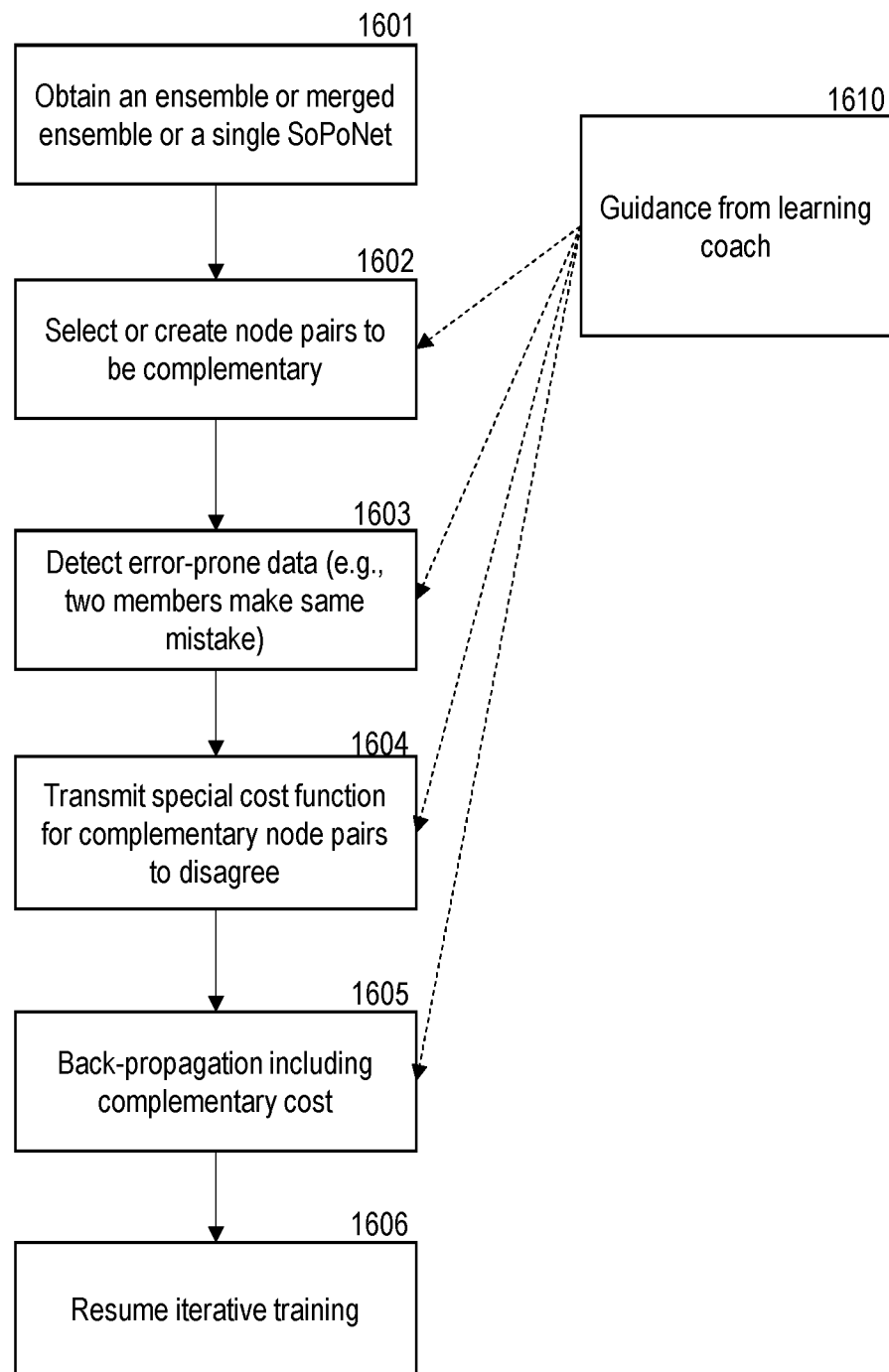
FIG. 16 is a flow chart of a process for training subsystems of a machine learning system to learn complementary knowledge.

FIG. 16 implements a procedure, called counter-tying, for improving the performance of any ensemble or merged ensemble. Counter-tying can be applied to the output nodes in a conventional ensemble in the form of an extra cost function imposed by a learning coach. In the case of a merger of an ensemble of SoPoNets or a single SoPonNet, counter-tying can be applied to any two existing nodes in the network, to two nodes that are created just for the purpose, or to two nodes that are created by node splitting as described in association with box 404 of FIG. 4.

In box 1601, the computer system obtains an ensemble, a merged ensemble, or a single self-organizing partially ordered network. The members of the ensemble or merged ensemble may be conventional networks. In box 1602, the computer system selects or creates two nodes that are to be trained to be complementary. In this context, "complementary" means that the two nodes are trained to perform a pattern recognition or feature detection task better by working together than by being trained to optimize their individual performance. Furthermore, they are not only trained to be complementary, but their joint goal is to contribute as much as possible to improving the performance of the whole network rather than to optimizing their own performance in isolation.

In box 1603, the computer system detects data on which an error has been made or an error on similar data is likely because two or more members of the ensemble have both made the same mistake. It also detects the corresponding condition when it occurs among the subnetworks representing former ensemble members in the combined network of a merged ensemble. In one embodiment, the learning coach 1610 controls hyperparameters that adjust the relative cost of the terms in the special cost function.

When, in box 1603, the computer system detects a case of such error-prone data, in box 1604, the computer system applies a special regularization cost term to the node pairs created or selected in box 1602. The special regularization cost function penalizes the two nodes for agreeing with each other and/or rewards them for being different. Note that the penalty for agreeing is only applied on data examples in which two or more ensemble members or merged former ensemble members make the same mistake. In other situations, the selected node pairs are trained with the normal back-propagation of the main objective alone. In box 1605, the computer system applies back-propagation, including back-propagating the extra cost term from the selected node pairs back to their subnetworks. In box 1606, the computer system resumes the iterative training.

The intent is that the special training of the selected node pairs will enable the SoPoNet to learn to solve a dilemma that occurs when training or merging an ensemble of high-performance classifiers. It is easy to train an ensemble of weak recognizers to perform better than its individual members. However, relative improvement is harder to achieve in ensembles of high-performance classifiers. It is tempting to think that with two or more classifiers that each have an error rate of less than one percent, "if the errors were just independent the probability that they both would be wrong is less than 0.0001." Of course, the errors are not independent. Most of the data is easy to classify and the high-performance classifiers both get all of the easy cases right. They both only miss the very difficult examples. With an ensemble of three or more members, it is still tempting to think, "if only no two of the ensemble members would make the same mistake." However, it is difficult to train the ensemble members to be different from each other while also training each of them to try to be right all of the time.

The process in FIG. 16 avoids directly going after this difficult, possibly self-contradictory goal. Instead, the complementary node pairs are trained to learn something that may be useful to the combined network to improve its joint performance. It does not prescribe how this information should be used.

FIG. 17 is a flow chart that generalizes the techniques of the other diagrams to recursive networks, but the impact of that generalization is much greater than may be apparent at first. After explaining the steps in FIG. 17, its impact will be explained. In summary, it not only generalizes all the capabilities of self-organizing within a partially ordered network, it essentially removes all the limitations.

In box 1701, the computer system enables and selects one or more reflexive and/or backward connections. In one aspect, the computer system, at box 1701, can select the reflexive and/or backward connections that are most important to the task objective. Although there is no conceptual limit to the number of reflexive and/or backward connections selected by the computer system, in some aspects the number of selected connections can be limited by the memory and computation resources available to the computer system. Limitations of memory and computation need to be assessed in the light of the large unrolled supernetwork that is constructed in box 1702.

In box 1702, the computer system unrolls multiple copies of the original self-organizing partially ordered network. Each copy receives a counter value t.

In box 1703, the computer system imposes a strict partial order on t. Any strict partial order can be used. In some embodiments, it uses the transitively closed partial order rather than the linear order commonly used for unrolling recursive neural networks for back-propagation-in-time. That is, direct connections are allowed from network s to network t if s<t.

In box 1704, the computer system defines the partial order among all the nodes in all the copies of the original network. It uses lexicographic order. That is, if a[s] is a node in network copy s and b[t] is a node in network copy t, then a[s]<b[t] either if s<t or if s=t and a<b in the original partially ordered network.

In box 1705, the computer system adds or activates any desired connections from a node in network s to a node in network t if s<t. In box 1704, the computer system defines the partial order so that each of these connections is possible. In one embodiment, learning coach 1710 guides the self-organizing process within each network copy and in the partial order among the network copies.

In box 1706, the computer system then runs self-organized training on the whole unrolled network. This training has all of the representation and learning capabilities of all the techniques discussed in association with other figures. It also has all of the self-organizing capabilities discussed before, but it is no longer prevented from making a connection from node a to node b if it makes the connection from a copy a[s] of node a to a copy b[t] of node b, where s<t.

As a technique for accelerating learning, this means that, if the quantity CADV(a,b) is large, it can look for pairs of counter values s and t for which the magnitude is also large when b[s] is substituted for b and a[t] is substituted for a. For example, if act(b) and δ(a) are similar in all copies of the network, then any pairs <t may be chosen. On the other hand, if the cross-derivative only has a large magnitude for certain pairs s and t, then the network copies for s and t can be directly connected. With this degree of freedom to choose new connections to activate, the self-organizing procedure will almost always be able to accelerate the learning.

FIG. 17 generalizes the techniques of the other diagrams to recursive networks. When combined with the representation and learning power of self-organizing partially ordered networks, adding recursion is paradigm shifting. This change represents a much greater generalization than merely applying these techniques to recursive neural networks. It is even much greater than merely applying these techniques to recursive self-organizing partially ordered networks.

This procedure unrolls the recursive network with multiple network copies with a counter value t, in a fashion similar to back-propagation in time for neural networks. However, the unrolled network as a whole is a self-organizing partially ordered network. The counter value t is not restricted to be a linear order like time. Like the relation in each network, it is also only a partial order. Any copied network can be directly connected to any higher network copy. There is not necessarily any distinction between long-term and short-term memory.

Even more important, perhaps, is the fact that the unrolling does not only enable reflexive connection from a node to itself. The unrolling allows all connections, including backward connections. It allows the self-organized learning to make any of the connections from node b to node a that were blocked in FIGS. 9 and 10 because a<b. Thus, to accelerate learning or to escape from a local minimum, a new connection can be created from any node a to any node b. This property, in turn, eliminates most of the difficulty in choosing which cross-connections to make first when building large networks by merging collections of smaller networks.

Thus, FIG. 17 not only extends the benefits of all the techniques in other figures to recursive neural networks, it extends the benefits of unrolling to all the other techniques in the other figures.

FIG. 18 is a block diagram of a system that combines asynchronous exploration of multiple network architectures with SoPoNets' self-organizing capabilities. Box 1800 represents the main network being trained. In one embodiment, the main network 1800 comprises a main task subnetwork 1801 that is being trained with the same, or substantially the same, objective and training data as the full main network 1800. It also comprises one or more subnetworks 1811 and 1812 that are being trained with objective functions and training data that represent subtasks. A subtask differs from the main task in one or more ways, including, but not limited to, the following examples:

1. The subtask receives as input data variables that are a subset of the input data variables of the main task.
2. The subtask is trained on a subset of the training data for the full, main task. Examples of data selection methods include but are not limited to:
   (a) The data subset is a confusable cohort, as in FIG. 5.
   (b) The data subset is selected to represent one or more examples of errors and close calls made by the main task subnetwork.
   (c) The data subset is selected by data splitting as in FIG. 4.
   (d) The data subset is selected at random.
   (e) The data subset is a member subset of a designed partition of the data, such as used in box 1101 in FIG. 11.
3. The subtask has an objective that distinguishes only a subset of the categories to be distinguished in the main task.
4. The subtask has an objective that has categories corresponding to a partition of the set of categories for the main task. That is, each category in the subtask may represent one or more categories from the main task.
5. The subtask is a subtask selected by box 702 in FIG. 7.
6. The subtask represents a network that has been merged into the main task subnetwork, as in the process or FIG. 8 or the process of FIG. 13.
   (a) The subtask may have the same objective as the separate network before the merger, which may be different than the objective of the merged network.
   (b) The subtask may be trained on the same data as the separate network before the merger, which may be different from the training data for the main task.
7. The subtask may represent a former member of an ensemble of networks. The main task subnetwork may or may not comprise a subnetwork representing the merger of the ensemble of which the subtask network was formerly a member.
8. The network for the subtask may be a network that has a different architecture than the main task network, with examples including, but not limited to:
   (a) The subtask network may have fewer parameters or fewer degrees of freedom than the main task network.
   (b) The subtask network may have been produced by a large-step or trial-and-error change in the main task. One or both of the main task network and the subtask network may have continued self-organizing learning since the subtask network was originally produced.
   (c) The subtask network may have been produced by separate training, as in box 1820, to be described below.

In one embodiment of box 1800, each of the one or more subnetworks represented by boxes 1801, 1811, and 1812 may have directed arcs in either direction between nodes in a first subnetwork and one or more other subnetworks where the one or more other subnetworks may be the main task subnetwork or a subtask subnetwork.

In one embodiment, subtask networks may be created or deleted under guidance of learning coach 1810. For example, learning coach 1810 may experimentally create subtasks based one or more of the examples in the list above. Learning coach 1810 may then decide to keep or delete a subtask and decide when to create a new subtask based on reinforcement learning, which is a technique well known to those skilled in the art of machine learning.

Box 1820 represents one or more groups of one or more networks that are trained separately from the main network 1800. There may be more than one instance of box 1820. Each instance of box 1820 may have zero or more main task subnetworks, such as 1821 and 1831, with the substantially the same objective as the main task network 1801 in the main network 1800. Networks 1821 and 1831 may or may not have the same training data as network 1801. In addition, each instance of box 1820 may have zero or more subtask networks, such as 1822 and 1832, that are similar to the subtask networks 1811 and 1812 in the main network 1800.

The subtask networks 1822 and 1832 in a separate network 1820 may have directed arcs connecting them to each other and/or connecting them to one or more of the main task subnetworks 1821 and 1831 in the same instance of box 1820.

In addition to the directed arc connections, nodes in different separate networks or in the main network may be soft-tied with nodes in other separate networks, as described in association with FIG. 15.

The learning coach 1810 actively monitors the learning progress of the main network 1800 and each of the separate networks 1820. This monitoring includes, but is not limited to: (1) monitoring the rate of training progress, for example, the magnitude of the gradient and/or the rate of reduction in the error cost function; (2) monitoring errors or close calls in training data, development test data, or operational data; and (3) monitoring performance statistics on validation data.

Based on this active monitoring, learning coach 1810 makes decisions, such as to copy one or more subnetworks from one of the separate networks 1820 into the main task network 1800. The copied subnetwork may either become a new subtask network, such as 1811 or 1812, or it may be merged into the main task subnetwork 1801, for example, by any of the processes illustrated in FIGS. 7, 8, and 13. Learning coach 1810 may also drop less productive subnetworks or an entire separate network 1820. Learning coach 1810 may also copy a subnetwork from one separately trained network 1820 or from main network 1800 to a second separate network 1820.

In finding an optimum architecture, the system illustrated in FIG. 18 combines the capabilities of four distinct approaches in exploring network changes: (1) the self-organizing learning of a SoPoNet; (2) reinforcement learning based on trial-and-error exploration of large-step, discontinuous changes in the architecture; (3) exploring design space by managing a semi-asynchronous swarm of models; and (4) simulating natural selection through copying networks, merging networks, and dropping less productive networks. FIG. 18 also includes the capability to share knowledge, both through node soft-tying and through actions of learning coach 1810 to copy subnetworks. In one embodiment, the sharing of knowledge is performed with a lower frequency than the updates in training the networks. Therefore, the knowledge sharing may be done even when the main network 1800 and one or more of the separate networks 1820 are implemented on a distributed set of computers with limited data bandwidth. For example, the main network 1800 and one of more of the separate networks 1820 may be at different locations and communicating over a packet-switched network, such as the Internet.

The directed arcs in a layered neural network define a unique directed acyclic graph G. However, for any directed acyclic graph G there may be more than one way to arrange the nodes in the directed acyclic graph G into layers, as depicted in FIGS. 21A-C, for example. The directed acyclic graph G describes the specific computations that must be done in the feed-forward and back-propagation computations, and the directed arcs place restrictions on the order in which the computations must be done. If there is a directed arc from node A to node B, the activation of A must be computed before the activation of B can be computed. However, that restriction does not completely determine the order of the computations on the nodes. For example, the activations of any set of incomparable nodes may be done in any order.

Although not originally designed for this purpose, arranging the nodes of a DAG into layers provides a means to represent more restrictions on the order of the computation. That is, the layers in a layered feed-forward neural network can be interpreted as specifying that the layers in the network be processed in order but that there is no restriction on the order of the processing among the nodes within a single layer. For example, the nodes within a single layer may be processed simultaneously in parallel if there is parallel hardware available with sufficient capacity.

Another purpose for mapping a computation DAG G of a SoPoNet into a layered network is that the assignment of nodes to layers facilitates a quick partial test of the relationship of a node pair (A, B). If A is in a lower layer than B, then either A<B or A and B are incomparable.

Figure 19:
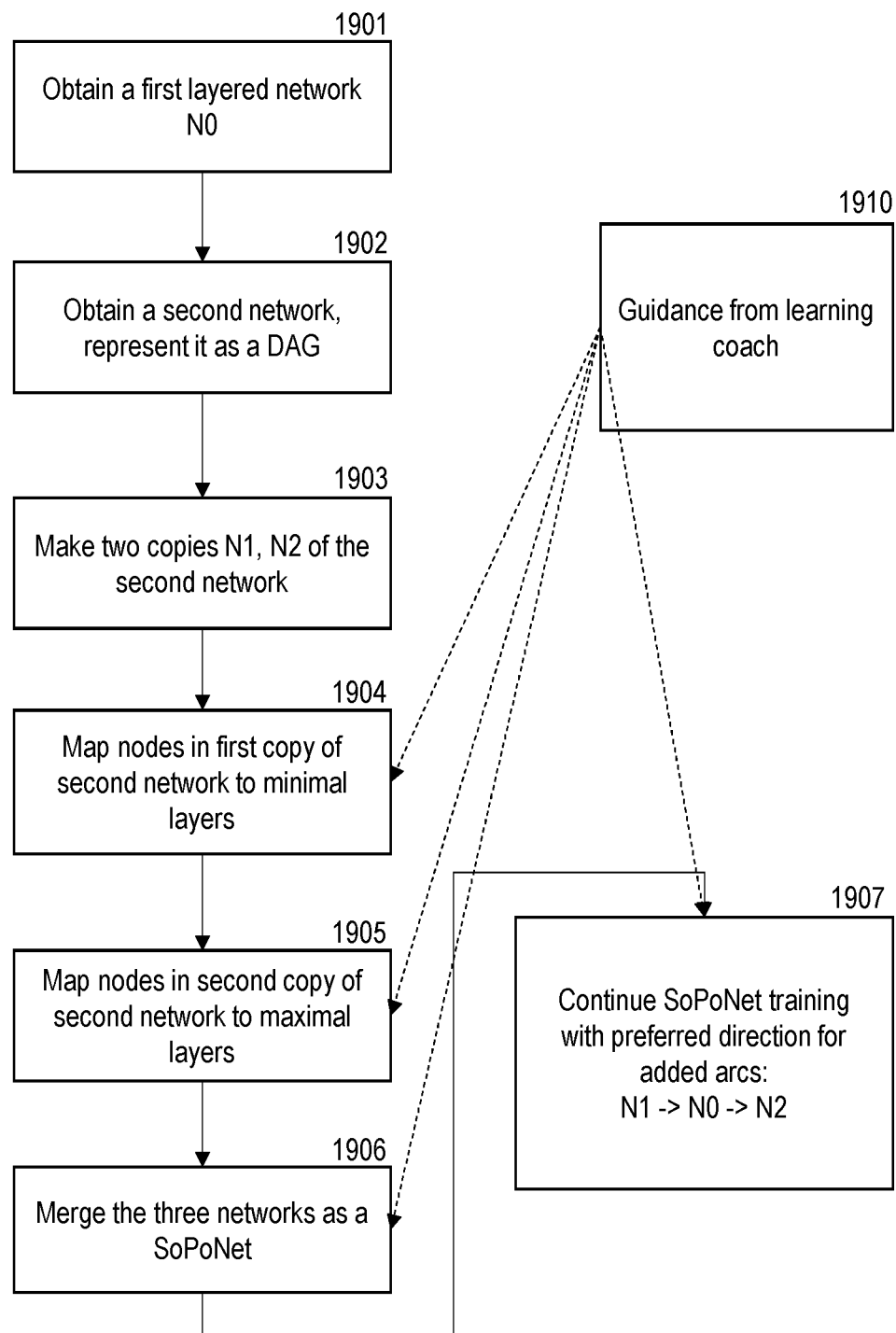
FIG. 19 is a flow chart for a process mapping a directed acyclic graph into a layered network representation.

FIG. 19, however, uses the mapping of a DAG into a layered feed-forward network for a different purpose: to facilitate the self-organizing learning in a SoPoNet that is created by the merger of two or more networks. In box 1901, the computer system obtains the first of these networks, NO. NO is represented as a layered network. If NO is a DAG with nodes that have not been assigned to layers, it can be mapped to a layered network, for example, by either the process used in box 1904 or by the process used in box 1905. In box 1902, the computer system obtains a second network, represented as a directed acyclic graph, that is a graph for which layers have not been specified or for which the current layers will be ignored and replaced in boxes 1904 and 1905. In box 1903, the computer system makes two copies, N1 and N2, of the second network.

In one embodiment, in box 1904, the computer system maps the nodes of network N1 into layers such that each node is assigned to as low a layer number as possible. Pseudocode to compute such a mapping is as follows:

```
Mark all the nodes as unassigned;
Let L represent the current layer;
Start with L = 0 then increment L until all the nodes have
been assigned to a layer {
    Assign any unassigned node B to layer L, for all arcs
    (A, B), A is in a lower layer than L
    Repeat for the next higher layer }
```

Notice that layer L=0 will only contain nodes with no incoming arcs, that is, the input layer. Let numL be the maximum of the number of layers in NO and the number of layers in N1.

In one embodiment, in box 1905, the computer system maps the nodes of network N2 into layers such that each node is assigned to as high a layer number as possible. Pseudocode to compute such a mapping is as follows:

```
Mark all the nodes as unassigned;
Let L represent the current layer;
Start with L = numL then decrement L until all the nodes
have been assigned to a layer {
    Assign any unassigned node A to layer L, for all arcs
    (A, B), B is in a higher layer than L
    Repeat for the next lower layer }
```

In one embodiment, if there are more layers in the second network than in the first network, then the roles of the two networks are reversed.

If the second network obtained in box 1902 is already a layered network, then in some embodiments, the remapping into layers of box 1904 and 1905 is optional. However, if the number of layers in the second network is comparable to or greater than one-half the number of layers in NO, then the remapping may be desirable. In any case, the layers in N2 are renumbered so that the highest layer in N2 is numbered the same as the highest layer in NO and so on throughout the decreasing layer numbers.

In box 1906, the computer system merges the three networks, NO, N1, and N2. In box 1907, the computer system commences or continues self-organizing training. In this training, when arcs are added connecting a node in one of the three subnetworks to a node in a different one of the three subnetworks, either a fixed regularization rule or guidance from learning coach 1910 can enforce a preference for the direction of the arcs. For example, a regularization rule or guidance from the learning coach 1910 can exhibit a preference for arcs going from subnetwork N1 to subnetwork N0 or N2 and from subnetwork N0 to subnetwork N1.

In another example embodiment, two copies of the first network are also created and mapped to layered networks in the manner of box 1904 and 1905. Then the four subnetworks are merged into a single SoPoNet, with the preferred direction of arcs connecting the subnetworks generally being from the networks with the mappings created in box 1904 to the mappings created in box 1905.

The process illustrated in FIG. 19 is an illustrative method for merging knowledge subnetworks as described in association with FIG. 14. It also may be used for merging networks as illustrated in FIGS. 7, 8, and 15.

Figure 20:
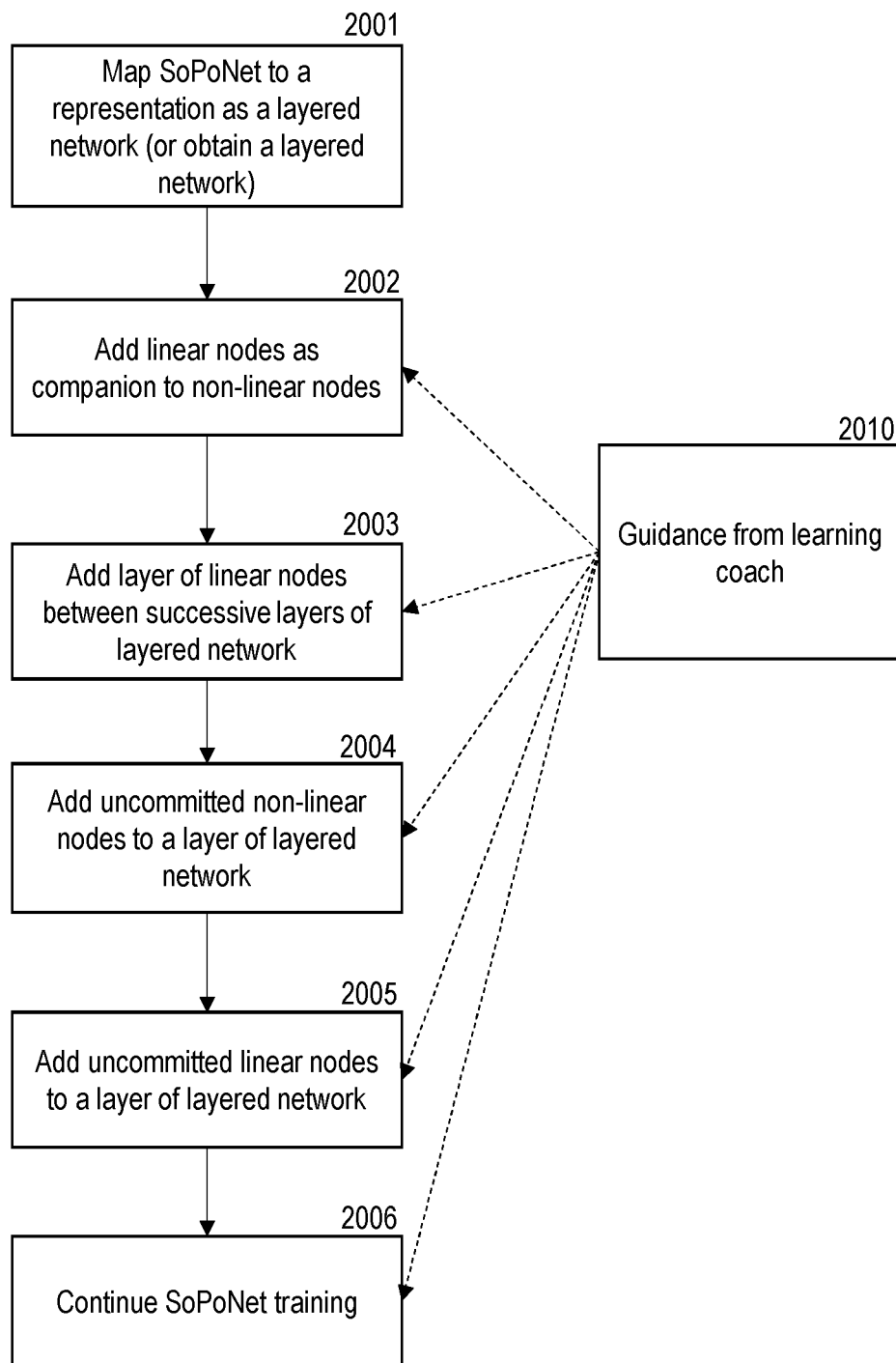
FIG. 20 is a flow chart of a process of augmenting a layered neural network.

FIG. 20 illustrates several processes by which many nodes may be added at once to a layered feed-forward neural network with no degradation in performance. FIG. 20 deals with the process of placing nodes being added to a layered network.

Several of the examples use linear nodes. Linear nodes were mentioned as an example of a special computation node in the discussion of FIG. 14. Contrary to conventional wisdom, linear nodes can be quite useful in facilitating the learning process for networks with many layers.

In box 2001, the computer system obtains a layered network or maps the nodes of an unlayered SoPoNet into layers.

Figure 23A:
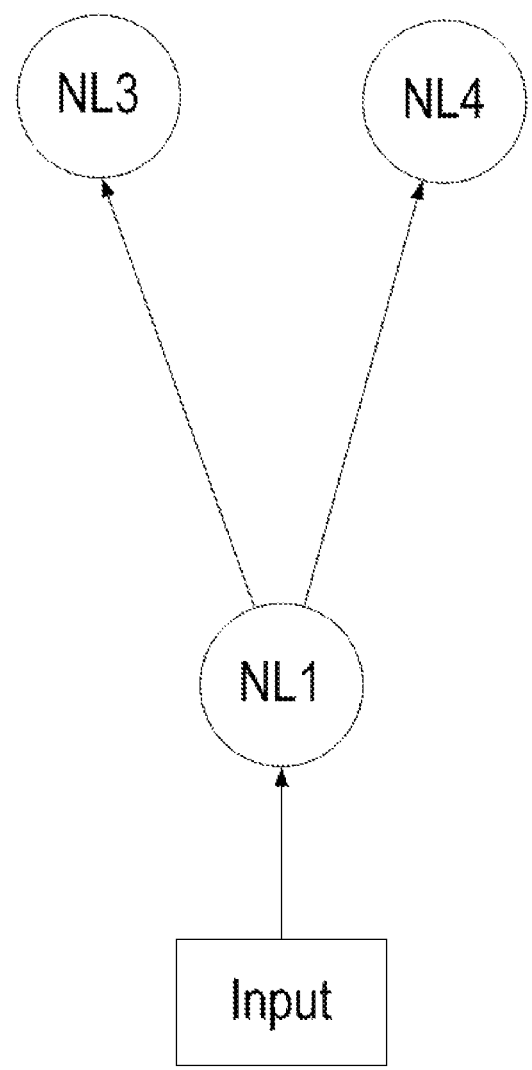
FIG. 23A is a diagram of a neural network.
Figure 23B:
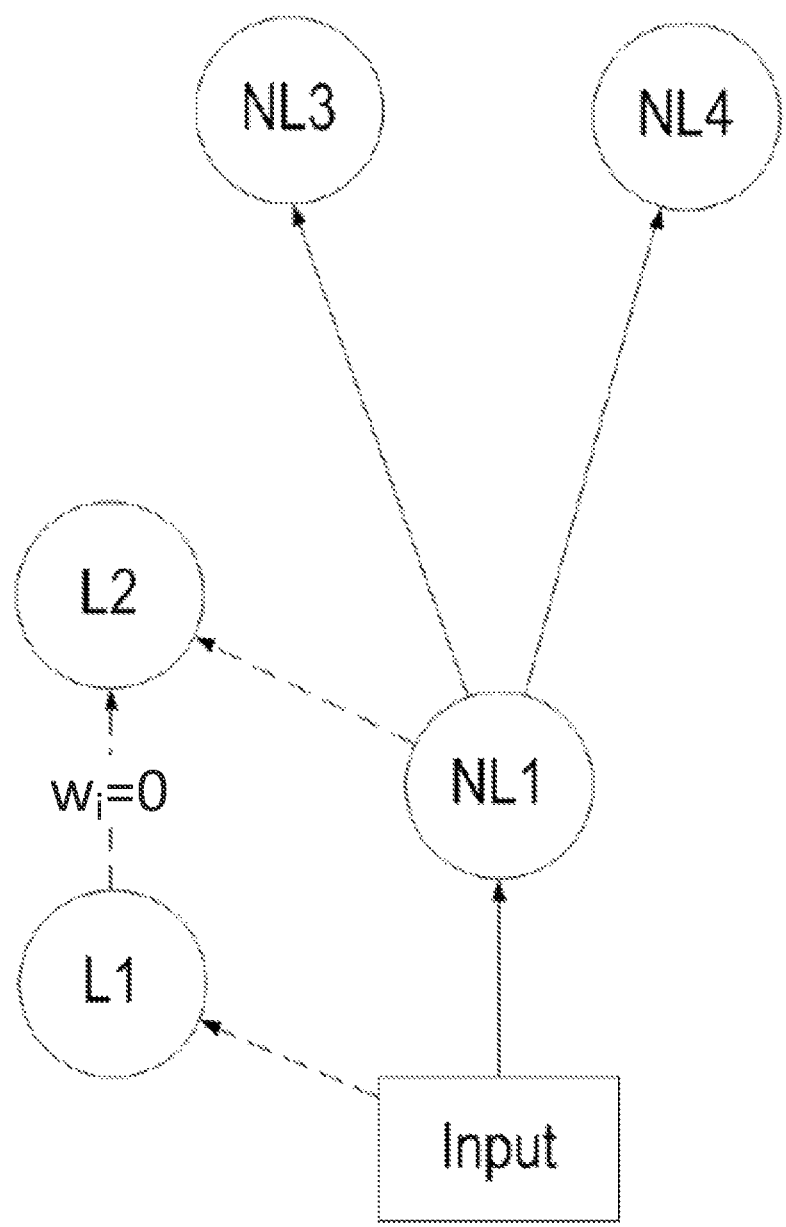
FIG. 23B is a diagram of the neural network of FIG. 23A undergoing a process of linear companion nodes being added to a non-linear node.
Figure 23C:
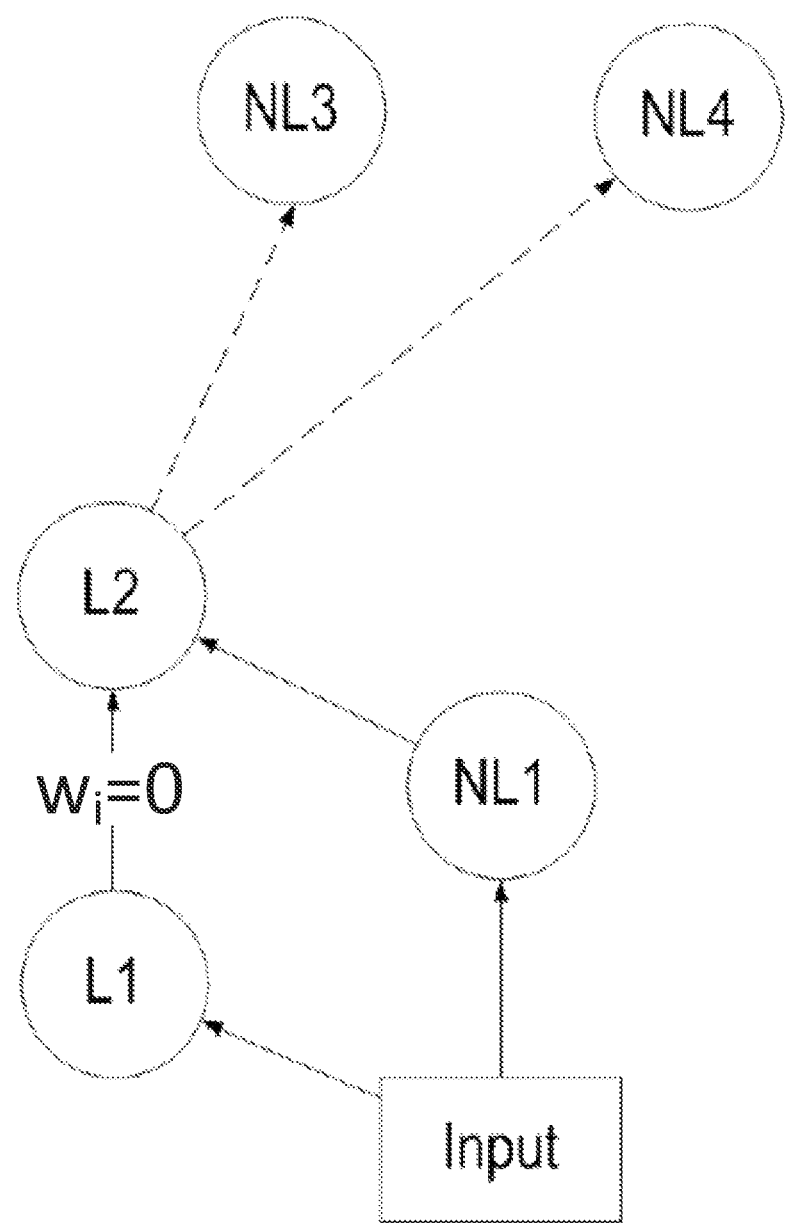
FIG. 23C is a diagram of the neural network of FIGS. 23A and 23B undergoing a process of linear companion nodes being added to a non-linear node.

Boxes 2002, 2003, 2004, and 2005 are all individually optional and may be done in any order. In box 2002, the computer system adds one or more linear nodes as a companion to a non-linear node. In one embodiment, a linear node is added as a companion to every non-linear inner layer node. For example, FIG. 23A depicts an illustrative feed-forward network including a first non-linear node NL1 that includes directed arcs to a second non-linear node NL2 and a third non-linear node NL3. The non-linear node NL1 is an inner layer node that receives an input, which may include directed arcs from foregoing layers in the feed-forward network. FIG. 23B depicts linear nodes L1, L2 being added as companions to the inner layer non-linear node NL1. In one embodiment, a first linear companion node L1 is initialized to receive the same inputs as the non-linear node NL1 and a second linear node L2 receives input just from the non-linear node NL1 and the first linear node L1, with the weight of the connection from the first linear node L1 to the second linear node L2 initialized to zero (i.e., $w_i$=0), as depicted in FIG. 23B. The directed arcs that had been arcs leaving the non-linear node NL1 are connected instead as outgoing arcs from the second linear node L2, as depicted in FIG. 23C. It should be noted that in FIGS. 23B and 23C, the dashed lines represent the directed arcs that have been added or changed in the particular step of the depicted process and do not signify that there is anything fundamentally different regarding the dashed arcs relative to the arcs depicted in solid lines. In one embodiment, the weights respectively connecting the non-linear node and the first linear node to the second linear node are constrained to sum to one. This process can then be repeated for each of the inner layer non-linear nodes in the network.

In some embodiments, the weights on the arcs coming into the linear node L2 are not only initialized to be the same as the weights on the corresponding arcs into the non-linear node, they are hard-tied or soft-tied during further training. If the weights are hard-tied, an alternate implementation of the non-linear node NL1 and the two linear nodes L1, L2 is as a single complex node that computes the equivalent output.

In one embodiment, the linear node has a slope parameter, which may either be a learned parameter or a hyperparameter that is controlled by a fixed schedule or, in one embodiment, is custom controlled for each node by the learning coach 2010. One of the purposes of the linear companion node is to prevent the vanishing gradient in the saturation region of a sigmoid or tan h activation function or the dead region of a rectified linear unit. In one embodiment, learning coach 2010 actively monitors each non-linear node, noting data examples in which the activation function is in a region of the function with a low magnitude derivative on a data example for which the sign of the gradient is toward the other extreme of the activation function. When such a condition exists, the learning coach makes a decision among possible remedies, such as increasing the temperature of the non-linear node if there is a hyperparameter to control the temperature, increasing the weight of the arc connecting the first linear node to the second linear node, or increasing the slope of the first linear node.

In some embodiments, the slope of the first linear node and/or the weight connecting it to the second linear node is regularized to converge to zero as the training converges to its final answer.

In box 2003, the computer system adds a layer consisting just of linear nodes between two successive layers of the layered network. It is initialized to be the identity. Under training, this linear layer can learn rotation and scaling of vector space of output values from the preceding layer to the vector space of input values for the following layer. For example, it can facilitate mapping from a higher dimension to a lower dimension or mapping from a dense representation to one or more sparse representations.

In box 2004, the computer system adds one or more uncommitted non-linear nodes to a layer of the network. For example, it can add one or more sparse node sets or other feature node sets, as described in association with FIG. 14, to one or more layers of the network. In some embodiments, these feature node sets are added to many or even all of the inner layers of the network.

As another example, in a layered network, the additional nodes created by node splitting as in FIG. 4 are added to the same layer as the original node. As yet another example, special computation nodes, as in FIG. 14, may be added to any layer.

In box 2005, the computer system adds linear nodes to one or more existing layers. In some embodiments, extra linear nodes are added to most or all of the layers. These linear nodes provide a means of passing information from lower layers to non-adjacent higher layers, in addition to or instead of direct connection by arcs that go across many layers. In a SoPoNet that is also a layered network, any node can be connected directly to any node in any higher layer. However, the number of such node pairs grows as the square of the number of layers. On some tasks, adding linear nodes to each layer may be able to achieve the same result with fewer parameters. Training the side network of linear nodes may also be faster and may be less prone to overfitting.

In box 2006, the computer system continues the self-organizing training of the SoPoNet.

In one embodiment, a different learning regime is employed. This learning regime may be applied to any deep learning training, whether the node addition processes of FIG. 20 are used. In this embodiment, the network being trained is first trained according to a mean-squared-error cost function. Then by rule, or under guidance of learning coach 2010, the cost function is changed to a maximum likelihood cost function. In one embodiment, during the mean-squared-error training, there are linear output nodes. Either the regular output nodes are temporarily replaced by linear nodes or a set of supplementary linear nodes are added to the output layer, as in box 2005. In one embodiment, these supplementary linear output nodes are in one-to-one correspondence with the regular output nodes. In some embodiments, each linear output node has its activation soft-tied to the corresponding regular output node.

Finally, in reference to all the techniques in FIGS. 2-20 that add one or more elements to a network: Such an addition always adds one or more parameters for which the partial derivative of the objective is non-zero. This property is true when the system before the addition has been in a condition of slow learning. This property is also true when the system before the addition has converged to a stationary point, even if the stationary point is a global minimum. That is, improvement can be made even when the system before the addition has been trained to a global minimum of objective for weight parameter settings for the fixed network architecture.

In other words, for any network that has been trained to convergence for a fixed architecture, by treating the network as a self-organizing partially ordered network rather than as a fixed network, adding an element always makes it possible to improve the performance that was the best possible for the fixed network.

As an example, consider the technique of node and data splitting discussed in association with FIG. 4. It is always possible to improve the performance of any fixed network unless the gradient of the objective is zero, not just for the full training batch as a whole, but for every data example individually. Such a condition is extremely unlikely. For example, the ability to construct adversarial examples (i.e., data examples that have been generated or modified in a manner that is intended to cause the classifier to misclassify them) is based on the fact that the gradients for the individual data examples are not zero. Therefore, node splitting can always be used to improve the performance of any system, unless the performance is already perfect.

Figure 25:
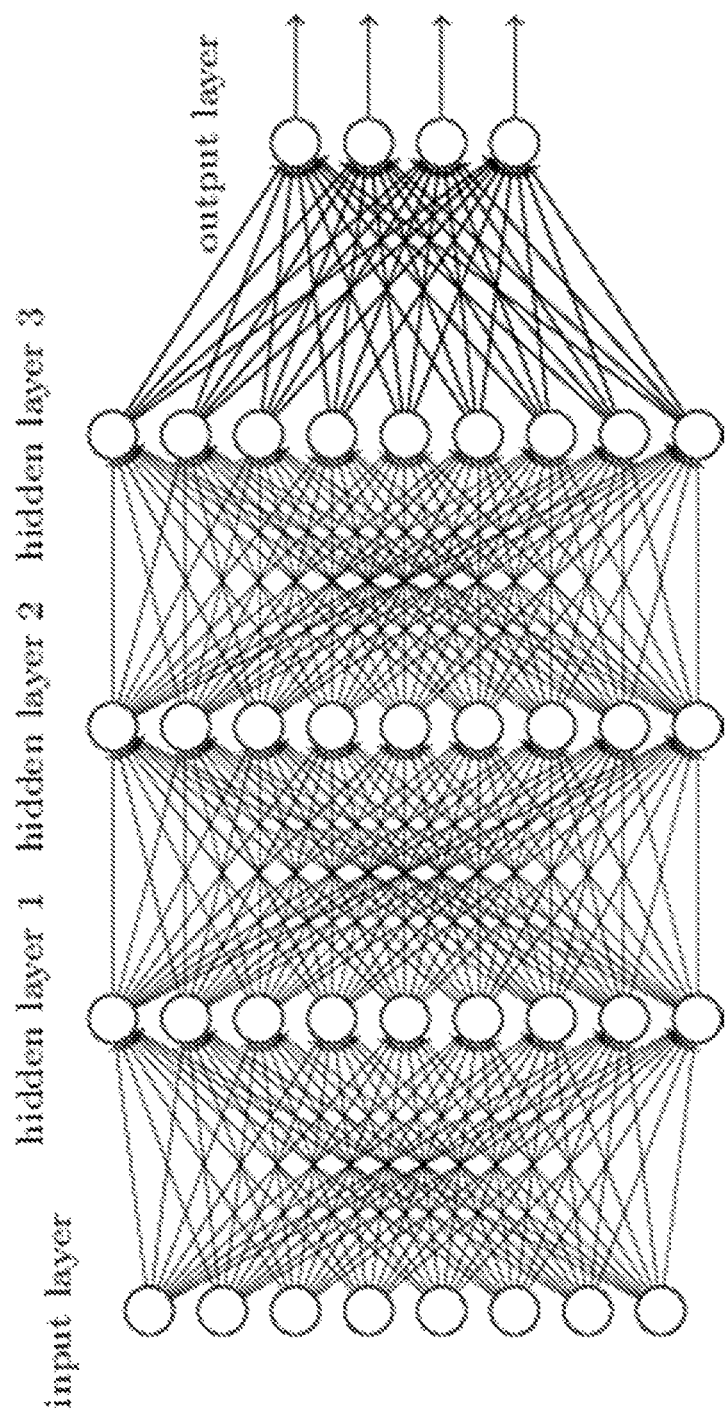
FIG. 25 is a diagram of a deep feed-forward artificial neural network such as may be used in various illustrative embodiments of the invention.

FIG. 25 is illustrates an example of a multilayer feed-forward deep neural network. Some components of the current invention may comprise neural networks, such as the example neural network shown in FIGS. 21A-C. A neural network is a collection of nodes and directed arcs. The nodes in a neural network are often organized into layers. In a feed-forward neural network, the layers may be numbered from bottom to top, when diagramed as in FIG. 25. Each directed arc in a layered feed-forward neural network goes from a source node in a lower layer to a destination node in a higher layer. The feed-forward neural network shown in FIG. 25 has an input layer, an output layer, and three inner layers. An inner layer in a neural network is also called a "hidden" layer. Each directed arc is associated with a numerical value called its "weight." Typically, each node other than an input node is associated with a numerical value called its "bias." The weights and biases of a neural network are called "learned" parameters. During training, the values of the learned parameters are adjusted by the computer system 2400 shown in FIG. 24. Other parameters that control the training process are called hyperparameters.

A feed-forward neural network may conventionally be trained by the computer system 2400 using an iterative process of stochastic gradient descent with one iterative update of the learned parameters for each minibatch. In stochastic gradient descent, the full batch of training data is typically arranged into a set of smaller, disjoint sets called minibatches. An epoch comprises the computer system 2400 doing a stochastic gradient descent update for each minibatch contained in the full batch of training data. For each minibatch, the computer estimates the gradient of the objective for a training data item by first computing the activation of each node in the network using a feed-forward activation computation. The computer system 2400 then estimates the partial derivatives of the objective with respect to the learned parameters using a process called "back-propagation," which computes the partial derivatives based on the chain rule of calculus, proceeding backwards through the layers of the network. The processes of stochastic gradient descent, feed-forward computation, and back-propagation are known to those skilled in the art of training neural networks. However, the present application describes other techniques for training nodal networks, such as feed-forward networks, that includes the process illustrated in FIG. 2 and other related techniques described herein.

Based on the above description, it is clear that embodiments of the present invention can be used to improve operation, including the learning, of machine learning systems, including deep neural networks, in a variety of applications. For example, embodiments of the present invention can improve recommender systems, speech recognition systems, and classification systems, including image and diagnostic classification systems, to name but a few examples.

The processes in the figures can be performed by machine learning computer systems, which can be implemented with computer hardware and software. For example, they could be part of an integrated computer system (e.g., a server or network of servers) that has multiple processing cores. The program instructions could be stored in computer memory, such as RAM, ROM, processor registers or processor cache, etc., that is accessible by the processing cores. The processor cores may comprise CPU or graphical processing unit (GPU) cores. GPU cores operate in parallel and, hence, can typically process data more efficiently that a collection of CPU cores, but all the cores execute the same code at one time. The various machine learning systems could be part of a distributed computer system. In such embodiments, the computer devices (e.g., servers) that implement the above-described techniques may be remote from each other and interconnected by data networks, such as a LAN, WAN, the Internet, etc., using suitable wired and/or wireless data communication links. Data may be shared between the various systems using suitable data links, such as data buses (preferably high-speed data buses) or network links (e.g., Ethernet).

FIG. 24 is a diagram of a computer system computer system 2400 that could be used to implement the embodiments described above. The illustrated computer system 2400 comprises multiple processor units 2402A-B that each comprises, in the illustrated embodiment, multiple (N) sets of processor cores 2404A-N. Each processor unit 2402A-B may comprise onboard memory (ROM or RAM) (not shown) and off-board memory 2406A-B. The onboard memory may comprise primary, volatile, and/or non-volatile storage (e.g., storage directly accessible by the processor cores 2404A-N). The off-board memory 2406A-B may comprise secondary, non-volatile storage (e.g., storage that is not directly accessible by the processor cores 2404A-N), such as ROM, HDDs, SSD, flash, etc. The processor cores 2404A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host processor 2410 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 2404 may train and/or implement different networks or subnetworks or components. For example, in one embodiment, the cores of the first processor unit 2402A may implement the iterative loop of boxes 201-207 in FIG. 2, and the second processor unit 2402B may implement the learning coach 220 and control boxes 208-210 with the changes in the network communicated to processor 2402A. In other embodiments, one or more of the processor cores 2404 and/or one or more of the processor units could implement other components in the systems herein, such as the one-shot learning of 504 and 603 or the training and validation of many pairs of training and validation sets in 1102, etc. One or more host processors 2410 may coordinate and control the processor units 2402A-B.

In other embodiments, the system 2400 could be implemented with one processor unit 2402. In embodiments where there are multiple processor units, the processor units could be co-located or distributed. For example, the processor units 2402 may be interconnected by data networks, such as a LAN, WAN, the Internet, etc., using suitable wired and/or wireless data communication links. Data may be shared between the various processing units 2402 using suitable data links, such as data buses (preferably high-speed data buses) or network links (e.g., Ethernet).

The software for the various machine learning systems described herein and other computer functions described herein may be implemented in computer software using any suitable computer programming language, such as .NET, C, C++, or Python, and using conventional, functional, or object-oriented techniques. For example, the various machine learning systems may be implemented with software modules stored or otherwise maintained in computer readable media, e.g., RAM, ROM, secondary storage, etc. One or more processing cores (e.g., CPU or GPU cores) of the machine learning system may then execute the software modules to implement the function of the respective machine learning system (e.g., student, coach, etc.). Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal, Haskell, M L; and examples of scripting languages include Bourne script, JavaScript, Python, Ruby, Lua, PHP, and Perl.

Unless specifically stated otherwise as apparent from the foregoing disclosure, it is appreciated that, throughout the foregoing disclosure, discussions using terms such as "processing," "computing," "calculating," "determining," or the like, refer to the action and processes of a computer system e.g., the computer system 2400 of FIG. 24), or similar electronic computing device, that manipulates and transforms data represented as physical (electronic) quantities within the computer system's registers and memories into other data similarly represented as physical quantities within the computer system memories or registers or other such information storage, transmission or display devices.

Various aspects of the subject matter described herein are set out in the following aspects, implementations, and/or examples, which can be interchangeably combined together in various combinations:

In one aspect, a computer-implemented method for controlling a nodal network comprising a first node and a second node, the first and second nodes comprising activation functions that are evaluatable on a dataset according to an objective defined by an objective function, the method comprising: (i) estimating, by a computer system, an effect on the objective caused by the existence or non-existence of a direct connection between the first node and the second node; and changing, by the computer system, a structure of the nodal network based at least in part on the estimate of the effect.

In one further aspect, estimating the effect on the objective comprises: computing, by the computer system, a weighted average over the dataset of a product of an activation of the first node and a partial derivative of the objective with respect to an input to the second node for each data item in the dataset.

In one still further aspect, the dataset comprises a development dataset set aside from a training dataset on which the nodal network was trained.

In one further aspect, the first node and the second node are not directly connected; estimating the effect on the objective comprises estimating, by the computer system, the effect on the objective of adding the direct connection between the first node and the second node; and changing the structure of the nodal network comprises adding, by the computer system, the direct connection between the first node and the second node based at least in part on whether an estimate of the effect on the objective indicates improvement in a performance of the nodal network with respect to the objective due to the existence of the direct connection.

In one further aspect, the first node and the second node are directly connected; estimating the effect on the objective comprises estimating, by the computer system, the effect on the objective of deleting the direct connection between the first node and the second node; and changing the structure of the nodal network comprises deleting, by the computer system, the direct connection between the first node and the second node based at least in part on whether an estimate of the effect on the objective indicates improvement in a performance of the nodal network with respect to the objective due to the non-existence of the direct connection.

In one still further aspect, deleting the direct connection between the first node and the second node is further based at least in part on a magnitude of a connection weight associated with the direct connection between the first node and the second node.

In one further aspect, the nodal network comprises at least one of a strict partially ordered set, a weighted directed acyclic graph, an artificial neural network, or a layered feed-forward neural network, or a combination thereof.

In one still further aspect, the first node is located in a first layer of the layered feed-forward neural network and the second node is located in a second layer of the layered feed-forward neural network; and the first node and the second node are not directly connected.

In one further aspect, the nodal network comprises a first subnetwork and a second subnetwork; the first node is located in the first subnetwork; and changing the structure of the nodal network comprises adding, by the computer system, the direct connection from the first node to the second node based at least in part on whether an estimate of the effect on the objective indicates improvement in a performance of the nodal network with respect to the objective due to the existence of the direct connection.

In one aspect, changing the structure of the nodal network is controlled by a machine learning system executed by the computer system.

In one still further aspect, the machine learning system comprises a learning coach machine learning system.

In one further aspect, the first node and the second node form a cover pair in a strict partial order corresponding to a transitive closure of the nodal network; and changing the structure of the nodal network comprises deleting a first direct connection from the first node to the second node and adding a second direct connection from the second node to the first node based at least in part on whether an estimate of the effect on the objective indicates improvement in a performance of the nodal network with respect to the objective due to replacement of the first direct connection with the second direct connection.

In one further aspect, the computer-implemented method further comprises: freezing, by the computer system, the direct connection between the first node and the second node such that while the direct connection is frozen a connection weight of the direct connection is not changed during training of the nodal network.

In one still further aspect, the connection weight of the frozen direct connection is zero.

In one still further aspect, the connection weight of the frozen direct connection is non-zero.

In one still further aspect, the computer-implemented method further comprises: unfreezing, by the computer system, the frozen direct connection.

In one further aspect, the dataset over which the nodal network is evaluated comprises a full batch of a training dataset.

In one further aspect, the dataset over which the nodal network is evaluated comprises a mini-batch of a training dataset; and estimating the effect on the objective comprises estimating, by the computer system, a gradient of the objective function for stochastic gradient descent.

In one further aspect, the computer-implemented method further comprises: training, by the computer system, the second node to match an output of the first node.

In one further aspect, (i) the nodal network comprises: (a) a first subnetwork for performing a first machine learning task; and a second subnetwork for performing a second machine learning task that is distinct from the first machine learning task; (ii) the first node is located in the first subnetwork; and (iii) the second node is located in the second subnetwork.

In one still further aspect, the computer-implemented method further comprises: inputting, by the computer system, the dataset to the first subnetwork; and inputting, by the computer system, a subset of the dataset to the second subnetwork.

In one still further aspect, the computer-implemented method further comprises: training, by the computer system, the first subnetwork on the dataset; and training, by the computer system, the second subnetwork on a subset of the dataset.

In one still further aspect, the computer-implemented method further comprises: training, by the computer system, the first subnetwork to distinguish a plurality of categories; and training, by the computer system, the second subnetwork to distinguish a subset of the plurality of categories.

In one still further aspect, the first subnetwork is evaluatable based on a first objective and the second subnetwork is evaluatable based on a second objective, the first objective corresponding to a plurality of categories and the second objective corresponding to a subset of the plurality of categories.

In one still further aspect, the first subnetwork is evaluatable based on a first objective and the second subnetwork is evaluatable based on a second objective, the first objective corresponding to a plurality of categories and the second objective corresponding to a subset of the plurality of categories.

In one still further aspect, wherein the first subnetwork and the second subnetwork operate asynchronously, the computer-implemented method further comprises monitoring, by the computer system, an individual performance of each of the first subnetwork and the second subnetwork via a machine learning coach executed by the computer system; and changing, by the computer system, the structure of at least one of the first subnetwork or the second subnetwork to improve a combined performance of the first subnetwork and the second subnetwork.

In one further aspect, the computer-implemented method further comprises: training, by the computer system, the nodal network on the dataset according to the objective; detecting, by the computer system, a problem in a learning process of the nodal network during training of the nodal network via a learning coach machine learning system; and correcting, by the computer system, the problem detected by the learning coach machine learning system.

In one still further aspect, detecting the problem in the learning process of the nodal network comprises: detecting, by the computer system, whether a magnitude of an estimated gradient is less than a threshold value across a plurality of stochastic gradient descent updates via the learning coach machine learning system.

In one still further aspect, the dataset comprises a first dataset; and detecting the problem in the learning process of the nodal network comprises detecting, by the computer system, whether a difference between a performance of the nodal network with respect to the objective on the first dataset and the performance of the nodal network with respect to the objective on a second dataset that is disjoint from the first dataset exceeds a threshold value via the learning coach machine learning system.

In one still further aspect, detecting the problem in the learning process of the nodal network comprises: detecting, by the computer system, whether the nodal network misclassifies a particular data item of the dataset over a plurality of training epochs via the learning coach machine learning system.

In one still further aspect, detecting the problem in the learning process of the nodal network comprises: detecting, by the computer system via the learning coach machine learning system, whether the nodal network classifies a plurality of data items of the dataset into a single category, wherein the classified plurality of data items are designated to be classified into a plurality of categories.

In one still further aspect, detecting the problem in the learning process of the nodal network comprises: detecting, by the computer system, whether a performance of the nodal network with respect to the objective on the dataset is worse than the performance of an ensemble of nodal networks by an amount exceeding a criterion.

In one still further aspect, correcting the problem detected by the learning coach machine learning system comprises: adding or deleting, by the computer system, a connection between the first node and the second node.

In one still further aspect, correcting the problem detected by the learning coach machine learning system comprises: unfreezing, by the computer system, a connection weight between the first node and the second node.

In one still further aspect, wherein correcting the problem detected by the learning coach machine learning system comprises: (i) copying, by the computer system, the nodal network into a plurality of copy nodal networks; wherein the plurality of copy nodal networks each comprise a first set of copy nodes that are copies of nodes of the nodal network that are connected to input nodes of the nodal network; wherein the plurality of copy nodal networks each comprise a second set of copy nodes that are copies of nodes of the nodal network that are connected to output nodes of the nodal network; (ii) combining, by the computer system, the plurality of copy nodal networks into a combined nodal network; (iii) connecting, by the computer system, each of the first set of copy nodes to respective input nodes of the combined nodal network; and (iv) connecting, by the computer system, each of the second set of copy nodes to respective output nodes of the combined nodal network.

In one yet still further aspect, wherein the plurality of copy nodal networks each comprise copy inner layer nodes that are copies of inner layer nodes of the nodal network, the computer-method further comprises: initializing, by the computer system, the combined nodal network such that the copy inner layer nodes of each of the plurality of copy nodal networks are not connected to the copy inner layer nodes of another of the plurality of copy nodal networks; and adding or deleting, by the computer system, connections between the copy inner layer nodes from different copy nodal networks via the learning coach machine learning system; wherein the learning coach machine learning system has been trained to estimate the effect on the objective for the combined nodal network resulting from adding or deleting the connections between the copy inner layer nodes.

In one yet still further aspect, the computer-implemented further comprises: delineating, by the computer system, a strict partial order amongst the plurality of copy nodal networks; determining, by the computer system, whether a first node of a first copy nodal network of the plurality of copy nodal networks is less than or incomparable to a second node of a second copy nodal network of the plurality of copy nodal networks; and adding, by the computer system, a connection from the first node to the second node only if the first node is less than or incomparable to the second node.

In one yet still further aspect, the delineated strict partial order is a total order.

In one yet still further aspect, the computer-implemented further comprises: positioning, by the computer system, the first copy nodal network and the second copy nodal network in the strict partial order such that they are comparable.

In one yet still further aspect, the computer-implemented further comprises: positioning, by the computer system, the first copy nodal network at a first position in the strict partial order; and positioning, by the computer system, the second copy nodal network at a second position in the strict partial order; wherein the first position is lower than the second position.

In one yet still further aspect, the nodal network comprises a first nodal network and the computer-implemented method further comprises: training, by the computer system, a second nodal network to perform a discrimination task that has not been learned by the first nodal network.

In one yet still further aspect, the computer-implemented method further comprises: training, by the computer system, the nodal network via one-shot learning.

In one yet still further aspect, the computer-implemented method further comprises: training, by the computer system, the nodal network to discriminate between a first data item from the dataset and a second data item from the dataset.

In one yet still further aspect, the nodal network comprises a first nodal network and the computer-implemented method further comprises: training, by the computer system, a second nodal network to perform a machine learning task that is not performed by the first nodal network.

In one aspect, a computer-implemented method for controlling a nodal network comprising a first node and a second node, the first and second nodes comprising activation functions that are evaluatable on a dataset according to an objective defined by an objective function, comprises freezing, by a computer system, a direct connection between a first node and a second node such that while the direct connection is frozen a connection weight of the direct connection is not changed during training of the nodal network.

In one further aspect, the connection weight of the frozen direct connection is zero.

In one further aspect, the connection weight of the frozen direct connection is non-zero.

In one further aspect, the computer-implemented method further comprises: unfreezing, by the computer system, the frozen direct connection.

In one aspect, a computer-implemented method for controlling a nodal network comprising a first node and a second node, the first and second nodes comprising activation functions that are evaluatable on a first dataset and a second data set according to an objective defined by an objective function, comprises: (i) assigning, by a computer system, a data influence weight to each data item in the first dataset; (ii) training, by the computer system, the nodal network on the first dataset via stochastic gradient descent, which comprises: computing, by the computer system, a weighted average of an estimate of a gradient in each stochastic gradient descent update according to the data influence weight for each data item in the first dataset; (iii) measuring, by the computer system during training of the nodal network, a performance of the nodal network on a second dataset; wherein the second dataset is disjoint from the first dataset; and (iv) adjusting, by the computer system during training of the nodal network, the data influence weight of one or more data items in the first dataset based on the performance of the nodal network.

In one further aspect, adjusting the data influence weight comprises setting, by the computer system, the data influence weight to zero.

In one further aspect, measuring the performance of the nodal network on the second dataset is semi-supervised.

In one further aspect, the semi-supervised measuring of the performance of the nodal network on the second dataset comprises labeling, by the computer system, data items of the second dataset via a recognizer machine learning system.

In one aspect, a computer-implemented method for controlling a nodal network comprising a first node and a second node, the first and second nodes comprising activation functions that are evaluatable on a dataset according to an objective defined by an objective function, comprises training, by a computer system, the first node to maximize a magnitude of a correlation between the activation function of the first node and a partial derivative of the objective function with respect to an input to the second node.

In one aspect, a computer-implemented method for controlling a nodal network comprises implementing one or more nodes of the nodal network, wherein the one or more nodes comprise non-monotonic activation functions.

In various aspects, each of the aforementioned aspects, implementations, and/or examples of methods can be executed by a computer system comprising a processor and a memory coupled to the processor. The memory stores the nodal network comprising a first node and a second node, the first and second nodes comprising activation functions that are evaluatable on a dataset according to an objective defined by an objective function. Further, the memory stores the steps of the methods as instructions that, when executed by the processor, cause the computer system to perform the method steps.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method for training a nodal network,
the nodal network comprising a classifier network that comprises a plurality of layers;
the plurality of layers comprising an input layer, an output layer and one or more inner layers between the input and output layers; and
each layer comprising one or more nodes,
the method comprising:
iteratively for each training data example in a set of training data:
performing feed-forward computations comprising computing, by a computer system, for each training data example, an activation value for the nodes on the one or more inner layers and for the output layer, wherein the activation values are computed, for each of the nodes on the one or more inner layers and on the output layer, based on one or more connection weights for each node; and
back-propagating, by the computer system, partial derivatives of a cost function for an objective for the nodal network through the nodal network, wherein back-propagating the partial derivatives comprises counter-tying activation values of first and second nodes of the nodal network, wherein counter-tying the activation values of the first and second nodes comprises:
detecting by the computer system an error-prone training data example in the set of training data for the nodal network; and
adding by the computer system an additional regularization cost term to the cost function for the first and second nodes for the error-prone training data example when back-propagating the partial derivatives through the nodal network for the error-prone training data example, wherein the additional regularization cost term rewards the first and second nodes upon a determination that the activation values for the first and second nodes for the error-prone training data example are not in agreement; and after the iterative feed-forward computations and back-propagation for each training data example in the set of training data, updating, by the computer system, the one or more connection weights for each of the nodes on the one or more inner layers and on the output layer, wherein the one or more connection weights are updated based on the partial derivatives of the cost function back-propagated through the network during the back-propagation, such that the additional regularization cost term in the cost function for the first and second nodes is different from the one or more connection weights for the first and second nodes.

2. The method of claim 1, wherein counter-tying the activation values of the first and second nodes comprises tying the activation values of the first and second nodes such that the first and second nodes are trained together to perform a machine learning task instead of being trained to optimize individual performance of the first and second nodes.

3. The method of claim 1, wherein detecting the error-prone training data example comprises:
determining whether the activation values for the first and second nodes are equal for a training data example.

4. The method of claim 3, further comprising adjusting, by a learning coach computer system, the additional regularization cost term.

5. The method of claim 3, wherein the nodal network comprises an ensemble of classifier networks.

6. The method of claim 5, wherein:
the first node is an output node of a first classifier network in the ensemble of classifier networks; and
the second node is an output node of a second classifier network in the ensemble of classifier networks.

7. The method of claim 6, wherein detecting the error-prone training data example comprises:
determining whether the ensemble made an error in a classification task for the ensemble on a training data example.

8. The method of claim 7, further comprising determining, by a learning coach computer system, the additional regularization cost term.

9. The method of claim 1, wherein the nodal network comprises a merger of an ensemble of self-organizing partially ordered networks.

10. The method of claim 1, wherein the nodal network comprises a single self-organizing partially ordered network.

11. The method of claim 3, further comprising, prior to counter-tying activation values of first and second nodes of the nodal network:
adding, by the computer system, the first and second nodes to the nodal network; and
training, by the computer system, the nodal network with the first and second nodes, wherein training the nodal network comprises:
splitting the training data into multiple subsets, comprising a first subset and a second subset;
back-propagating information to the first node only from the first subset of training data; and
back-propagating information to the second node only from the second subset of training data.

12. The method of claim 11, wherein splitting the training data comprises splitting, by the computer system, the training data based on a sign of a derivative of the objective of the nodal network with respect to an activation of an original node of the nodal network.

13. A computer system comprising:
one or more processor cores; and
a memory in communication with the one or more processor cores, wherein the memory stores software that, when executed by the one or more processor cores, cause the one or more processor cores to train a nodal network,
wherein the nodal network comprises a classifier network that comprises a plurality of layers,
wherein the plurality of layers comprises an input layer, an output layer and one or more inner layers between the input and output layers, and wherein each layer comprises one or more nodes, and
wherein the memory stores software that, when executed by the one or more processor cores, causes the one or more processor cores to:
iteratively for each training data example in a set of training data:
perform feed-forward computations comprising computing for each training data example, an activation value for the nodes on the one or more inner layers and for the output layer, wherein the activation values are computed, for each of the nodes on the one or more inner layers and on the output layer, based on one or more connection weights for each node; and
back-propagate partial derivatives of a cost function for an objective of the nodal network through the nodal network, wherein back-propagating the partial derivatives comprises counter-tying activation values of first and second nodes of the nodal network,
wherein the memory stores software that when executed by the one or more processor cores causes the one or more processor cores to counter-tie the activation values of the first and second nodes by:
detecting an error-prone training data example in the set of training data for the nodal network; and
adding an additional regularization cost term to the cost function for the first and second nodes for the error-prone training data example when back-propagating the partial derivatives through the nodal network for the error-prone training data example, wherein the additional regularization cost term rewards the first and second nodes upon a determination that the activation values for the first and second nodes for the error-prone training data example are not in agreement; and
after the iterative feed-forward computations and back-propagation for each training data example in the set of training data, update the one or more connection weights for each of the nodes on the one or more inner layers and on the output layer, wherein the one or more connection weights are updated based on the partial derivatives of the cost function back-propagated through the network during the backpropagation such that the additional regularization cost term in the cost function for the first and second nodes is different from the one or more connection weights for the first and second nodes.

14. The computer system of claim 13, wherein the memory stores further software that, when executed by the one or more processors, cause the one or more processors to counter-tie the activation values of the first and second nodes by tying the activation values of the first and second nodes such that the first and second nodes are trained together to perform a machine learning task instead of being trained to optimize individual performance of the first and second nodes.

15. The computer system of claim 14, wherein the memory stores further software that, when executed by the one or more processors, cause the one or more processors to detect an error prone training data example based on whether the activation values for the first and second nodes are equal for a training data example.

16. The computer system of claim 15, further comprising a learning coach computer system in communication with the nodal network, wherein the learning coach computer system is configured to adjust the additional regularization cost term.

17. The computer system of claim 15, wherein the nodal network comprises an ensemble of classifier networks.

18. The computer system of claim 17, wherein:
the first node is an output node of a first classifier network in the ensemble of classifier networks; and
the second node is an output node of a second classifier network in the ensemble of classifier networks.

19. The computer system of claim 18, wherein the memory stores further software that, when executed by the one or more processors, cause the one or more processors to detect the error prone training data example based on whether the ensemble made an error in a classification task for the ensemble on a training data example.

20. The computer system of claim 19, further comprising a learning coach computer system in communication with the nodal network, wherein the learning coach computer system is configured to adjust the additional regularization cost term.

21. The computer system of claim 13, wherein the nodal network comprises a merger of an ensemble of self-organizing partially ordered networks.

22. The computer system of claim 13, wherein the nodal network comprises a single self-organizing partially ordered network.

23. The computer system of claim 15, wherein the memory stores further software that, when executed by the one or more processors, cause the one or more processors to, prior to counter-tying activation values of first and second nodes of the nodal network:
add the first and second nodes to the nodal network; and
train the nodal network with the first and second nodes by:
splitting the training data into multiple subsets, comprising a first subset and a second subset;
back-propagating information to the first node only from the first subset of training data; and
back-propagating information to the second node only from the second subset of training data.

24. The computer system of claim 23, wherein the memory stores further software that, when executed by the one or more processors, cause the one or more processors to split the training data by splitting the training data based on a sign of a derivative of the objective of the nodal network with respect to an activation of an original node of the nodal network.

25. The method of claim 13, wherein the additional regularization cost term penalizes the first and second nodes upon a determination that the activation values for the first and second nodes for the error-prone training data example are in agreement.

* * * * *